US010601097B2

(12) United States Patent
Ogasawara

(10) Patent No.: US 10,601,097 B2
(45) Date of Patent: Mar. 24, 2020

(54) NON-RECIPROCAL CIRCUIT ELEMENT, MANUFACTURING METHOD THEREFOR, AND COMMUNICATION DEVICE

(71) Applicant: NEC Corporation, Minato-ku, Tokyo (JP)

(72) Inventor: Tadayuki Ogasawara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 120 days.

(21) Appl. No.: 15/557,521

(22) PCT Filed: Mar. 17, 2016

(86) PCT No.: PCT/JP2016/001545
§ 371 (c)(1),
(2) Date: Sep. 12, 2017

(87) PCT Pub. No.: WO2016/152112
PCT Pub. Date: Sep. 29, 2016

(65) Prior Publication Data
US 2018/0145389 A1     May 24, 2018

(30) Foreign Application Priority Data

Mar. 25, 2015   (JP) ................. 2015-061847
Sep. 10, 2015   (JP) ................. 2015-178410

(51) Int. Cl.
*H01P 1/387*   (2006.01)
*H01P 1/38*   (2006.01)
(Continued)

(52) U.S. Cl.
CPC ............. *H01P 1/387* (2013.01); *H01P 1/38* (2013.01); *H01P 11/00* (2013.01); *H04B 1/40* (2013.01)

(58) Field of Classification Search
CPC .................. H01P 1/387; H01P 1/38
(Continued)

(56) References Cited

U.S. PATENT DOCUMENTS

| 4,222,015 A | 9/1980 | Hauth et al. |
| 5,638,033 A | 6/1997 | Walker et al. |
| 2014/0320228 A1 | 10/2014 | Orihashi |

FOREIGN PATENT DOCUMENTS

| JP | S39-000651 A | 1/1964 |
| JP | S54-051761 A | 4/1979 |

(Continued)

OTHER PUBLICATIONS

International Search Report for PCT Application No. PCT/JP2016/001545, dated Jun. 7, 2016.

(Continued)

*Primary Examiner* — Stephen E. Jones

(57) ABSTRACT

The present invention addresses the problem of suppressing variation in the distance between a ferrimagnetic body and the side part of a conductive body cover, thereby suppressing variation in the reflection characteristic and isolation. Therefore, the present invention provides a non-reciprocal circuit element equipped with: a conductive cover provided on a substrate and covering a ferrimagnetic body provided on the substrate; the ferrimagnetic body, on at least the portion of which opposing the side part of the conductive body cover is formed a dielectric body that contacts or substantially contacts the side part of the conductive body cover; and a conductive body part provided on the substrate. Furthermore, the non-reciprocal circuit element is equipped with multiple connecting parts electrically connecting the conductive body part and each of multiple signal transmission wires on the substrate.

13 Claims, 61 Drawing Sheets

(51) Int. Cl.
  *H01P 11/00* (2006.01)
  *H04B 1/40* (2015.01)
(58) Field of Classification Search
  USPC .................................................. 333/1.1, 24.2
  See application file for complete search history.

(56) References Cited

FOREIGN PATENT DOCUMENTS

| | | |
|---|---|---|
| JP | S59-008403 A | 1/1984 |
| JP | H09-284012 A | 10/1997 |
| JP | H10-276012 A | 10/1998 |
| JP | H10-294606 A | 11/1998 |
| JP | 2009-290835 A | 12/2009 |
| JP | 2012-213034 A | 11/2012 |
| WO | 2013/088618 A1 | 6/2013 |

OTHER PUBLICATIONS

English translation of Written opinion for PCT Application No. PCT/JP2016/001545.

NON-RECIPROCAL CIRCUIT ELEMENT, MANUFACTURING METHOD THEREFOR, AND COMMUNICATION DEVICE

This application is a National Stage Entry of PCT/JP2016/001545 filed on Mar. 17, 2016, which claims priority from Japanese Patent Application 2015-061847 filed on Mar. 25, 2015, and Japanese Patent Application 2015-178410 filed on Sep. 10, 2015, the contents of all of which are incorporated herein by reference, in their entirety.

TECHNICAL FIELD

The present invention relates to a non-reciprocal circuit element, a manufacturing method therefor, and a communication device, and particularly, relates to a non-reciprocal circuit element for use in high frequencies, a manufacturing method therefor, and a communication device.

BACKGROUND ART

Regarding a non-reciprocal circuit element for use in a high frequency circuit, a structure including a metal cover is disclosed, in order to achieve miniaturization thereof, or achieve facilitation of implementation on a circuit board by reducing the number of components.

For example, PTL 1 discloses a structure in which a metal cover is placed on a wiring pattern formed on a circuit board in such a way as to make electrical contact with the wiring pattern through ferrite. Then, PTL 1 discloses a method of creating a metal cover by bending a metal plate, as a method of creating a metal cover.

In addition, in relation to the present invention, PTL 2 discloses a non-reciprocal circuit element in which a ground conductor provided on a rear surface of a dielectric body substrate is provided with a non-conductive body part on at least a part of a portion opposing an area covered with a metal cap on a surface of the dielectric body substrate.

In addition, in relation to the present invention, PTL 3 discloses a circulator in which a slab member is arranged with respect to a ferrite slab member in such a way that a magnet means saturates the slab member with a static magnetic field along a propagation direction of a signal passing through a coupler region.

In addition, in relation to the present invention, PTL 4 discloses a circulator including a dielectric body substrate, a ground conductor that covers a first surface of the dielectric body substrate, a magnetic body metal table, an inner conductor that is laid over a second surface of the dielectric body substrate, a spacer that is arranged on the inner conductor, and a magnet.

CITATION LIST

Patent Literature

[PTL 1] International Publication WO 2013/088618
[PTL 2] Japanese Unexamined Patent Application Publication No. 2009-290835
[PTL 3] Japanese Unexamined Patent Application Publication No. H09-284012
[PTL 4] Japanese Unexamined Patent Application Publication No. S59-008403

SUMMARY OF INVENTION

Technical Problem

In a case of using a bent metal cover, however, when there is a gap between ferrite and the metal cover, variation in a distance between the ferrite and a metal cover side part is caused due to variation in bending accuracy and the like. The variation in a gap between the ferrite and the metal cover side part leads to variation in positions of an upper part of the metal cover and the ferrite relative to each other. Then, there is a problem that the relative positional variation produces variation in a reflection characteristic and isolation of a non-reciprocal circuit element.

An object of the present invention is to provide a non-reciprocal circuit element that solves the above-described problem, and is able to suppress variation in a reflection characteristic and isolation, by suppressing variation in a distance between ferrite and a metal cover side part thereof.

Solution to Problem

A non-reciprocal circuit element according to the present invention includes: a conductive body cover that is provided on a substrate and covers a ferrimagnetic body provided on the substrate; and the ferrimagnetic body, on at least a portion of which opposing a side part of the conductive body cover, a dielectric body that makes substantial contact with the conductive body cover side part is formed. The non-reciprocal circuit element according to the present invention further includes: a conductive body part that is provided on the substrate; a plurality of connecting parts that electrically connect each of a plurality of signal transmission lines on the substrate with the conductive body part; and a magnet that applies a magnetic field to the ferrimagnetic body.

Advantageous Effects of Invention

A non-reciprocal circuit element according to the present invention is able to suppress variation in a reflection characteristic and isolation, by suppressing variation in a distance between a ferrimagnetic body and a conductive body cover side part thereof.

DESCRIPTION OF EMBODIMENTS

First Example Embodiment

A first example embodiment is an example embodiment relating to a non-reciprocal circuit element in which a side part of a metal cover is brought into substantial contact with a dielectric body formed on a ferrimagnetic material side part.

First, a case of a three-port circulator will be described as an example of a non-reciprocal circuit element.
[Configuration]

Figure 1:
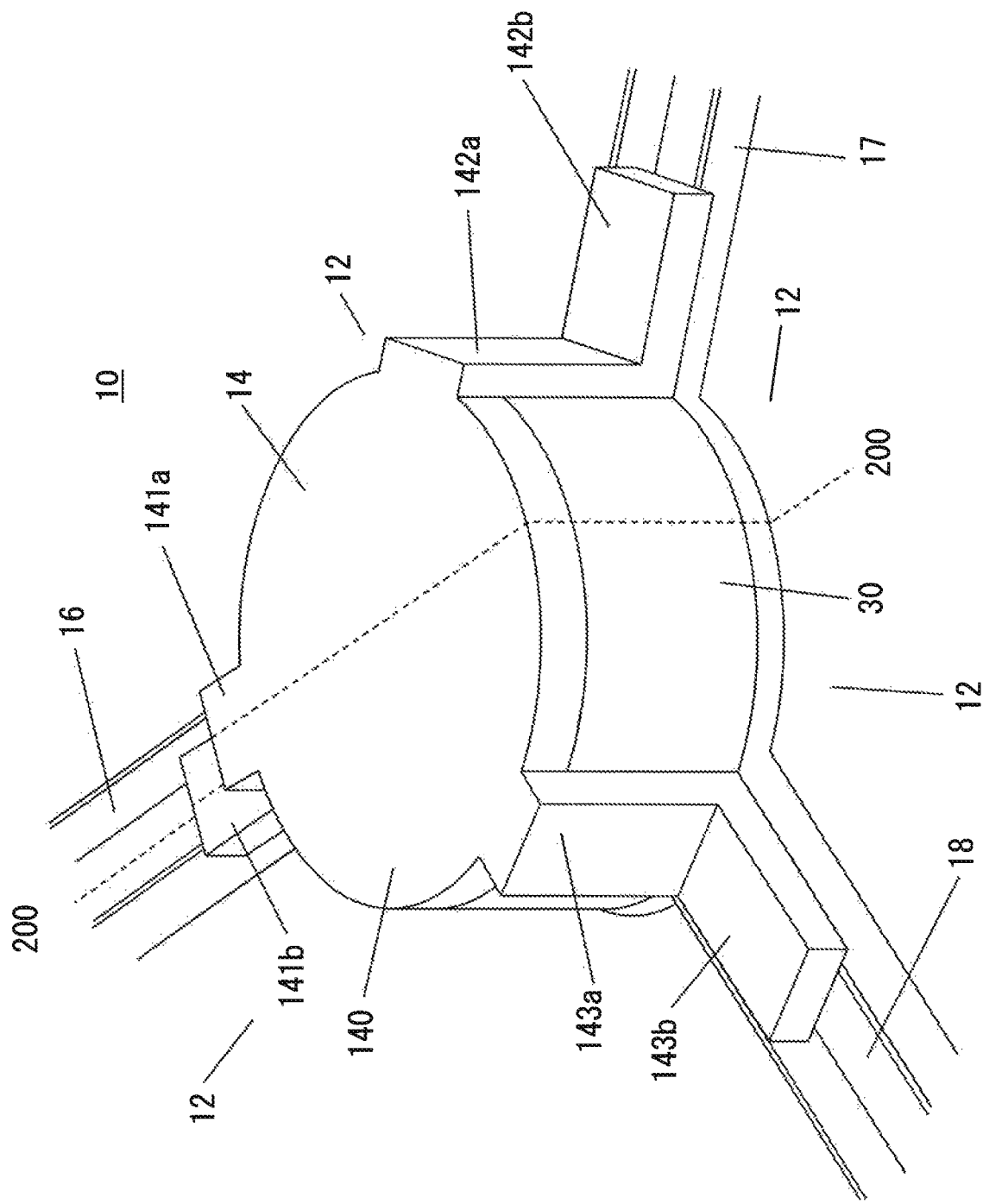
FIG. 1 is a perspective conceptual view illustrating a structure of a non-reciprocal circuit element according to the present example embodiment.
Figure 2:
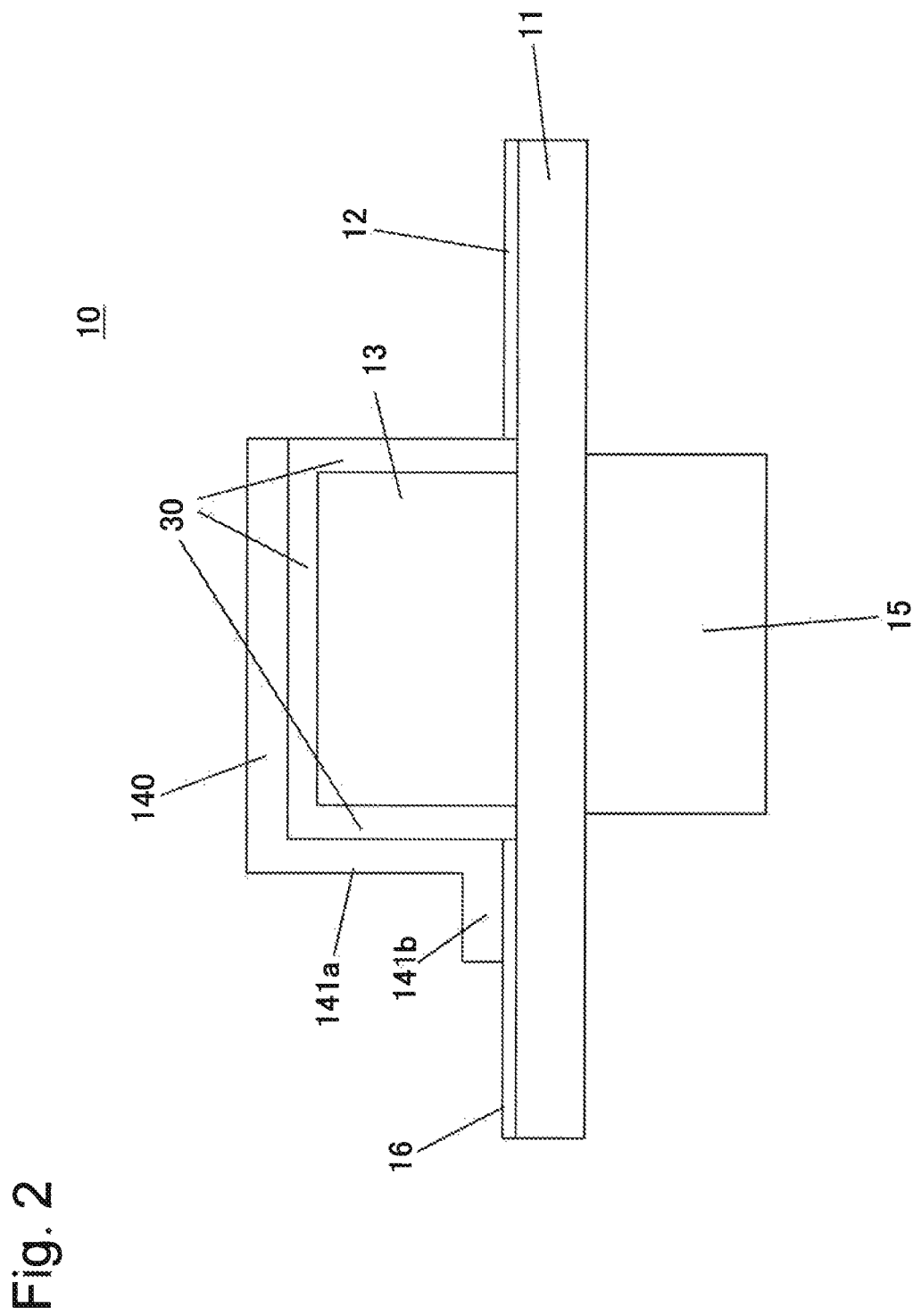
FIG. 2 is a sectional conceptual view illustrating a structure of the non-reciprocal circuit element according to the present example embodiment.
Figure 3:
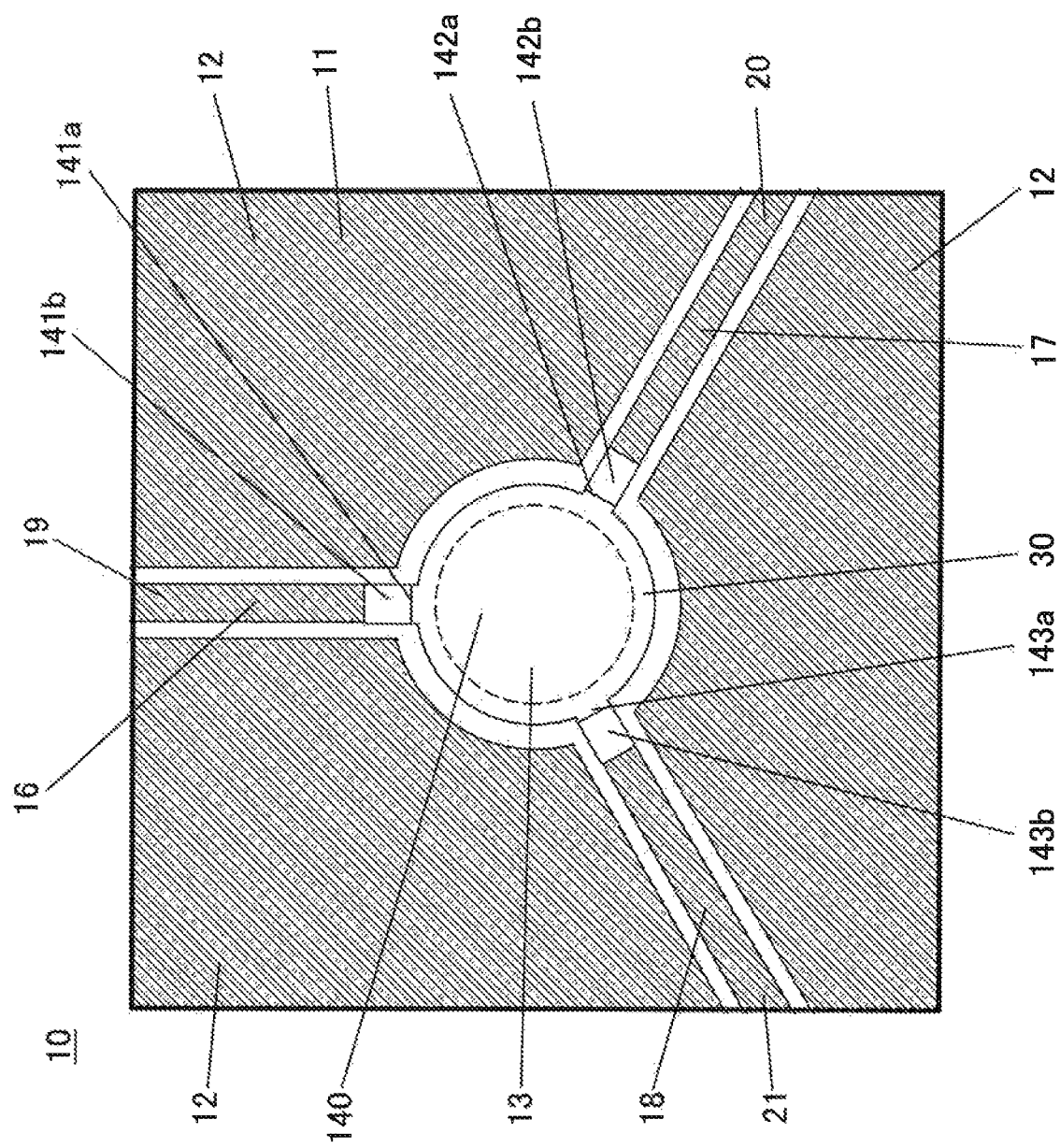
FIG. 3 is a top conceptual view illustrating a structure of the non-reciprocal circuit element according to the present example embodiment.

FIG. 1 is a perspective conceptual view illustrating a structure of a non-reciprocal circuit element 10 that is an example of a non-reciprocal circuit element according to the first example embodiment, and FIG. 2 is a sectional conceptual view of the non-reciprocal circuit element 10 when it is assumed that the non-reciprocal circuit element 10 is cut along a cutting line 200 in a sectional view illustrated in FIG. 1. In addition, FIG. 3 is a top conceptual view of the non-reciprocal circuit element 10.

The non-reciprocal circuit element 10 is provided on a substrate 11 on which a pattern 12 is formed. The non-reciprocal circuit element 10 is a three-port circulator that includes a ferrimagnetic material 13, a conductive body cover 14, and a magnet 15.

In the non-reciprocal circuit element 10, the ferrimagnetic material 13 has a dielectric material 30 formed on a side part and an upper part thereof, and is provided on the substrate 11. The ferrimagnetic material 13 is covered by the conductive body cover 14.

The conductive body cover 14 includes a conductive body cover upper part 140, conductive body cover side parts 141a, 142a, and 143a, and conductive body cover foot parts 141b, 142b, and 143b. The conductive body cover foot parts 141b, 142b, and 143b are electrically connected with transmission lines 16, 17, and 18 constituting the pattern 12 on the substrate 11, which will be described later.

The magnet 15 is provided on a face (hereinafter, referred to as a "lower face") of the substrate 11 on a side opposite to a mounting face (hereinafter, referred to as an "upper face") of the ferrimagnetic material 13. The magnet 15 applies a magnetic field to the ferrimagnetic material 13.

In the following, each configuration of the non-reciprocal circuit element 10 will be described in detail. The substrate 11 is a dielectric body substrate on which the non-reciprocal circuit element 10 is mounted, and is typically a printed circuit board (PCB) that is configured by laminating multiple layers of dielectric layers and metal layers. Note that a substrate on which the non-reciprocal circuit element 10 is mounted is not limited to the PCB, but may be a substrate having another configuration.

The pattern 12 is a conductor pattern that is formed on the upper face of the substrate 11 and the lower face of the substrate 11. The pattern 12 has a signal line and a ground pattern, which form the transmission lines 16, 17, and 18 for signals. The pattern 12 is not formed on a center part of the upper face of the substrate 11 (in other words, at a part where the ferrimagnetic material 13 is mounted), but is in a pattern-interrupted state (a punched pattern).

The ferrimagnetic material 13 has a columnar shape, and is arranged on the center part (on the punched pattern) of the upper face of the substrate 11. The ferrimagnetic material 13 is sandwiched between the substrate 11 and the conductive body cover 14. The ferrimagnetic material 13 is a ferrimagnetic body having ferrimagnetism, and is, for example, a substance such as Yttrium iron garnet (YIG), Barium ferrite, and Strontium ferrite. Note that a substance to be arranged on the center part of the upper face of the substrate 11 is not limited to ferrite, as long as the substance is a ferrimagnetic body that has ferrimagnetism and generates a gyromagnetic effect to be described later. In addition, a shape of the ferrimagnetic material 13 may not necessarily be columnar.

The dielectric material 30 is formed on a surface of the ferrimagnetic material 13. It is more preferable that the dielectric material 30 is typically a dielectric body film. In the present configuration, a distance between each of the conductive body cover side parts 141a, 142a, and 143a and the ferrimagnetic material 13 is determined by a film thickness of the dielectric material 30. This is because use of a dielectric body film having a thin film thickness can keep a substantially uniform distance between each of the conductive body cover side parts 141a, 142a, and 143a and the ferrimagnetic material 13 even when the film thickness varies. The dielectric material 30 may be either an inorganic material or an organic material, as long as the dielectric material 30 is a dielectric body. It is more preferable that the dielectric material 30 is formed with a substantially uniform film thickness, especially at a portion of a side face portion in FIG. 1 of the ferrimagnetic material 13, opposing at least the conductive body cover side part 141a. This is because, in the non-reciprocal circuit element 10, a distance between each of the conductive body cover side parts 141a, 142a, and 143a and the ferrimagnetic material 13 is determined by a film thickness of the dielectric material 30. Herein, it is premised that a face of each of the conductive body cover side parts 141a, 142a, and 143a is in substantial contact with a surface of the dielectric material 30 formed on the ferrimagnetic material 13, opposing each of the conductive body cover side parts 141a, 142a, and 143a.

The conductive body cover 14 is a conductive body cover having an upper face of the conductive body cover 14 constituted of a substantially circular conductive body. The conductive body cover 14 covers the ferrimagnetic material 13. Since the ferrimagnetic material 13 is typically a high dielectric constant dielectric body having a dielectric constant exceeding 10, a high frequency electric field concentrates more on the ferrimagnetic material 13 below an upper face of the ferrimagnetic material 13 than on an air layer above the upper face of the ferrimagnetic material 13. The conductive body cover 14 when being provided above the upper face thereof can suppress an unnecessary electromagnetic wave incident on the ferrimagnetic material from the upper face. Note that a material constituting the conductive body cover 14 is typically a metal, but may be a conductive material other than a metal, and further, may be a material of a combination of a metal with a conductive material other than a metal. Further, a shape of the conductive body cover upper part 140 may not be substantially circular.

In the first example embodiment, as long as the conductive body cover 14 covers at least a portion of the upper face of the ferrimagnetic material 13, a state where a most portion of the upper face of the ferrimagnetic material 13 is exposed may be included in a state where "the ferrimagnetic material 13 is covered". In the non-reciprocal circuit element 10, as long as characteristic impedance of each of the transmission lines 16, 17, and 18 on the substrate 11 can be matched with that of the ferrimagnetic material 13, there is no limitation on a shape of the conductive body cover 14. The reason why there is no limitation on a shape of the conductive body cover 14 is that radiation loss can be reduced since an electric field intensity on a lower face of the conductive body cover is larger than that on an upper face of the conductive body cover.

The conductive body cover 14 is fixed on the substrate 11 with the three conductive body cover foot parts 141b, 142b, and 143b. The conductive body cover foot parts 141b, 142b, and 143b support the conductive body cover 14. The three conductive body cover foot parts 141b, 142b, and 143b are electrically connected with the transmission lines 16, 17, and 18 of the pattern 12. With an electrically connected configuration, the conductive body cover 14 transmits a high frequency signal input through arbitrary any one connecting part of the transmission lines 16, 17, and 18, and outputs the high frequency signal to another connecting part of the transmission lines 16, 17, and 18.

Note that, in FIG. 1, the upper face of the substrate 11, the upper face of the ferrimagnetic material 13, and the conductive body cover 14 are in a substantially parallel positional relationship. However, as long as a magnetic field generated between the conductive body cover 14 and the substrate 11 is orthogonal to an external direct current magnetic field applied by the magnet 15, the positional relationship is not limited to substantial parallel.

The conductive body cover side parts 141a, 142a, and 143a and the conductive body cover foot parts 141b, 142b, and 143b are constituted of, for example, the same material as that of the conductive body cover upper part 140, and are formed in a single body with the conductive body cover upper part 140.

Each of the conductive body cover side parts 141a, 142a, and 143a has one end at an outer edge of the conductive body cover upper part 140, and another end in a state of being fixed on the substrate 11 with each of the conductive body cover foot parts 141b, 142b, and 143b. Each of the conductive body cover side parts 141a, 142a, and 143a protrudes on a side face of the conductive body cover upper part 140, and is formed by being bent in a vertical direction (downward in FIG. 1) in such a way that each of the conductive body cover foot parts 141b, 142b, and 143b is positioned on the substrate 11. In the conductive body cover upper part 140, the conductive body cover side part 141a and the conductive body cover side part 142a form a central angle of substantially 120°. Likewise, the conductive body cover side part 142a and the conductive body cover side part 143a form a central angle of substantially 120°, and the conductive body cover side part 143a and the conductive body cover side part 141a form a central angle of substantially 120°.

In FIGS. 1 and 2, it is desirable that the conductive body cover side parts 141a, 142a, and 143a are in substantial contact with a surface of the dielectric material 30 formed on the ferrimagnetic material 13, opposing the conductive body cover side parts 141a, 142a, and 143a. This is because this substantial contact can define a distance between each of the conductive body cover side parts 141a, 142a, and 143a and a surface of the ferrimagnetic material 13 opposing each of the conductive body cover side parts 141a, 142a, and 143a to be substantially constant, with a film thickness of the dielectric material 30. Herein, it is premised that the film thickness of the dielectric material 30 is substantially constant at a portion opposing each of the conductive body cover side parts 141a, 142a, and 143a.

The magnet 15 is placed on the lower face of the substrate 11. In FIG. 1, the magnet 15 is placed at a position opposing the ferrimagnetic material 13 across the substrate 11, and applies a magnetic field to the ferrimagnetic material 13 in a direction perpendicular to the substrate 11. Specifically, a direct current magnetic field directed from up to down, or from down to up in FIG. 1 or 2 is generated inside the ferrimagnetic material 13 by the magnet 15. In FIG. 3, a direct current magnetic field in a direction penetrating from a front side to a rear side, or from a rear side to a front side of the plane of the figure is generated by the magnet 15. A direction of the direct current magnetic field is a direction perpendicular to a high frequency magnetic field in the ferrimagnetic material 13 which is generated when a high frequency signal passes through the conductive body cover upper part 140. Note that, in FIG. 1, an area of a main face of the magnet 15 is larger than an area of the upper face of the ferrimagnetic material 13, but may not necessarily be larger than an area of the upper face of the ferrimagnetic material 13.

Note that the magnet 15 may be provided at a position other than the lower face of the substrate 11, as long as the magnet 15 is capable of generating a direct current magnetic field in a direction perpendicular to a high frequency magnetic field in the ferrimagnetic material 13 which is generated when a high frequency signal passes through the conductive body cover upper part 140. For example, the magnet 15 may be provided on the same face of the substrate 11 as the ferrimagnetic material 13. The number of the magnet 15 is also not limited to one. For example, a plurality of magnets may be arranged in series above and below the ferrimagnetic material 13. Further, the magnet 15 may be any magnet, as long as the magnet 15 is capable of applying a magnetic field to the ferrimagnetic material 13.

The transmission lines 16, 17, and 18 are wiring lines each of which transmits a high frequency signal. The transmission lines 16, 17, and 18 respectively have feed points 19, 20, and 21 each of which is an input end for a high frequency signal from outside of the non-reciprocal circuit element 10.

In FIGS. 1, 2, and 3, an example in which the dielectric material 30 is formed on a side face and an upper face of the ferrimagnetic material 13 is illustrated. However, the dielectric material 30 only needs to be formed on a portion of the side face in the figures of the ferrimagnetic material 13, opposing the conductive body cover side parts 141a, 142a, and 143a. In other words, the dielectric material 30 may be formed on the entire side face of the ferrimagnetic material 13, or may be formed only on a portion of the side face of the ferrimagnetic material 13, opposing the conductive body cover side parts 141a, 142a, and 143a. In addition, whether the dielectric material 30 is formed on an upper face or a lower face of the ferrimagnetic material 13 is arbitrary.

Figure 4:
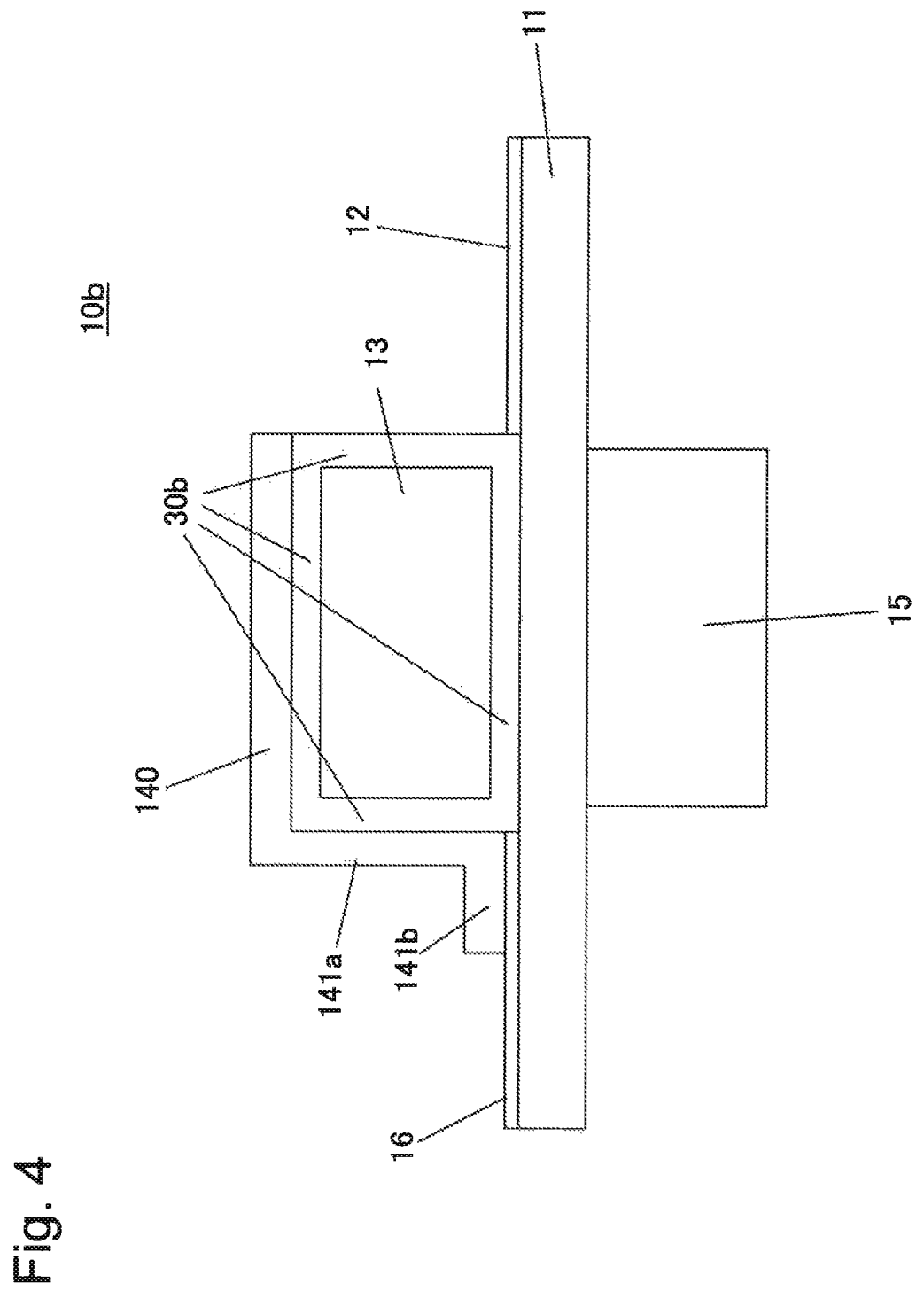
FIG. 4 is a sectional conceptual view illustrating a first variation of the non-reciprocal circuit element according to the present example embodiment.

FIG. 4 is a conceptual view illustrating a cross section of a first variation of the non-reciprocal circuit element according to the first example embodiment. A non-reciprocal circuit element 10b includes a ferrimagnetic material 13 that has a dielectric material 30b formed on a side face, an upper face, and a lower face of the ferrimagnetic material 13.

Figure 5:
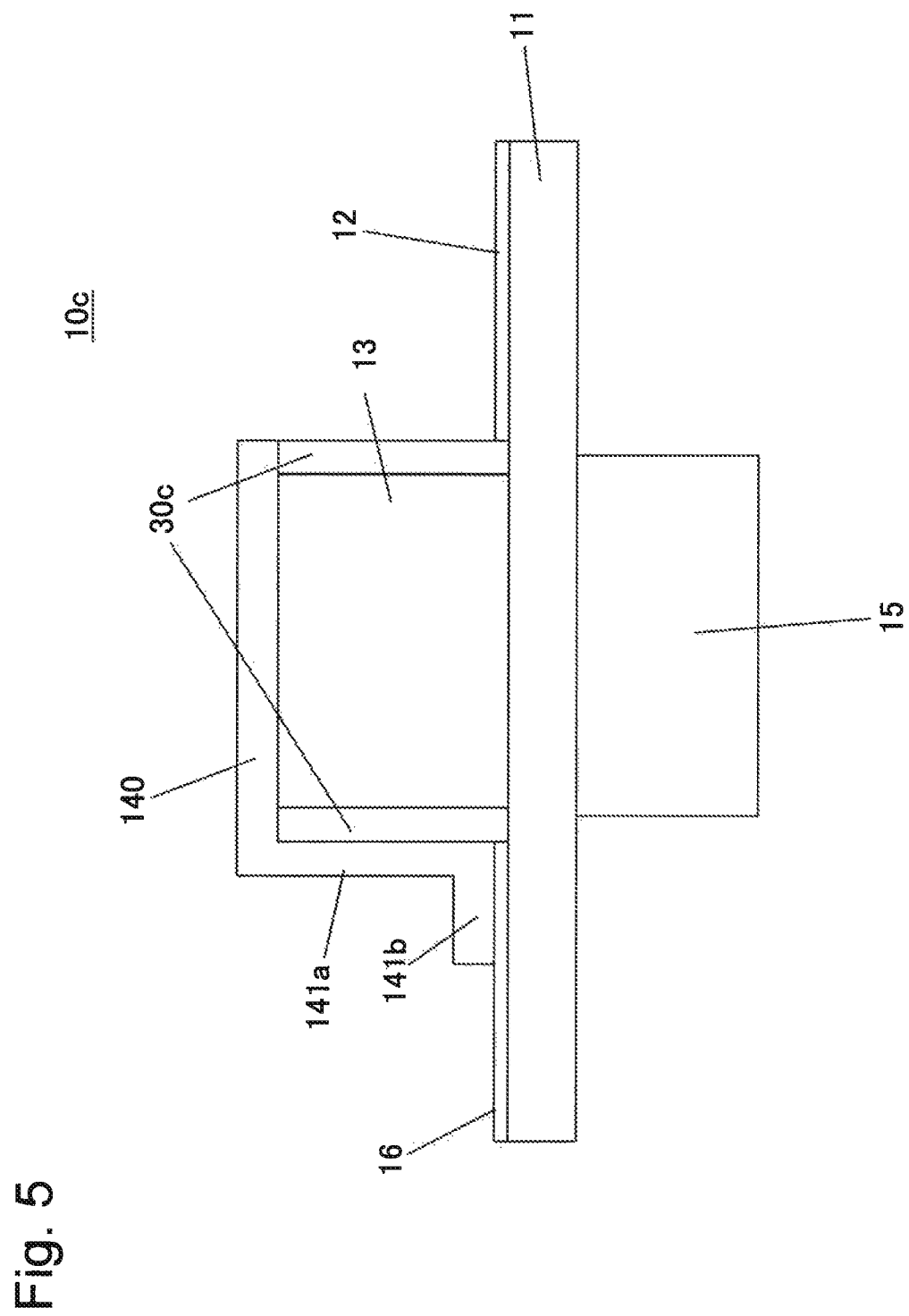
FIG. 5 is a sectional conceptual view illustrating a second variation of the non-reciprocal circuit element according to the present example embodiment.

FIG. 5 is a conceptual view illustrating a cross section of a second variation of the non-reciprocal circuit element according to the first example embodiment. A non-reciprocal circuit element 10c includes a ferrimagnetic material 13 that has a dielectric material 30c formed only on a side face of the ferrimagnetic material 13.

Figure 6:
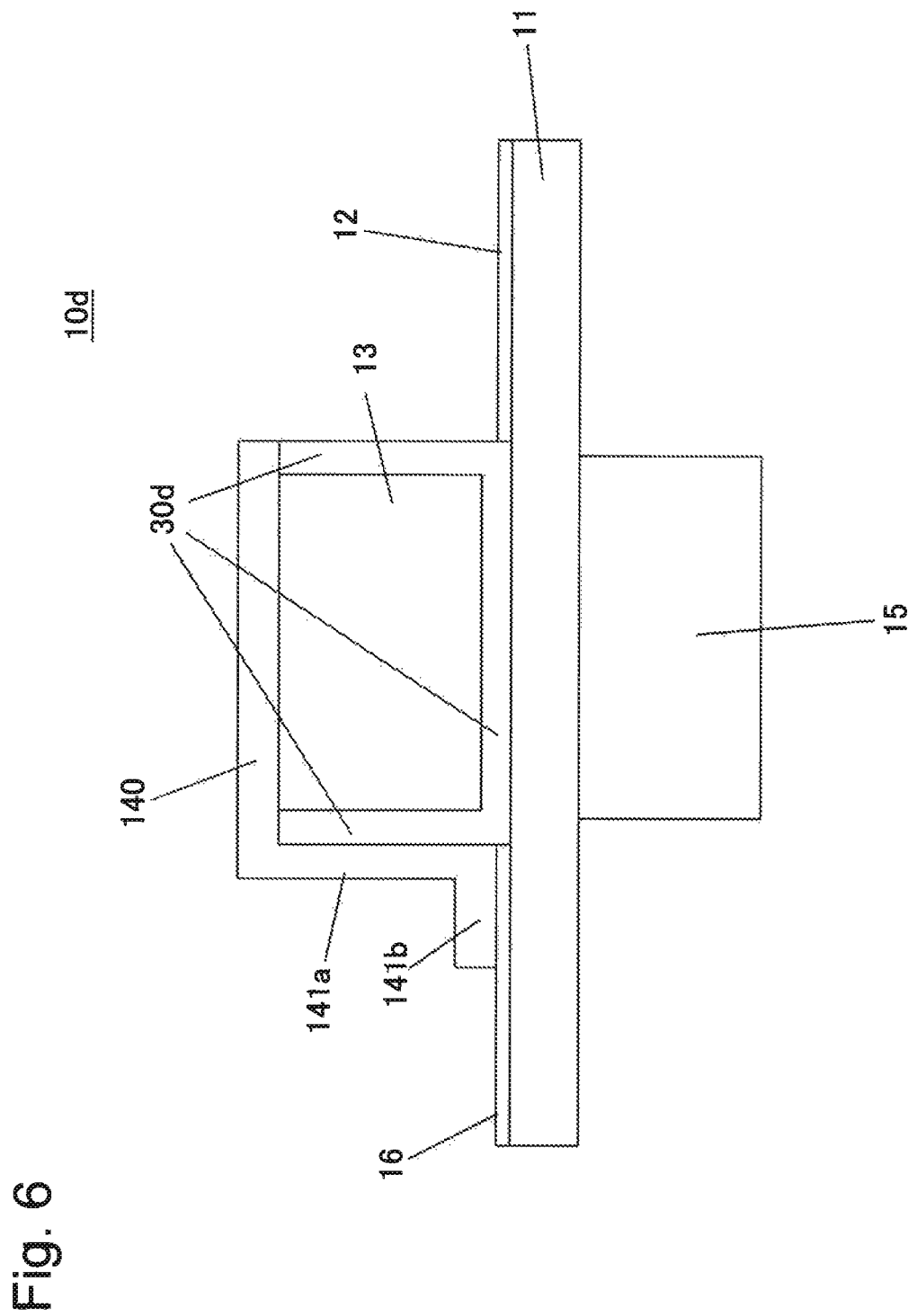
FIG. 6 is a sectional conceptual view illustrating a third variation of the non-reciprocal circuit element according to the present example embodiment.

FIG. 6 is a conceptual view illustrating a cross section of a third variation of the non-reciprocal circuit element according to the first example embodiment. A non-reciprocal circuit element 10d includes a ferrimagnetic material 13 that has a dielectric material 30d formed on a side face and a lower face of the ferrimagnetic material 13.

In addition, there are also various types of variations for arrangement of a conductive body cover, a ferrimagnetic material, and a magnet in the non-reciprocal circuit element according to the first example embodiment.

Figure 7:
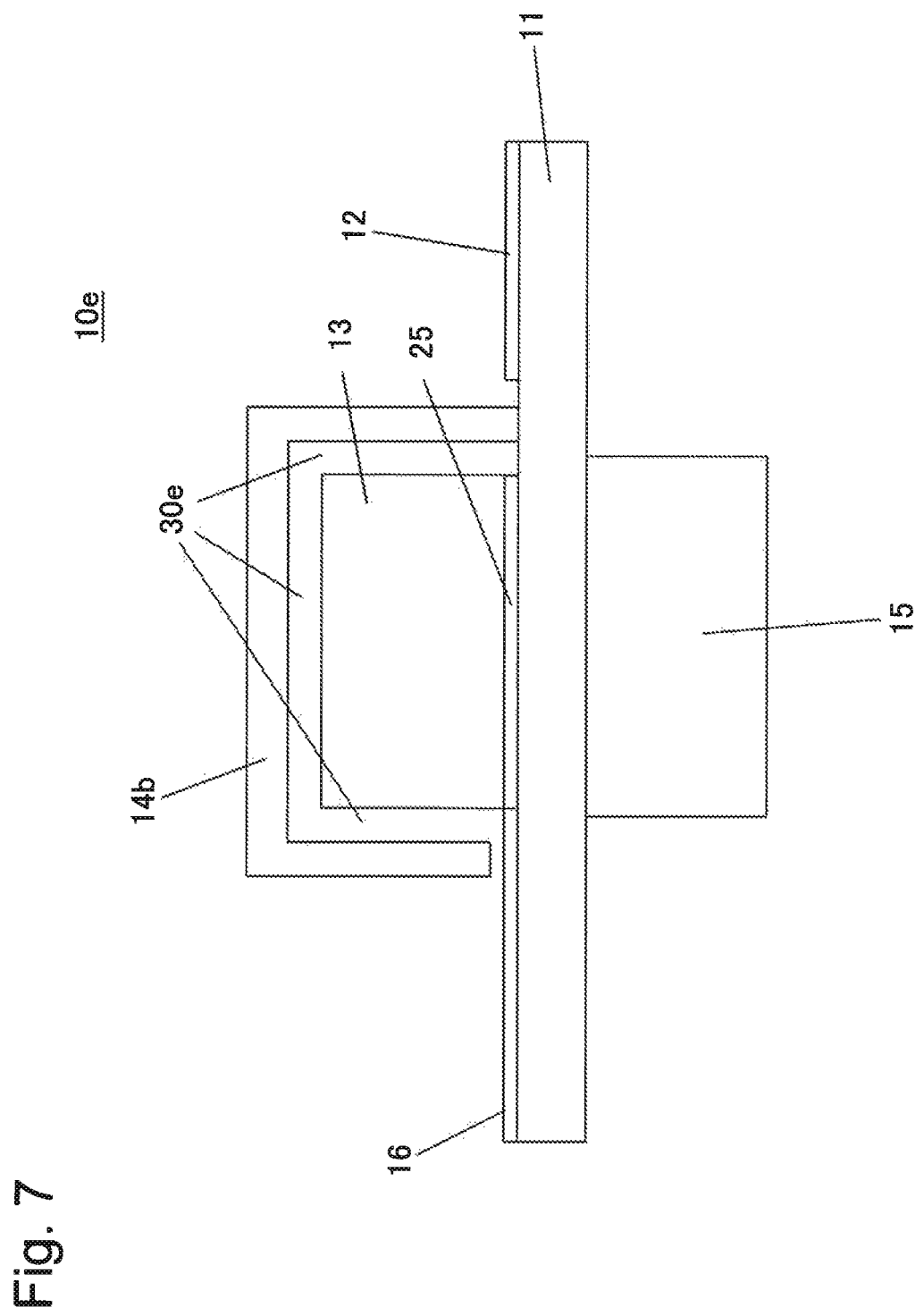
FIG. 7 is a sectional conceptual view illustrating a fourth variation of the non-reciprocal circuit element according to the present example embodiment.

FIG. 7 is a conceptual view illustrating a cross section of a fourth variation of the non-reciprocal circuit element according to the first example embodiment.

A non-reciprocal circuit element 10e includes a substrate 11, a pattern 12, a ferrimagnetic material 13, a conductive body cover 14b, a magnet 15, a transmission line 16, a lower conductor 25, and a dielectric material 30e.

The pattern 12, the lower conductor 25, and the transmission line 16 are formed on the substrate 11.

The lower conductor 25 is formed on the substrate 11 at a center part in FIG. 7 where no pattern is formed. The lower conductor 25 is in electrical contact with the transmission line 16, but is not in electrical contact with the pattern 12. The lower conductor 25 typically has a substantially circular shape. The lower conductor 25 may be integrated with the transmission line 16.

The ferrimagnetic material 13 is formed on the lower conductor 25. The dielectric material 30e is formed on a side face and an upper face of the ferrimagnetic material 13.

The ferrimagnetic material 13 is covered by the conductive body cover 14b with the dielectric material 30e therebetween. The conductive body cover 14b is not in electrical contact with the transmission line 16, and with the transmission lines 17 and 18, which are not illustrated in FIG. 7. In FIG. 7, a case in which the conductive body cover 14b is in contact with a portion of the substrate 11 where the pattern 12 is not formed, but is not in contact with the pattern 12 is illustrated. However, the conductive body cover 14b may be in contact with the pattern 12. The conductive body cover 14b may cover the entire or most of the side face and the upper face of the ferrimagnetic material 13 and the dielectric material 30e formed thereon.

Detailed description of each configuration in FIG. 7 and the above description is the same as the description about the configuration illustrated with the same reference numeral in FIGS. 1 to 3, except for the above description about FIG. 7.

Figure 8:
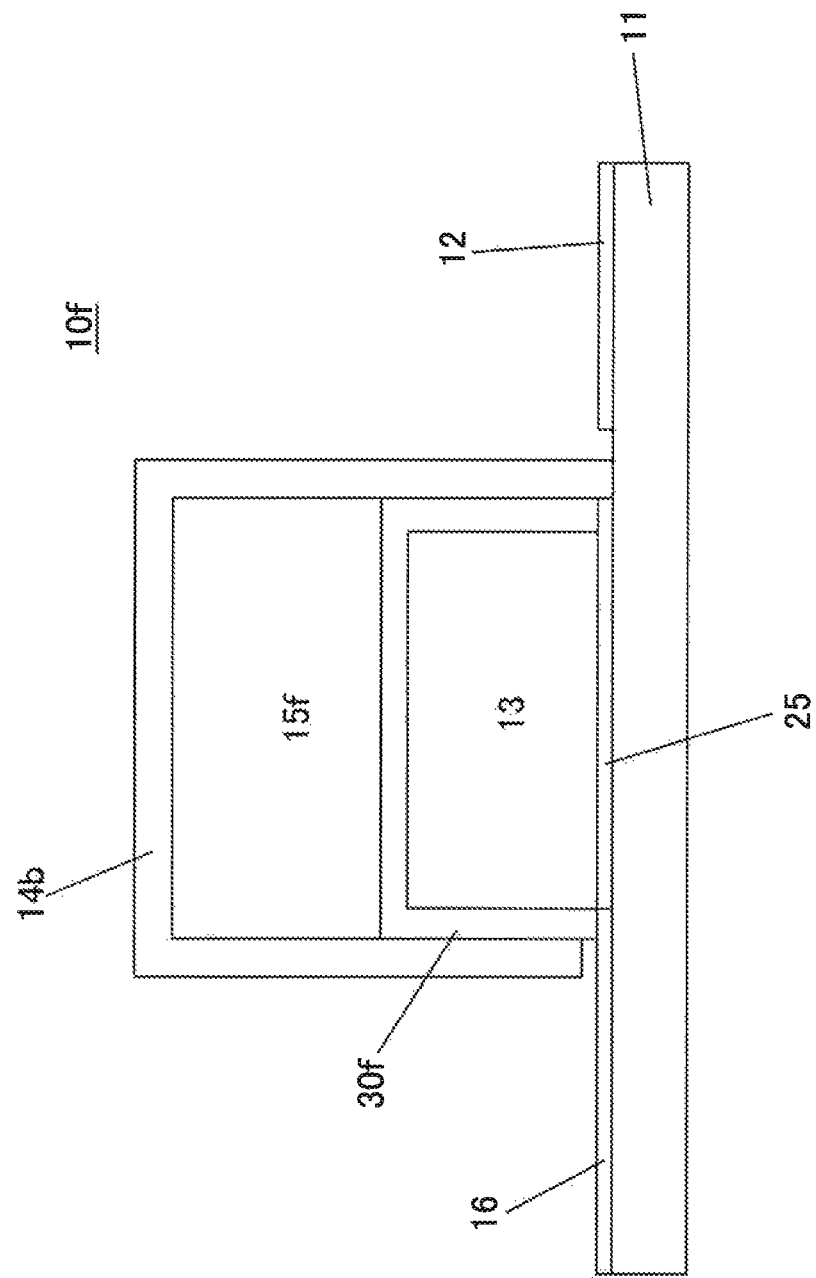
FIG. 8 is a sectional conceptual view illustrating a fifth variation of the non-reciprocal circuit element according to the present example embodiment.

FIG. 8 is a conceptual view illustrating a cross section of a fifth variation of the non-reciprocal circuit element according to the first example embodiment.

A non-reciprocal circuit element 10f includes a substrate 11, a pattern 12, a ferrimagnetic material 13, a conductive body cover 14b, a magnet 15f, a transmission line 16, a lower conductor 25, and a dielectric material 30f.

A difference from the configuration illustrated in FIG. 7 resides in that the magnet 15f is formed not on a lower face of the substrate 11, but above the ferrimagnetic material 13. Description about other configurations will be omitted since being the same as that of the configurations illustrated with the same reference numerals in FIG. 7.

[Operation]

An operation of the non-reciprocal circuit element 10 illustrated in FIGS. 1 to 3 will be described below. A high frequency signal is input for the non-reciprocal circuit element 10, from the feed point 19 via the transmission line 16, the conductive body cover foot part 141b, and the conductive body cover side part 141a to the conductive body cover upper part 140. The high frequency signal input to the conductive body cover upper part 140 generates a high frequency electromagnetic field between the conductive body cover upper part 140 and the substrate 11 (inside the ferrimagnetic material 13). Specifically, an electric field is generated in a direction perpendicular to a face of the substrate 11 (a height direction of the ferrimagnetic material 13 in FIG. 1), and a magnetic field is generated in a direction parallel with a face of the substrate 11.

Inside the ferrimagnetic material 13, a direct current magnetic field is applied by the magnet 15 in a height direction of the ferrimagnetic material 13 (a normal direction of an upper face of the ferrimagnetic material). A direction of the direct current magnetic field being applied is a direction perpendicular to the high frequency magnetic field generated inside the ferrimagnetic material 13 by the high frequency signal. Since the direct current magnetic field and the high frequency magnetic field generate a gyromagnetic effect inside the ferrimagnetic material 13, a path of the high frequency signal is rotated on a plane of the substrate 11 inside the ferrimagnetic material 13. When the direct current magnetic field is applied from down to up in FIG. 3, the high frequency signal is output via the conductive body cover side part 142a and the conductive body cover foot part 142b to the transmission line 17. When the direct current magnetic field is applied from up to down in FIGS. 2 and 3, the high frequency signal is output via the conductive body cover side part 143a and the conductive body cover foot part 143b to the transmission line 18. In this way, a high frequency signal is output only to a transmission line in a determined direction.

When a high frequency signal is input from the feed point 20 via the transmission line 17, the conductive body cover foot part 142b, and the conductive body cover side part 142a to the conductive body cover upper part 140, the high frequency signal is output only to a transmission line in a determined direction in accordance with the same principle. In addition, also when a high frequency signal is input from the feed point 21 via the transmission line 18, the conductive body cover foot part 143b, and the conductive body cover side part 143a to the conductive body cover upper part 140, the high frequency signal is output only to a transmission line in a determined direction in accordance with the same principle.

On the other hand, in the non-reciprocal circuit element 10e illustrated in FIG. 7 and the non-reciprocal circuit element 10f illustrated in FIG. 8, since the conductive body cover 14b is not in electrical contact with the transmission line 16 and the like, a high frequency signal input from the transmission line 16 and the like does not flow through the conductive body cover 14b. On the other hand, the transmission line 16, and 17 and 18, which are not illustrated in FIG. 7, are electrically connected with one another through the lower conductor 25. Then, the same operation as that in the above description about FIGS. 1 to 3 is performed, due to a gyro effect that is the same as in the above description about FIGS. 1 to 3 when a high frequency signal passes through the lower conductor 25.

[Manufacturing Method]

Next, an example of a method of manufacturing the non-reciprocal circuit element 10 illustrated in FIGS. 1 to 3 will be described.

First, an example of a method of forming the dielectric material 30 on a surface of the ferrimagnetic material 13 will be described.

FIGS. 9 to 12 are conceptual views each illustrating a method of forming the dielectric material 30 on a surface of the ferrimagnetic material 13.

Figure 9:
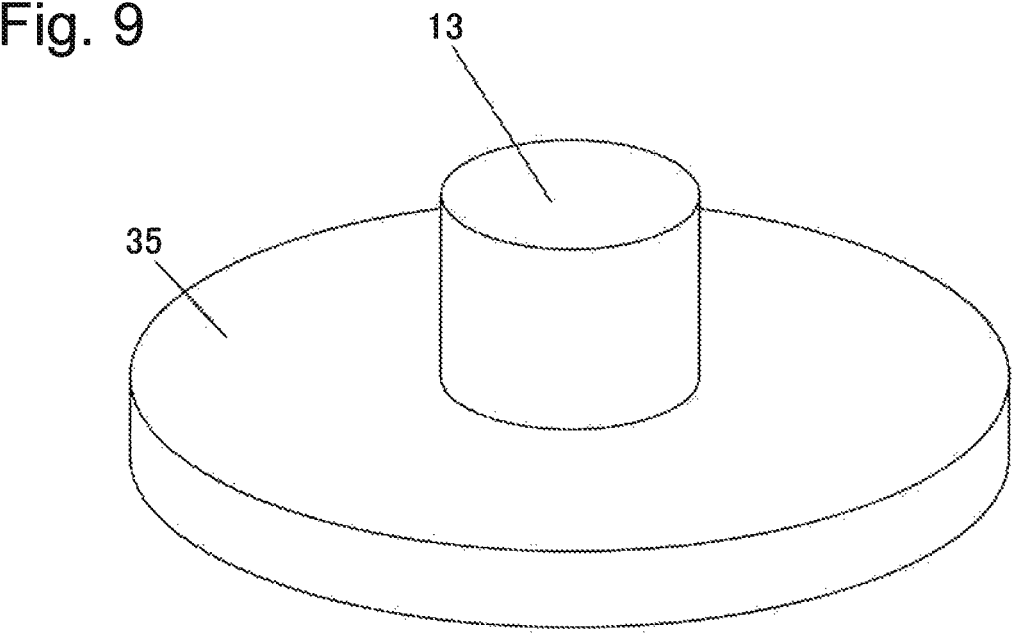
FIG. 9 is a conceptual view (no. 1) illustrating a method of forming a dielectric material on a surface of a ferrimagnetic material.

First, as illustrated in FIG. 9, the ferrimagnetic material 13 processed into a predetermined shape is placed on a turntable 35. In FIG. 9, a case in which the ferrimagnetic material 13 having a columnar shape is placed is illustrated.

Figure 10:
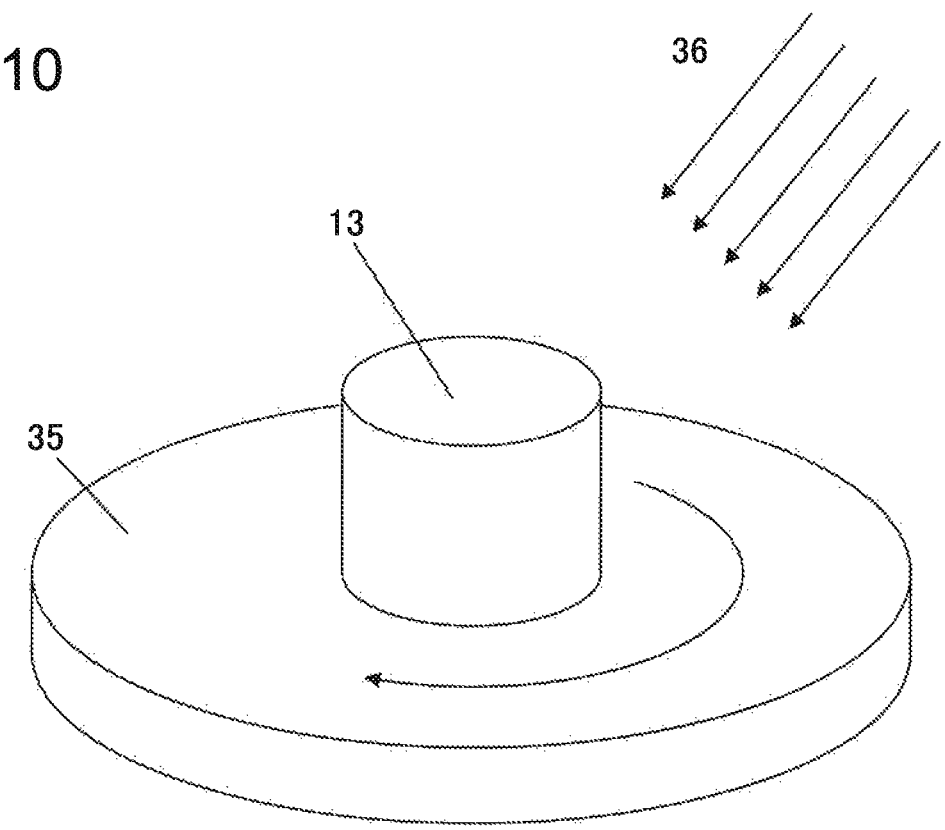
FIG. 10 is a conceptual view (no. 2) illustrating a method of forming a dielectric material on a surface of a ferrimagnetic material.

Next, as illustrated in FIG. 10, spray 36 toward the ferrimagnetic material 13 is performed while rotating the turntable 35, with a predetermined angle relative to the ferrimagnetic material 13, by using liquid dissolving or mixing the dielectric material 30.

Figure 11:
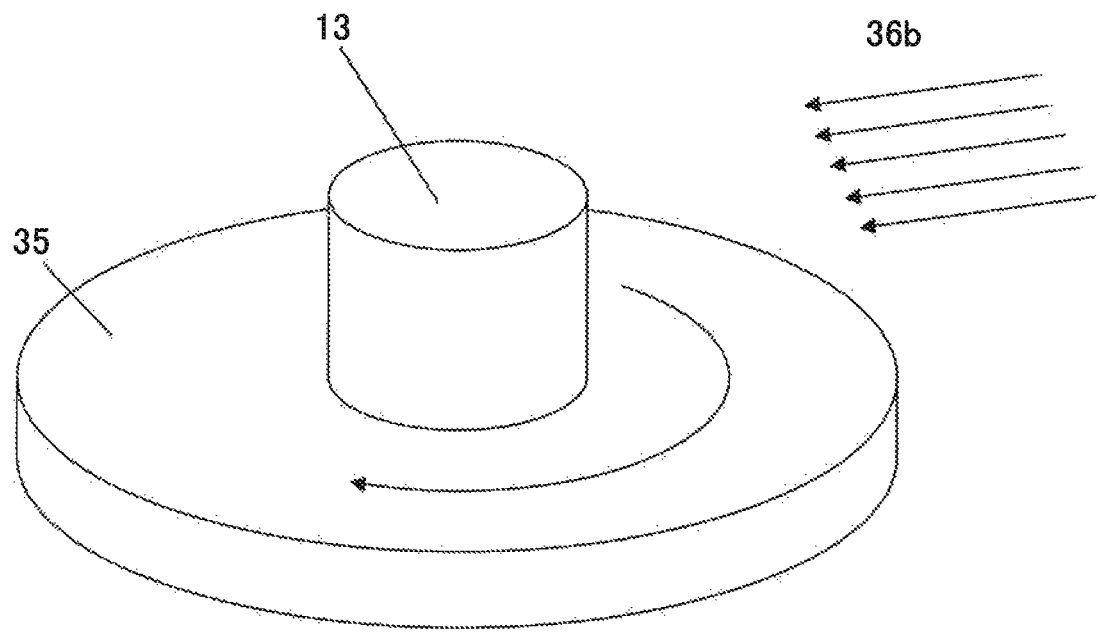
FIG. 11 is a conceptual view (no. 3) illustrating a method of forming a dielectric material on a surface of a ferrimagnetic material.

If more spray is desired to be performed on a side face than on an upper face of the ferrimagnetic material 13, spray 36b with a smaller angle formed by a direction of the spray and an upper face of the turntable 35 may be performed, as illustrated in FIG. 11.

Figure 12:
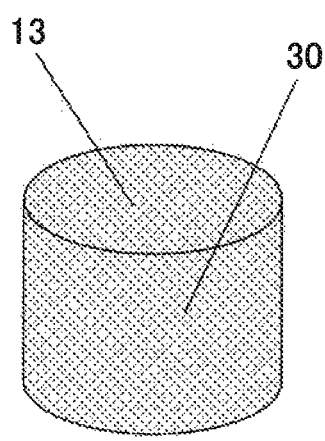
FIG. 12 is a conceptual view (no. 4) illustrating a method of forming a dielectric material on a surface of a ferrimagnetic material.

Then, the liquid used for dissolving or mixing the dielectric material 30 is subjected to evaporation or the like. Accordingly, as illustrated in FIG. 12, a ferrimagnetic material 23 having the dielectric material 30 formed on a surface of the ferrimagnetic material 13 is manufactured.

In the above, description has been given about a case in which spray is performed while rotating the ferrimagnetic material 13. However, spray may be performed while moving a device for performing the spray. In addition, spray may be performed while rotating the ferrimagnetic material 13 and moving a device for performing the spray simultaneously.

As the dielectric material 30, a material that is liquid at a time of spray and is cured afterwards may be used. Such a material is, for example, a resin that is cured by light, and a resin that is cured by a chemical reaction involved in mixing of two kinds of liquid.

The dielectric material 30 may be coated on a surface of the ferrimagnetic material 13 by using, instead of spray, sputtering or vapor deposition in a vacuum vessel, a chemical vapor deposition method, and the like. A dielectric material in this case is, for example, a silicon oxide, a silicon nitride, a metal oxide, a metal nitride, or a mixture thereof.

Next, an example of a method of manufacturing the conductive body cover 14 will be described.

Figure 13:
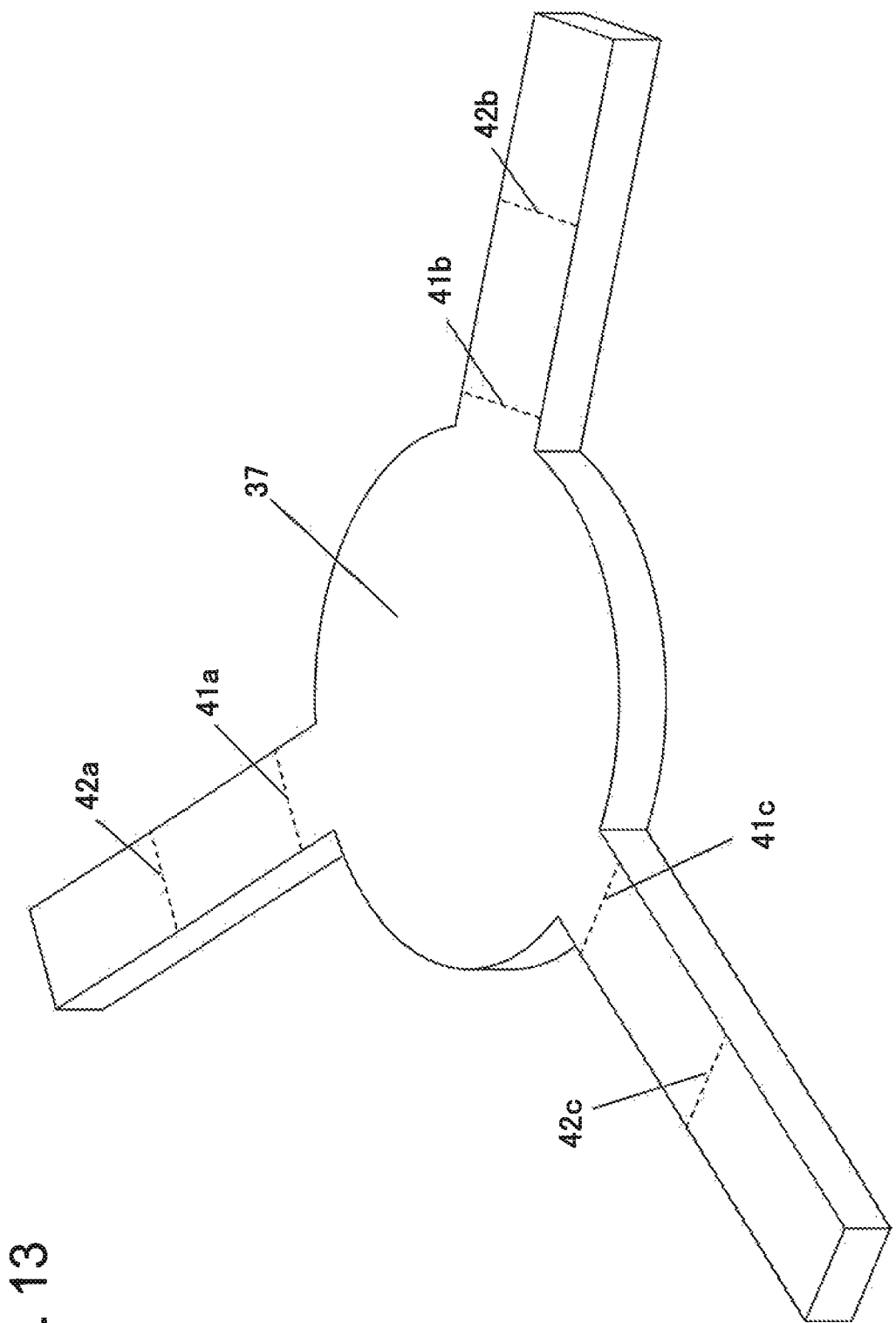
FIG. 13 is a conceptual view (no. 1) illustrating an example of a method of manufacturing a conductive body cover.
Figure 14:
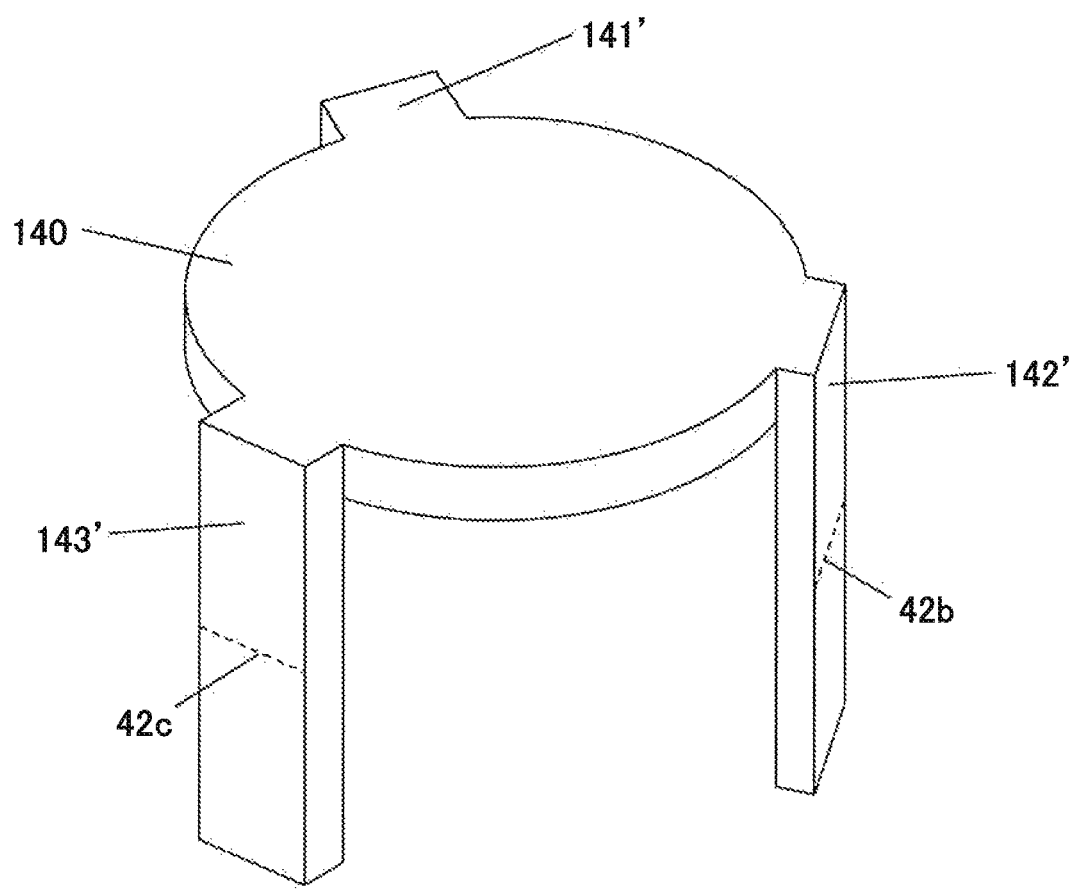
FIG. 14 is a conceptual view (no. 2) illustrating an example of a method of manufacturing a conductive body cover.
Figure 15:
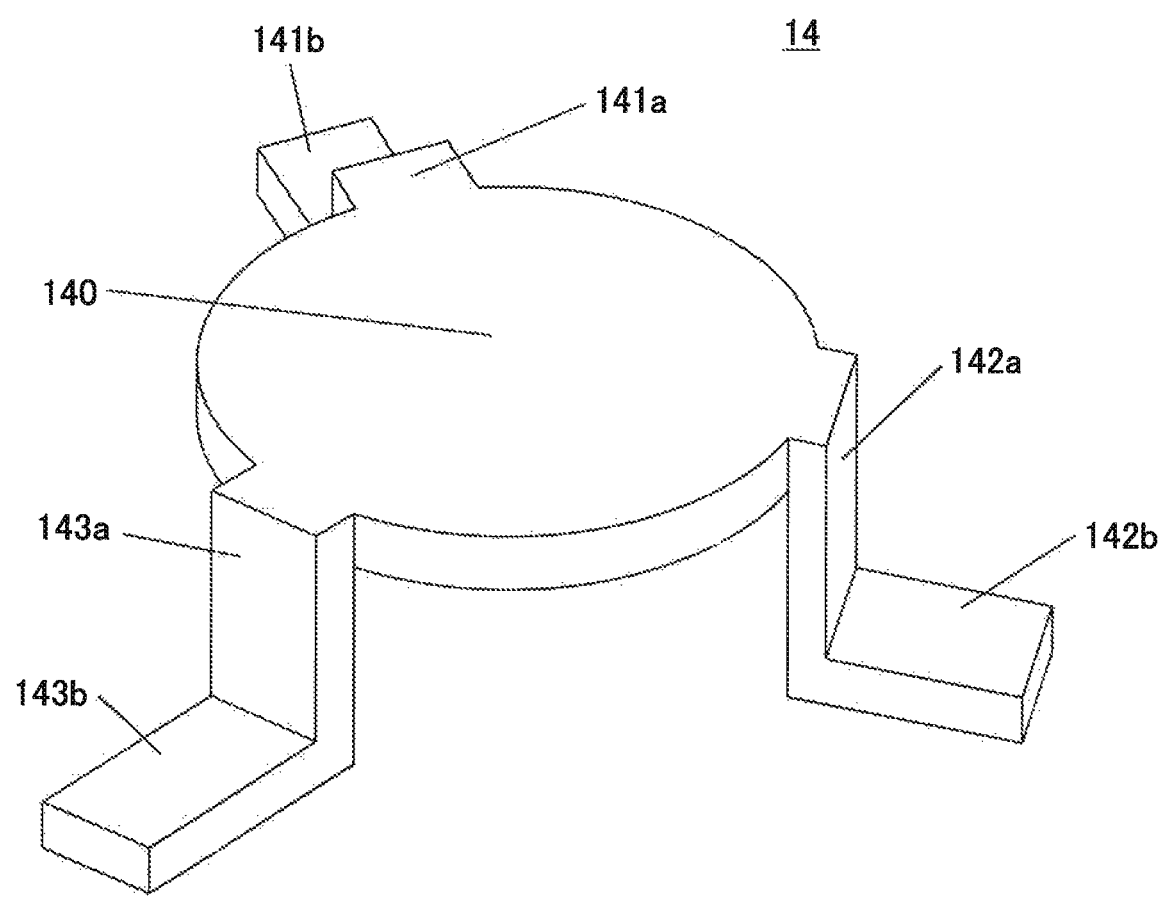
FIG. 15 is a conceptual view (no. 3) illustrating an example of a method of manufacturing a conductive body cover.

FIGS. 13 to 15 are conceptual views each illustrating an example of a method of manufacturing the conductive body cover 14.

First, a metal plate is cut to create, for example, a metal member 37 having a shape as illustrated in FIG. 13. On the metal member 37, positions of first bending parts 41a, 41b, and 41c to be bent first in a subsequent process, and positions of second bending parts 42a, 42b, and 42c to be bent thereafter are assumed in advance.

Next, the first bending parts 41a, 41b, and 41c of the metal member 37 are bent as illustrated in FIG. 14. For the bending illustrated in FIG. 14, a method such as press processing is used. By the bending illustrated in FIG. 14, a member illustrated in FIG. 14 is formed. The member illustrated in FIG. 14 is a member including the conductive body cover 14, and conductive body cover side foot parts 141', 142', and 143' that are portions to be the conductive body cover side parts 141a, 142a, and 143a and the conductive body cover foot parts 141b, 142b, and 143b by a subsequent processing.

Then, by bending the second bending parts 42a, 42b, and 42c by pressing and the like, the conductive body cover 14 as illustrated in FIG. 15 is manufactured.

Next, a method of manufacturing the non-reciprocal circuit element 10 with use of the coated ferrimagnetic material 23 and the conductive body cover 14 which are manufactured by the above-described processes will be described.

FIGS. 16 to 23 are top views each illustrating an image of a method of manufacturing the non-reciprocal circuit element 10.

Figure 16:
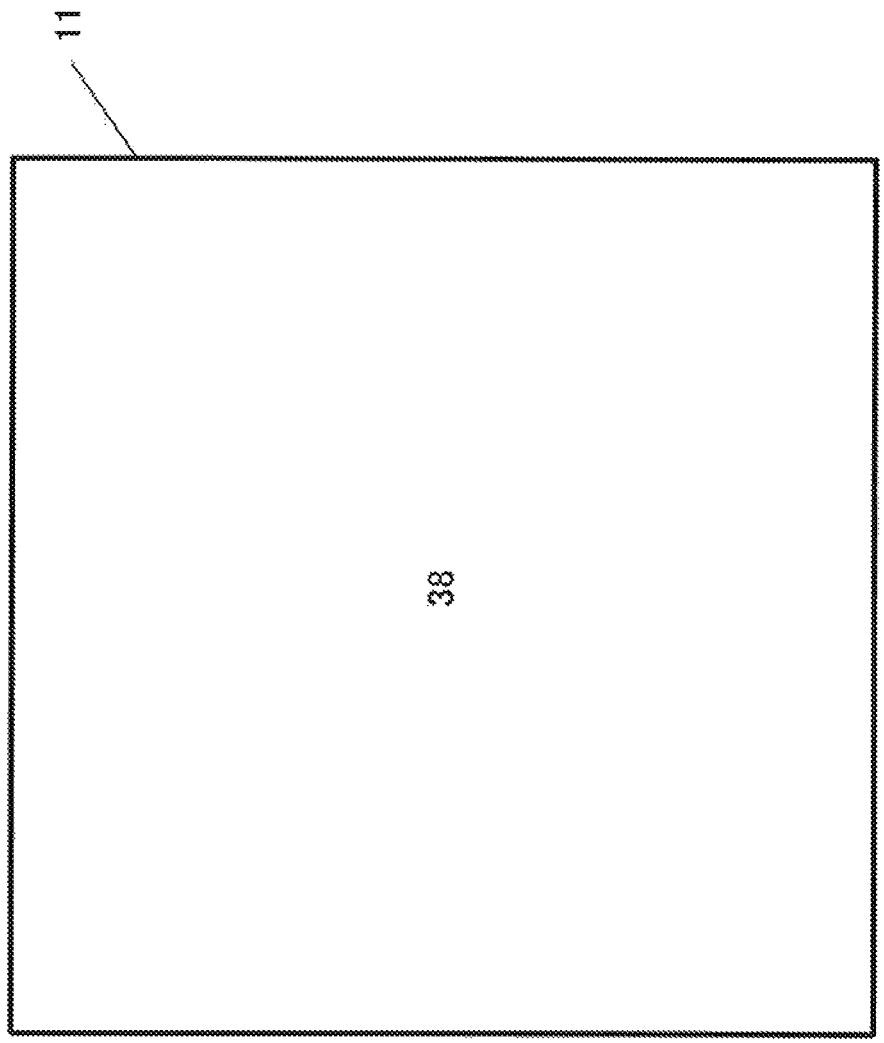
FIG. 16 is a top view (no. 1) illustrating an image of a method of manufacturing a non-reciprocal circuit element.

First, as illustrated in FIG. 16, the substrate 11 is placed. In FIG. 16, an upper face 38 of the substrate 11 is illustrated.

Figure 17:
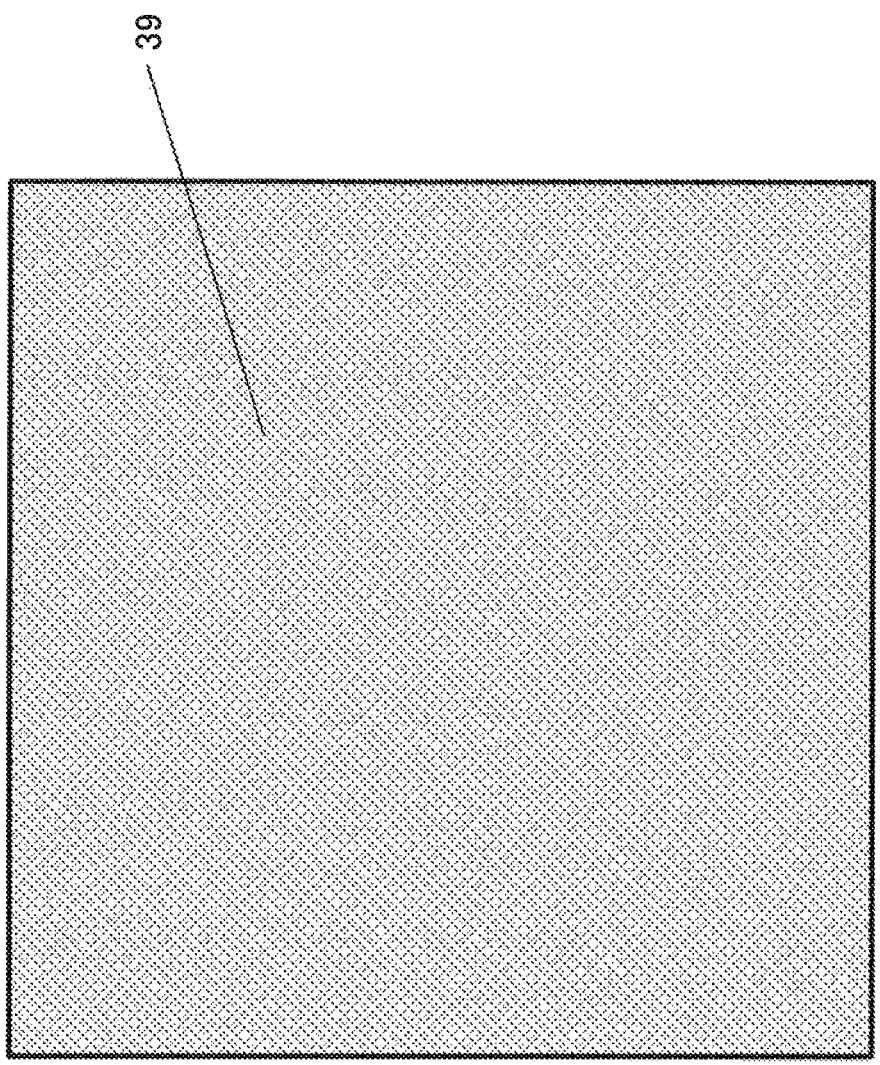
FIG. 17 is a top view (no. 2) illustrating an image of a method of manufacturing a non-reciprocal circuit element.

Next, as illustrated in FIG. 17, a conductive material 39 is formed on the upper face 38 of the substrate 11. The conductive material 39 is typically a metal material, and may be formed by, for example, plating, coating, and bonding of a thin plate.

Figure 18:
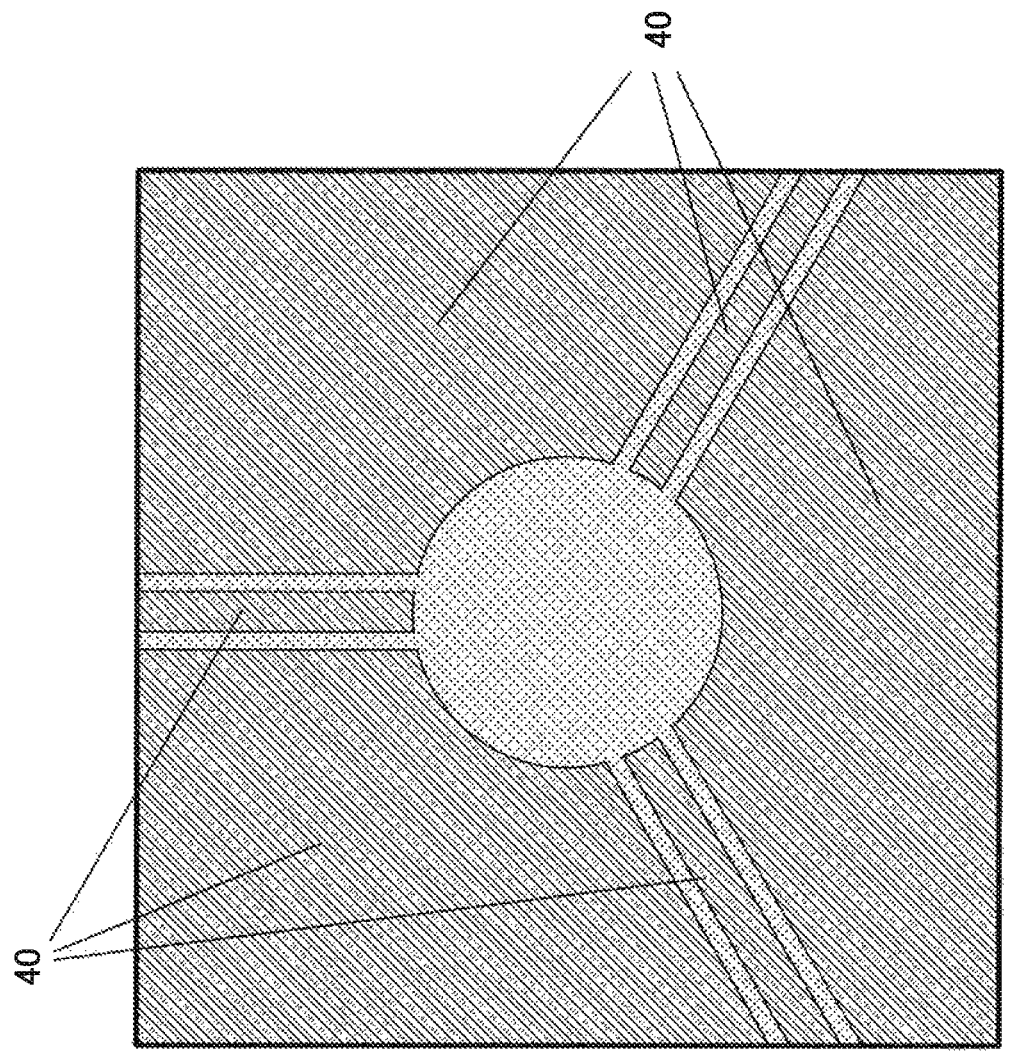
FIG. 18 is a top view (no. 3) illustrating an image of a method of manufacturing a non-reciprocal circuit element.

Then, as illustrated in FIG. 18, a patterned mask material 40 is formed on an upper part of the conductive material 39. The mask material 40 is typically a resin. The mask material 40 may be formed by, for example, coating, printing, and the like on the pattern shape.

Figure 19:
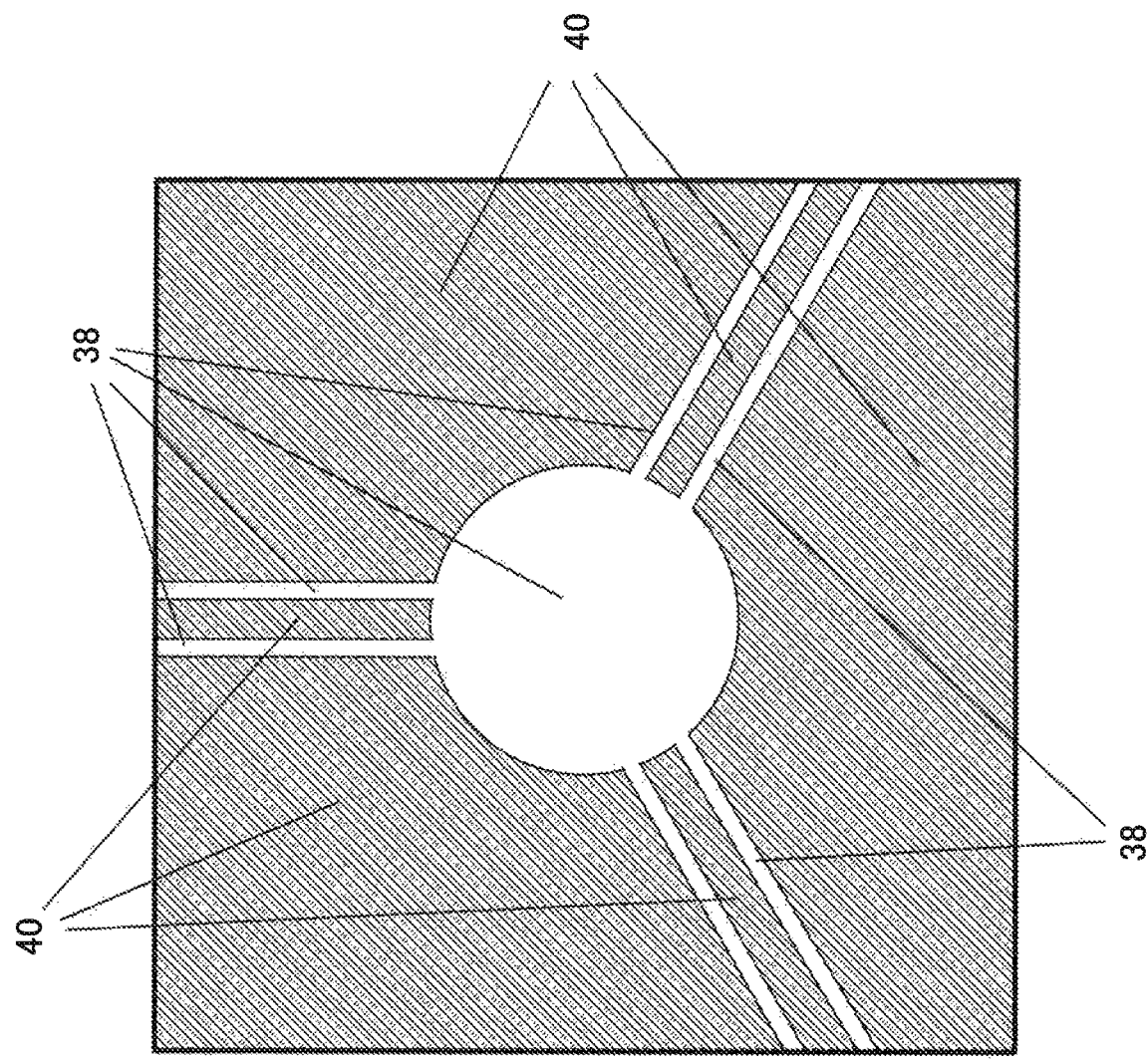
FIG. 19 is a top view (no. 4) illustrating an image of a method of manufacturing a non-reciprocal circuit element.

Next, as illustrated in FIG. 19, a process of removing the conductive material 39 at a portion where a pattern of the mask material 40 is not formed is performed. A representative process thereof is a process of immersing in a solution that dissolves the conductive material 39. The solution is typically an acid and an alkali when the conductive material 39 is a metal.

Figure 20:
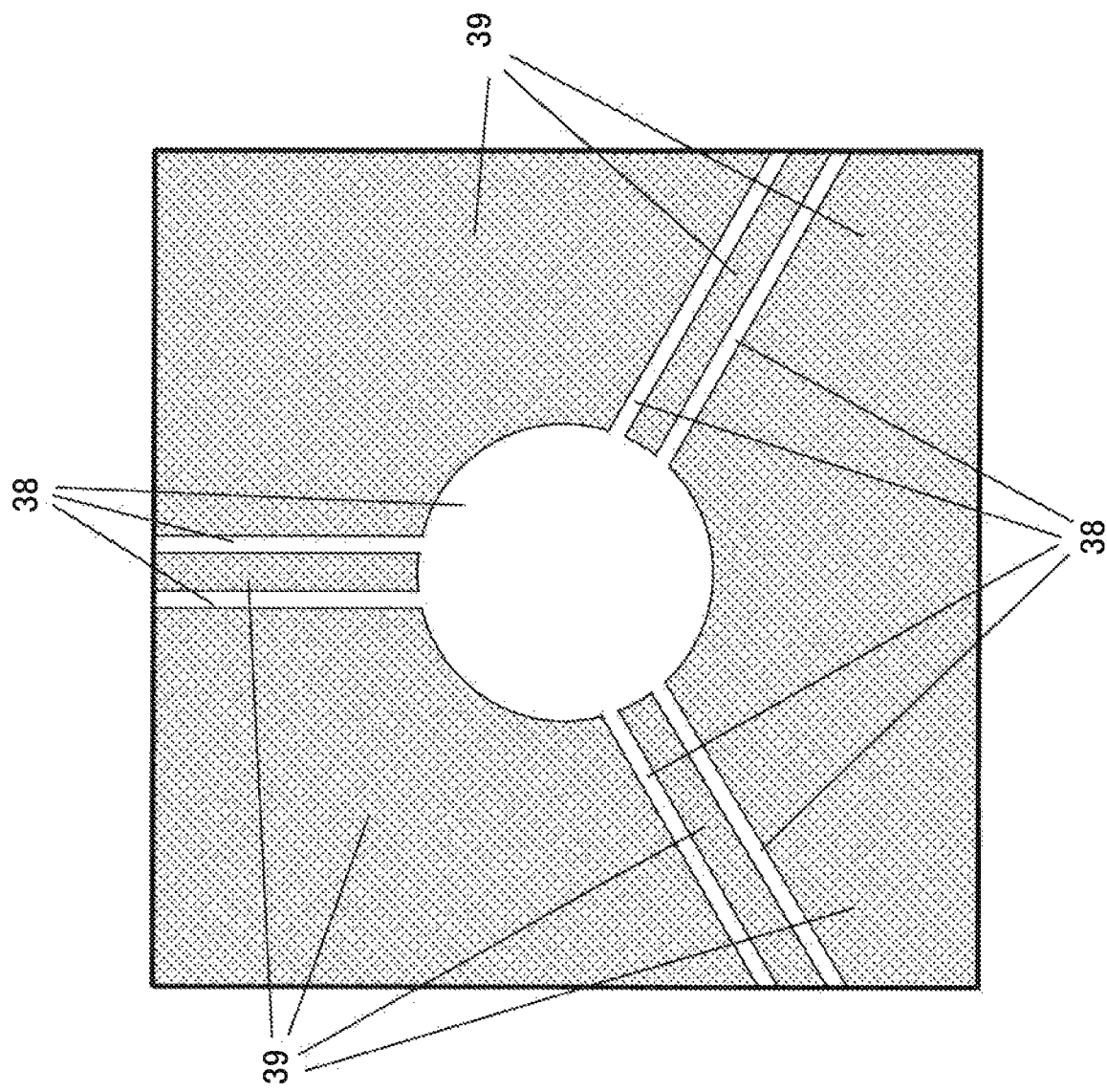
FIG. 20 is a top view (no. 5) illustrating an image of a method of manufacturing a non-reciprocal circuit element.

Then, a process of removing the mask material 40 is performed. The process is typically a process of immersing in a solution that easily dissolves the mask material 40 and hardly dissolves the conductive material 39. In this way, when the mask material 40 is removed, a pattern of the conductive material 39 as illustrated in FIG. 20 is formed on the upper face 38 of the substrate 11.

Figure 21:
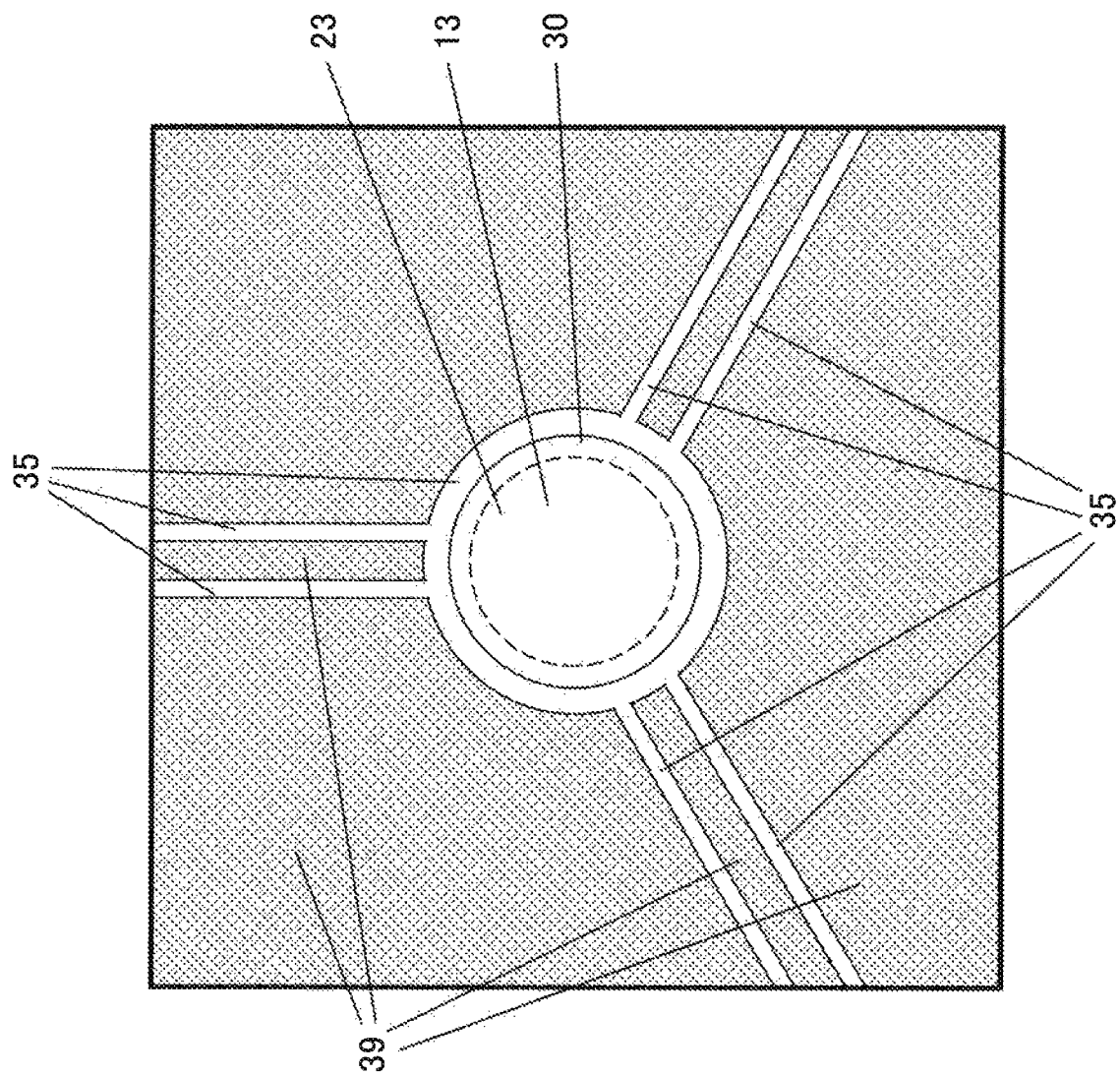
FIG. 21 is a top view (no. 6) illustrating an image of a method of manufacturing a non-reciprocal circuit element.

Next, as illustrated in FIG. 21, the coated ferrimagnetic material 23 manufactured in advance is placed on a substantially circular portion in a vicinity of a center of FIG. 21 where the pattern of the conductive material 39 is not formed. In FIG. 21, a portion illustrated with a circle of a dotted line is the ferrimagnetic material 13, and a portion between the circle illustrated with the dotted line and a circle being larger by one than the circle and illustrated with a solid line in FIG. 21 is the dielectric material 30. The coated ferrimagnetic material 23 is fixed to the above-described substantially circular portion by means of an adhesive and the like.

Figure 22:
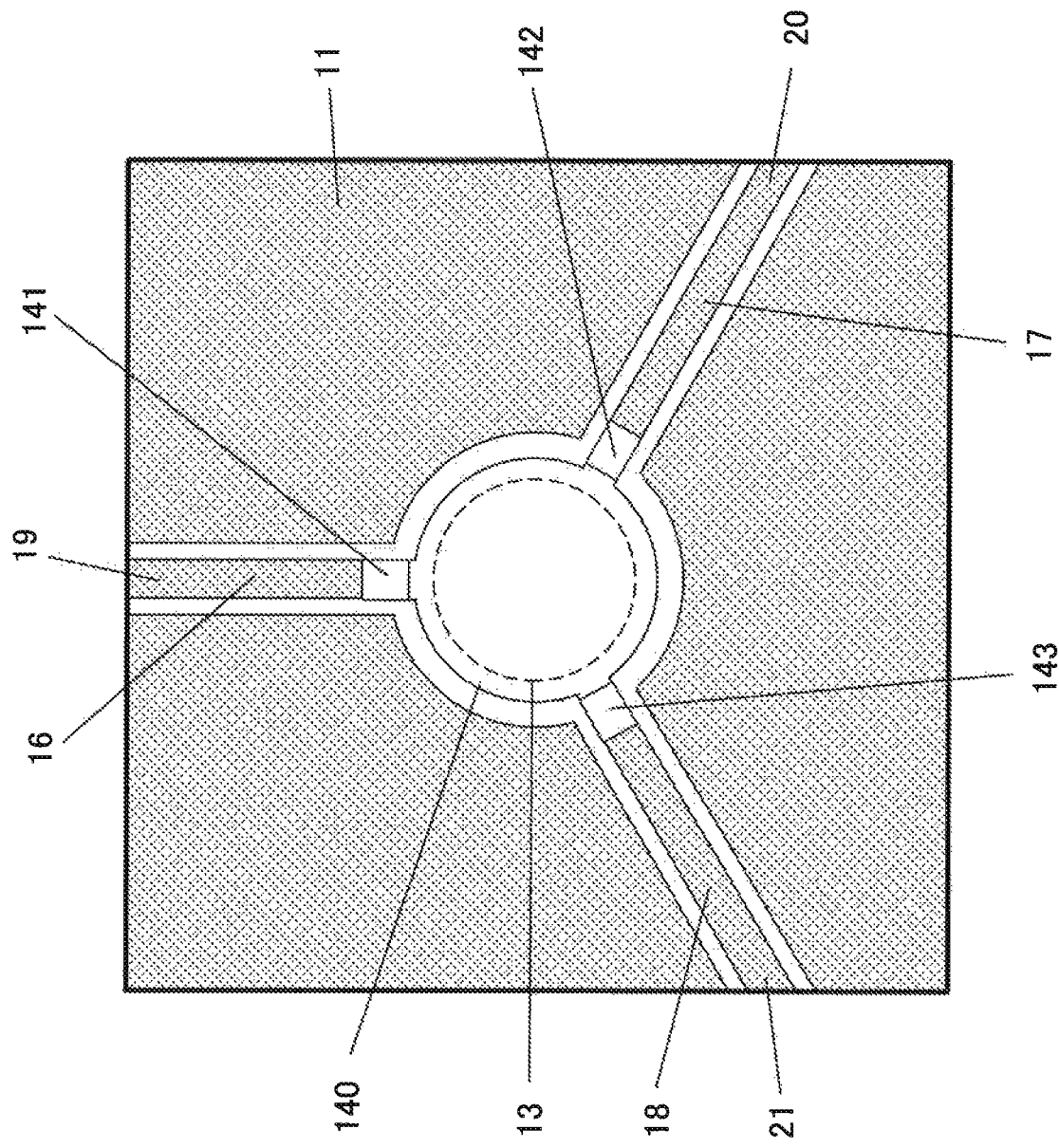
FIG. 22 is a top view (no. 7) illustrating an image of a method of manufacturing a non-reciprocal circuit element.

Then, as illustrated in FIG. 22, the conductive body cover 14 manufactured in advance is placed in such a way as to cover the coated ferrimagnetic material 23. At this time, the conductive body cover foot parts 141b, 142b, and 143b are respectively fixed to the corresponding transmission lines 16 to 18 in an electrically connected manner. This fixing may be performed by, for example, soldering between the conductive body cover foot parts 141b, 142b, and 143b and the transmission lines 16 to 18.

Figure 23:
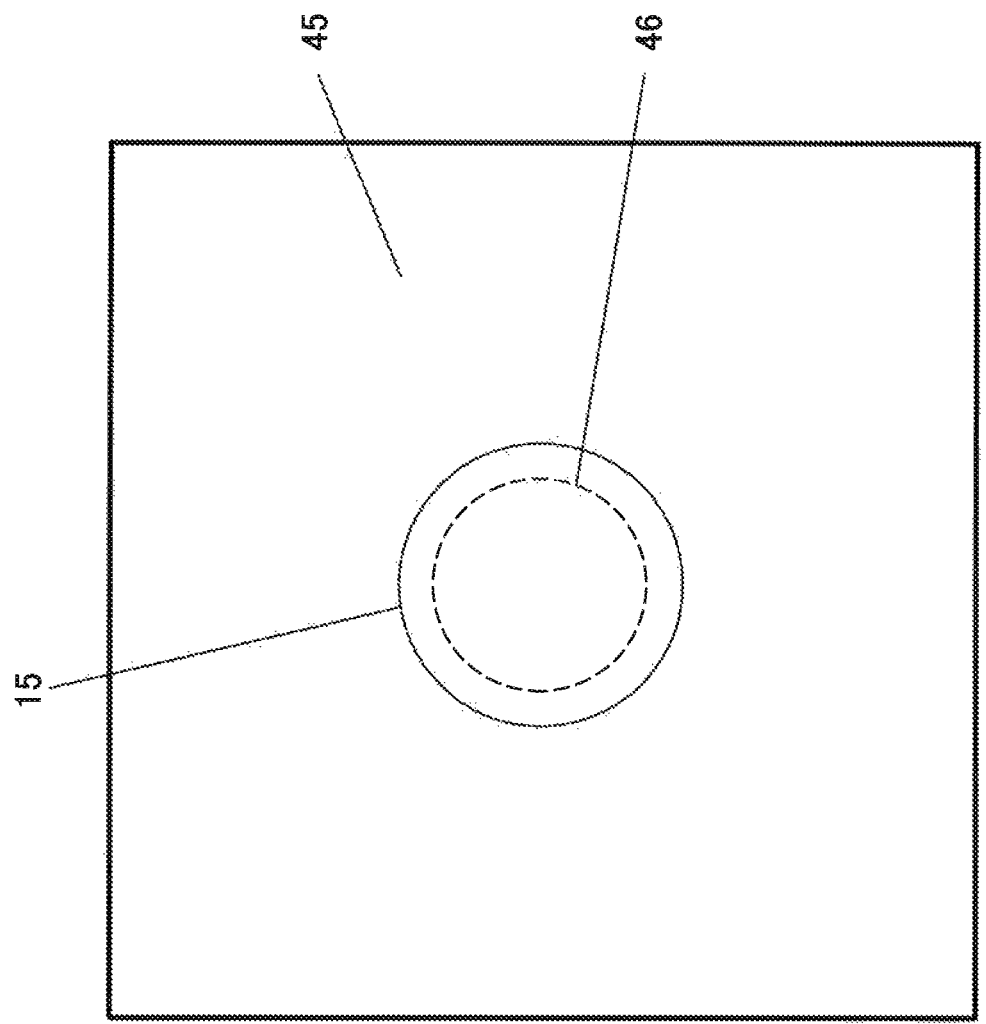
FIG. 23 is a top view (no. 8) illustrating an image of a method of manufacturing a non-reciprocal circuit element.

Next, as illustrated in FIG. 23, the magnet 15 is placed on a portion of a lower face 45 of the substrate 11, opposing the coated ferrimagnetic material 23 already placed on the upper face of the substrate 11. The magnet 15 is fixed to the lower face 45 by means of, for example, an adhesive.

In this way, the non-reciprocal circuit element 10 illustrated in FIGS. 1 to 3 is manufactured.

The above description has been given by using a case in which a non-reciprocal circuit element is a three-port circulator as an example. The configuration according to the first example embodiment in which a dielectric material is placed on a ferrimagnetic material can be also applied to other non-reciprocal circuit elements as long as the non-reciprocal circuit element has a similar configuration. The configuration is applicable to, for example, a circulator having two, four, or more ports in number, and an isolator.

Figure 24:
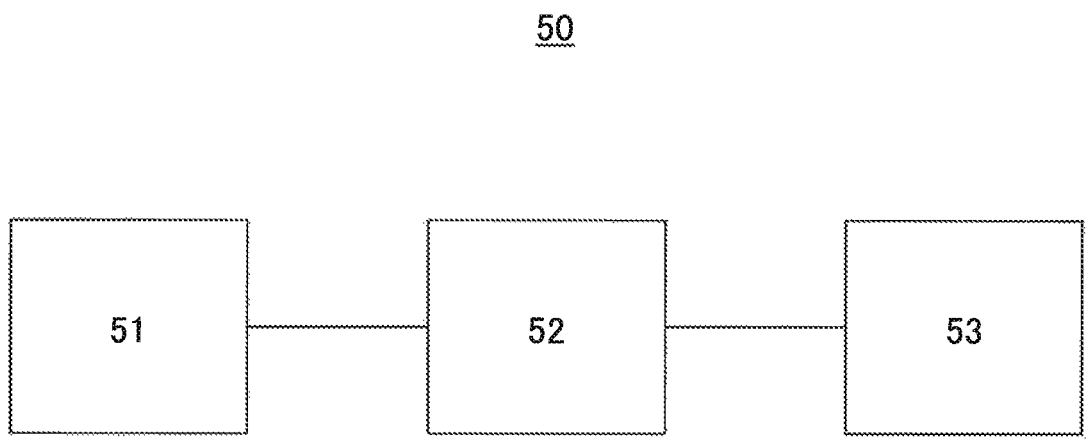
FIG. 24 is a conceptual view illustrating a communication device according to the present example embodiment.

FIG. 24 is a conceptual view illustrating a communication device according to the first example embodiment.

A communication device 50 according to the first example embodiment includes a sending circuit 51, a transferring circuit 52, and a receiving circuit 53.

The sending circuit 51 sends a high frequency signal to the transferring circuit 52.

The transferring circuit 52 includes any of the non-reciprocal circuit elements described in the first example embodiment, and sends the high frequency signal sent from the sending circuit 51 to the receiving circuit 53 via the non-reciprocal circuit element.

The receiving circuit 53 receives the high frequency signal sent from the transferring circuit 52.

Advantageous Effect

The non-reciprocal circuit element according to the first example embodiment forms a dielectric material made of a dielectric body on at least a side part of a ferrimagnetic material. Then, a structure is made such that a conductive body cover side part that is a portion of a conductive body cover, opposing the side part is brought into substantial contact with the coated dielectric body. Consequently, a positional relationship between a conductive body cover upper part and a ferrimagnetic material upper part becomes a correct positional relationship as designed, with a satisfactory reflection characteristic and isolation of a non-reciprocal circuit element.

As described above, the non-reciprocal circuit element according to the first example embodiment is able to suppress variation in a reflection characteristic and isolation, by suppressing variation in a distance between a ferrimagnetic material and a conductive body cover side part.

Second Example Embodiment

A second example embodiment is an example embodiment relating to a non-reciprocal circuit element in which a side part of a metal cover is brought into contact with a dielectric body formed on a ferrimagnetic material side part.

First, a case of a three-port circulator will be described as an example of the non-reciprocal circuit element.
[Configuration]

Figure 25:
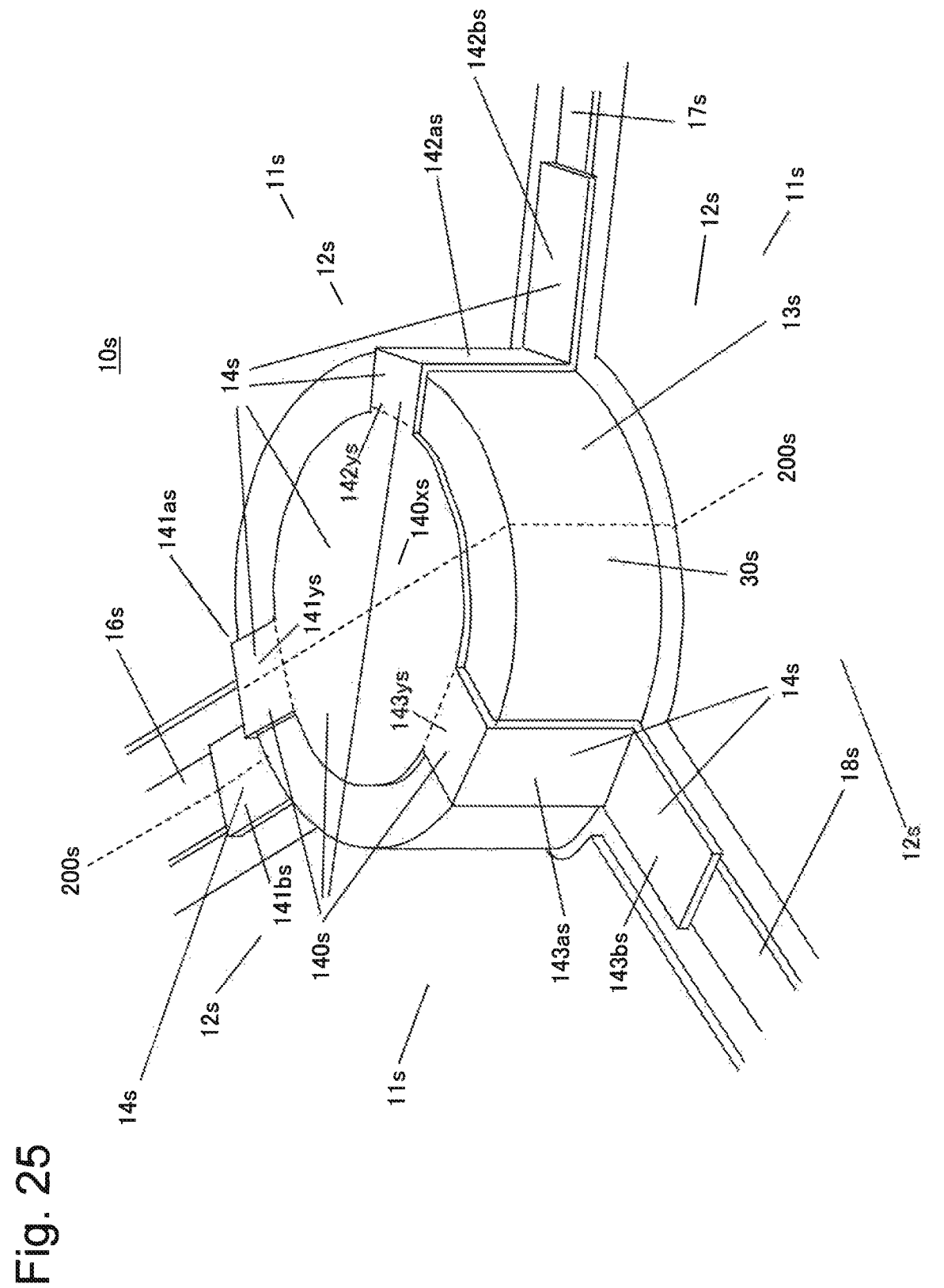
FIG. 25 is a perspective conceptual view illustrating a structure of a non-reciprocal circuit element according to a second example embodiment.
Figure 26:
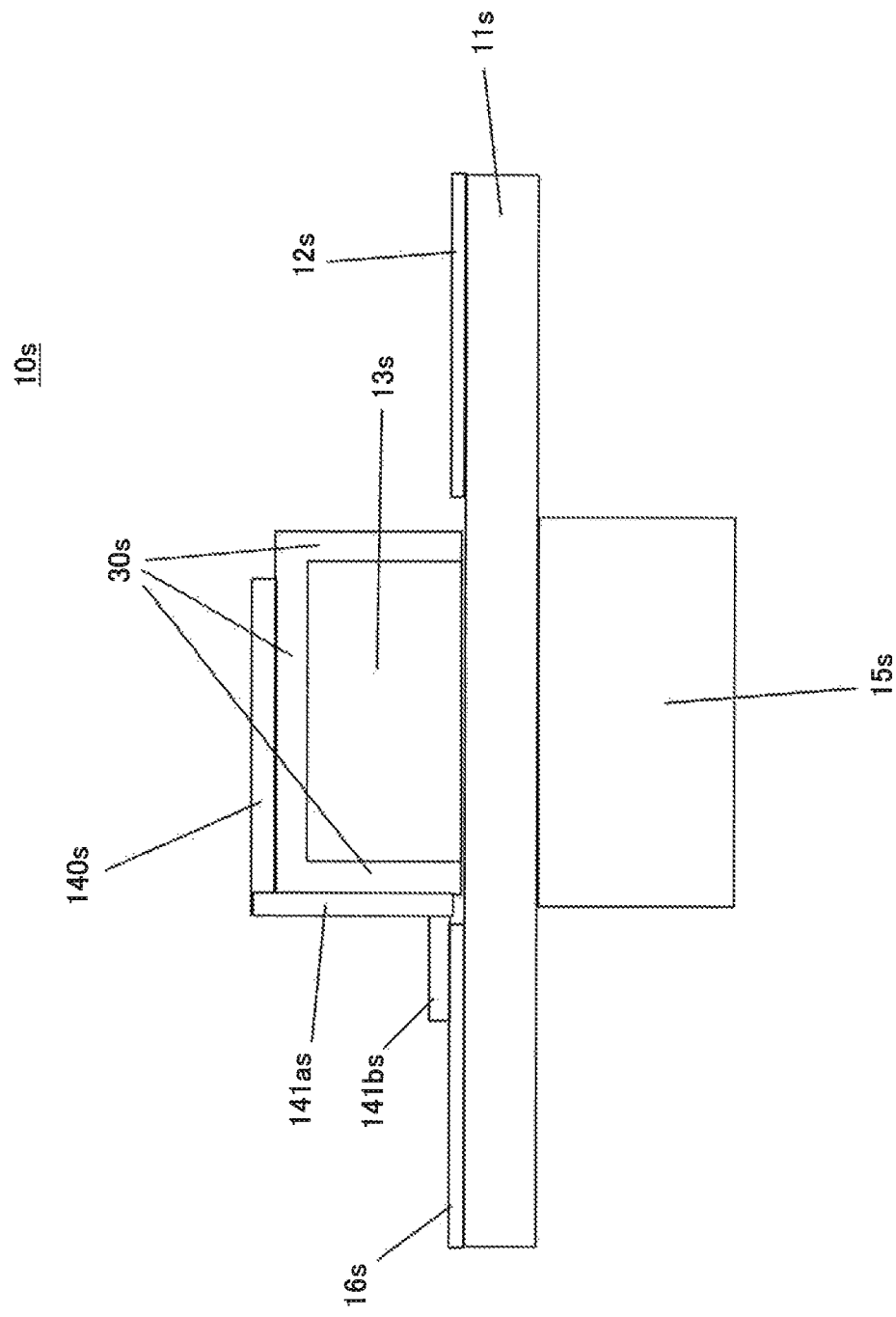
FIG. 26 is a sectional conceptual view illustrating a structure of the non-reciprocal circuit element according to the second example embodiment.
Figure 27:
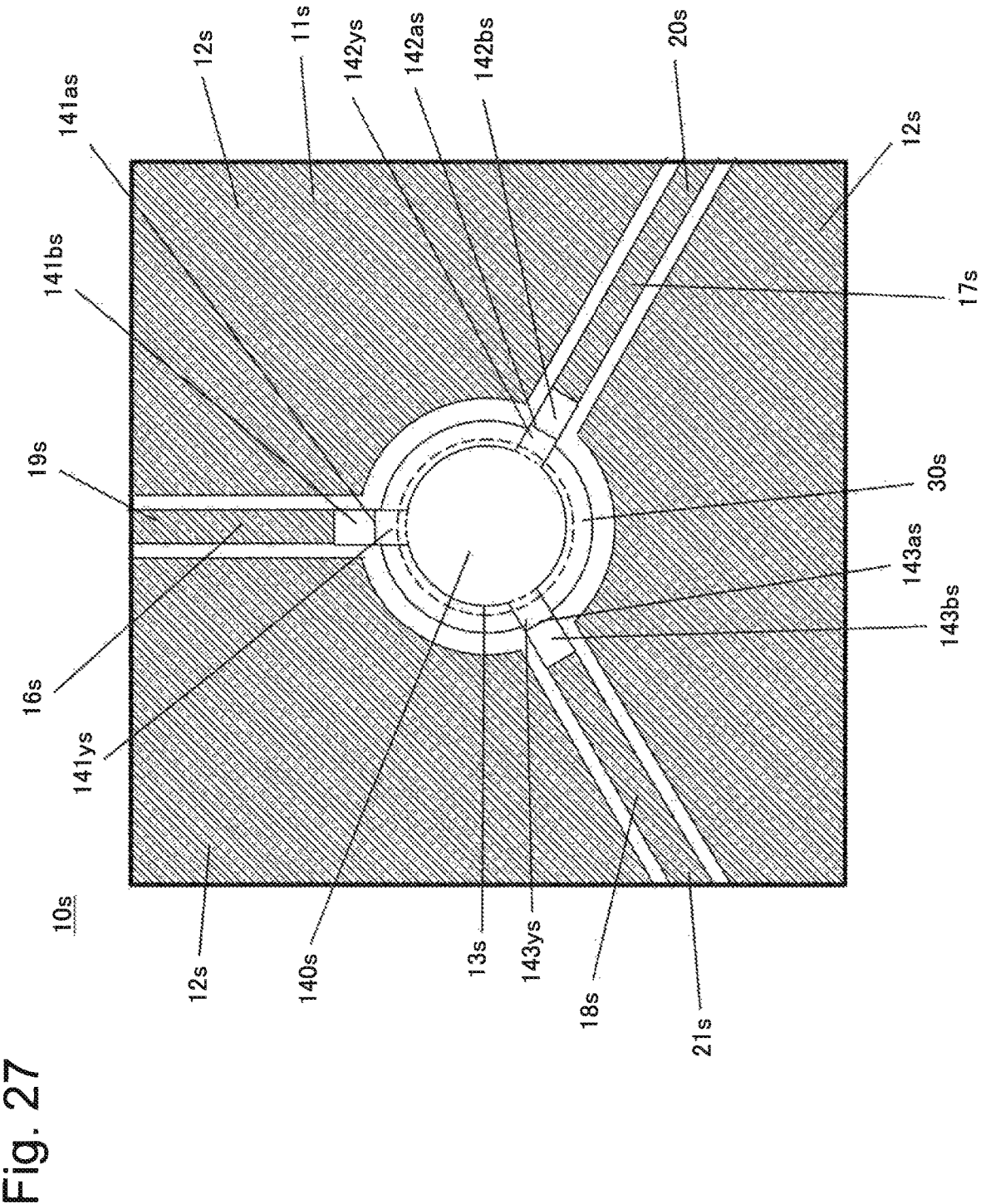
FIG. 27 is a top conceptual view illustrating a structure of the non-reciprocal circuit element according to the second example embodiment.

FIG. 25 is a perspective conceptual view illustrating a structure of a non-reciprocal circuit element 10s according to the second example embodiment, and FIG. 26 is a sectional conceptual view of the non-reciprocal circuit element 10s when it is assumed that the non-reciprocal circuit element 10 is cut along a cutting line 200s in a sectional view illustrated in FIG. 25. In addition, FIG. 27 is a top conceptual view of the non-reciprocal circuit element 10s.

The non-reciprocal circuit element 10s is provided on a substrate 11s on which a pattern 12s, and transmission lines 16s, 17s, and 18s are formed. The non-reciprocal circuit element 10s is a three-port circulator that includes a ferrimagnetic material 13s, a conductive body cover 14s, and a magnet 15s.

In the non-reciprocal circuit element 10s, the ferrimagnetic material 13s has a dielectric material 30s formed on at least a side part and an upper part thereof.

The conductive body cover 14s includes a conductive body cover upper part 140s, conductive body cover side parts 141as, 142as, and 143as, and conductive body cover foot parts 141bs, 142bs, and 143bs. The conductive body cover upper part 140s, the conductive body cover side parts 141as, 142as, and 143as, and the conductive body cover foot parts 141bs, 142bs, and 143bs are electrically connected with one another. The conductive body cover upper part 140s is a conductive body formed on an upper part of the ferrimagnetic material 13s with the dielectric material 30s therebetween. The conductive body cover side parts 141as, 142as, and 143as are conductor bodies formed on the ferrimagnetic material 13s with the dielectric material 30s therebetween. The conductive body cover foot parts 141bs, 142bs, and 143bs are conductor bodies formed on the substrate 11s.

The magnet 15s is provided on a face (hereinafter, referred to as a "lower face") of the substrate 11s, on a side opposite to a mounting face (hereinafter, referred to as an "upper face") of the ferrimagnetic material 13s. The magnet 15s applies a magnetic field to the ferrimagnetic material 13s.

In the following, each configuration of the non-reciprocal circuit element 10s will be described in detail. The substrate 11s is a dielectric body substrate on which the non-reciprocal circuit element 10s is mounted, and is typically a printed circuit board (PCB) that is configured by laminating multiple layers of dielectric layers and metal layers. Note that a substrate on which the non-reciprocal circuit element 10s is mounted is not limited to the PCB, but may be a substrate having another configuration.

The pattern 12s is a conductor pattern that is formed on the upper face of the substrate 11s and the lower face of the substrate 11s. The pattern 12s has a signal line and a ground pattern. The pattern 12s is not formed on a center part of the upper face of the substrate 11s (in other words, at a part where the ferrimagnetic material 13s is mounted), but is in a pattern-interrupted state (a punched pattern).

The ferrimagnetic material 13s has a columnar shape, and is arranged on the center part (on the punched pattern) of the upper face of the substrate 11s. The ferrimagnetic material 13s is positioned between the substrate 11s and the conductive body cover 14s. The ferrimagnetic material 13s is a ferrimagnetic body having ferrimagnetism, and is, for example, a substance such as Yttrium iron garnet (YIG), Barium ferrite, and Strontium ferrite. Note that a substance to be arranged on the center part of the upper face of the substrate 11 is not limited to ferrite, as long as the substance is a ferrimagnetic body that has ferrimagnetism and generates a gyromagnetic effect to be described later.

A shape of the ferrimagnetic material 13s may not necessarily be columnar.

Figure 28:
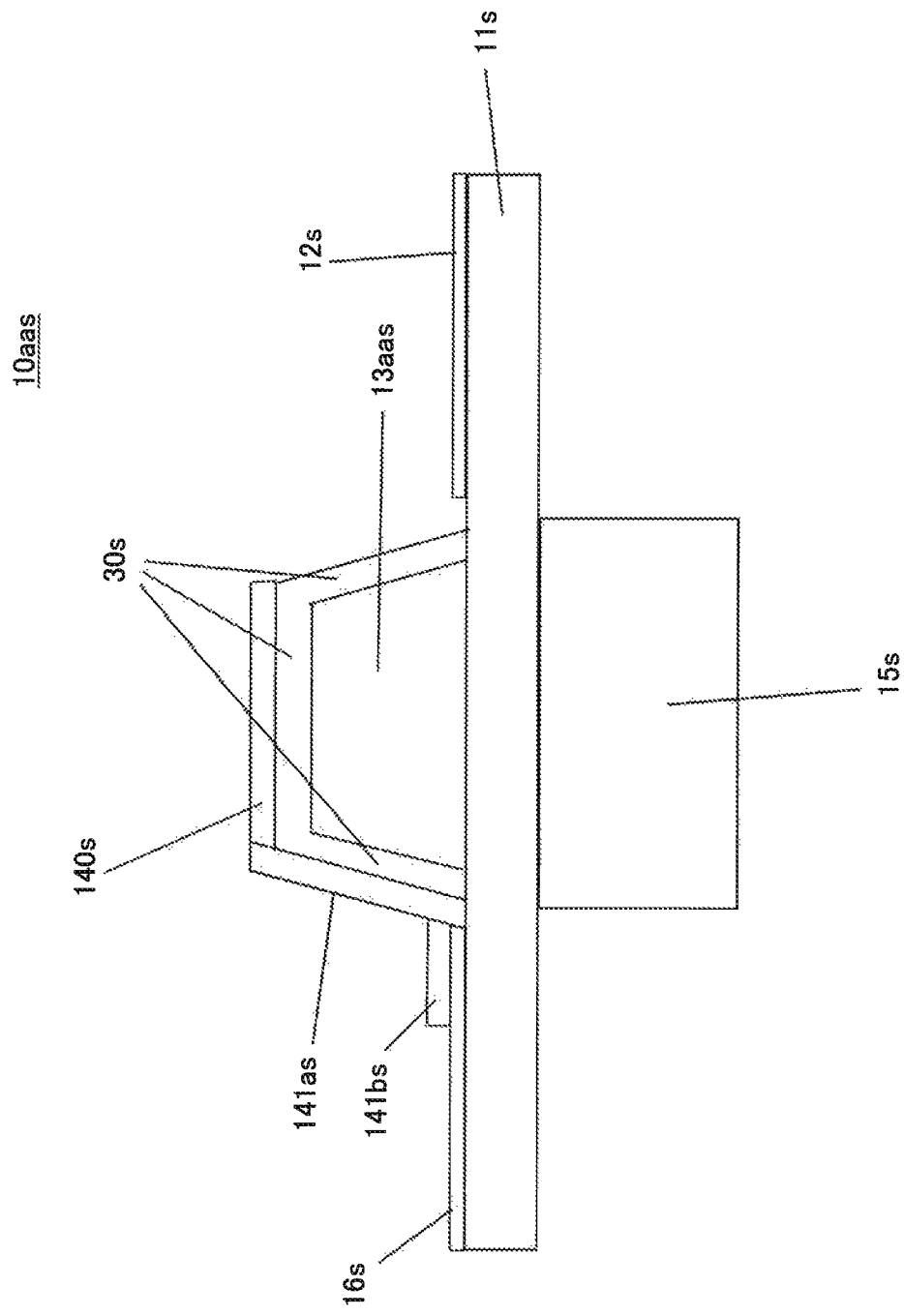
FIG. 28 is a top conceptual view illustrating a structure of a non-reciprocal circuit element (no. 1) having a deviated portion.
Figure 29:
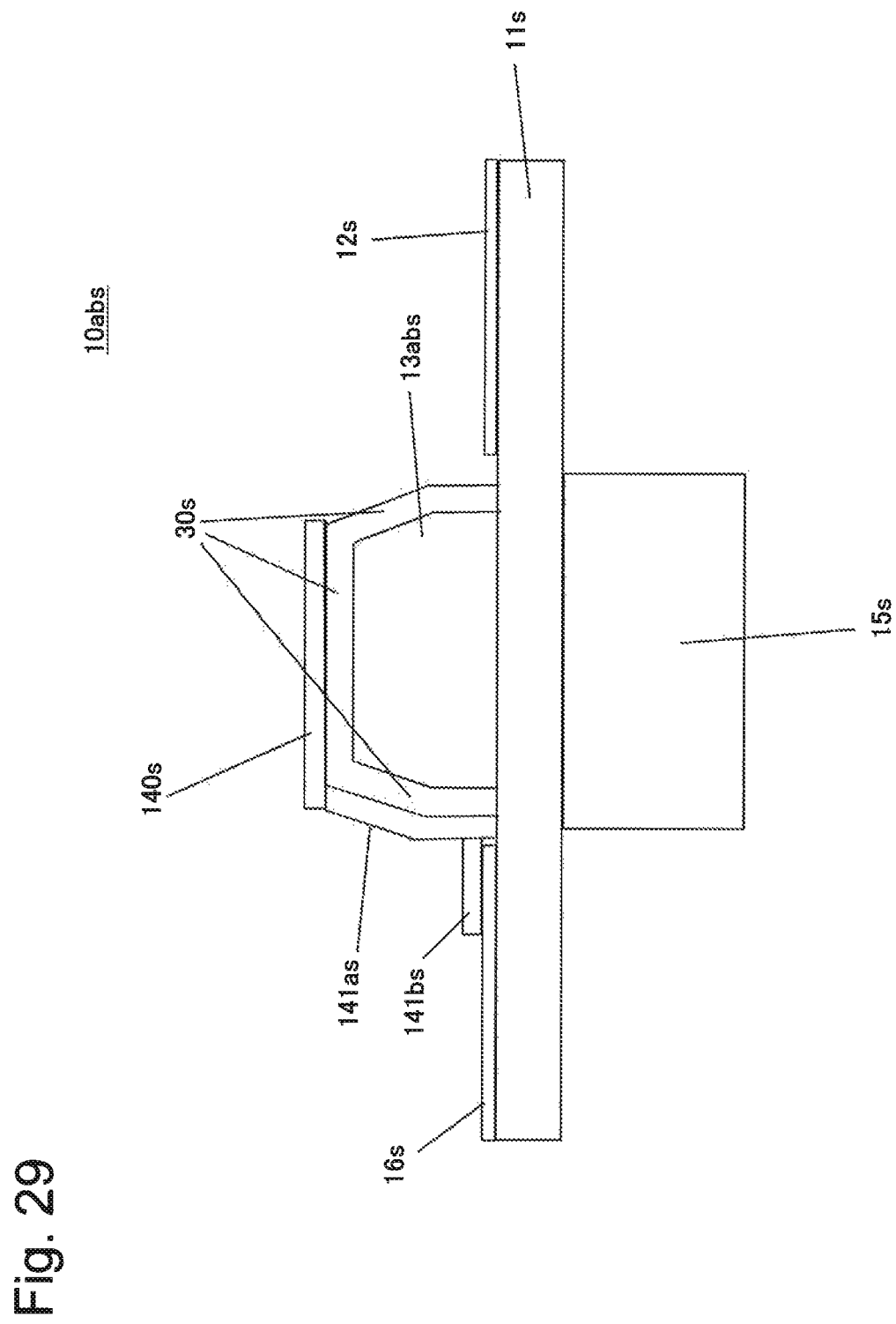
FIG. 29 is a top conceptual view illustrating a structure of a non-reciprocal circuit element (no. 2) having a deviated portion.

For example, a shape of the ferrimagnetic material 13s may be, for example, a shape whose area of a lower face is larger than that of an upper face, as illustrated in FIGS. 28 and 29. In a case of a ferrimagnetic material 13aas illustrated in FIG. 28 or a ferrimagnetic material 13abs illustrated in FIG. 29, a portion deviated from a perpendicular direction with respect to a face of the substrate 11s (hereinafter simply referred to as a "deviated portion") is present on the side face. The presence of the deviated portion is the same as in a surface of the dielectric material 30s formed on the side face of the ferrimagnetic material. In manufacturing of the non-reciprocal circuit element according to the second example embodiment, as will be described later (for example, in FIG. 60), the manufacturing process may include spraying a liquid ejection substance to a dielectric material formed on a side face of a ferrimagnetic material. In the case, when an up-and-down direction of the ferrimagnetic material (where it is assumed that a direction of gravity is down) at a time of spraying is an up-and-down direction when facing the drawings in FIGS. 28 and 29, spraying to the deviated portion has an advantage of easier adhesion of a sprayed ejection object. This is because the ejection object once adhered to the deviated portion does not easily run off by gravity.

It is more preferable that the dielectric material 30s is typically a dielectric body film. In the present configuration, a distance between each of the conductive body cover side parts 141as, 142as, and 143as and the ferrimagnetic material 13s is determined by a film thickness of the dielectric material 30s. This is because use of a dielectric body film having a thin film thickness can keep a substantially uniform distance between each of the conductive body cover side parts 141as, 142as, and 143as and the ferrimagnetic material 13s even when the film thickness varies. The dielectric material 30s may be either an inorganic material or an organic material, as long as the dielectric material 30s is a dielectric body. It is more preferable that the dielectric material 30s is formed with a substantially uniform film thickness, especially at a portion of a side face portion in FIG. 25 of the ferrimagnetic material 13s, opposing at least the conductive body cover side part 141as. This is because, in the present configuration, a distance between each of the conductive body cover side parts 141as, 142as, and 143as and the ferrimagnetic material 13s is determined by a film thickness of the dielectric material 30s. Herein, it is premised that a face of each of the conductive body cover side parts 141as, 142as, and 143as is in contact with a surface of the dielectric material 30s formed on the ferrimagnetic material 13s, opposing each of the conductive body cover side parts 141as, 142as, and 143as.

The conductive body cover 14s covers the ferrimagnetic material 13s. Herein, in the second example embodiment, as long as the conductive body cover 14s covers at least a portion of an upper face of the ferrimagnetic material 13s, a state where a most portion of the upper face of the ferrimagnetic material 13s is exposed may be included in a state where "the ferrimagnetic material 13s is covered".

Since the ferrimagnetic material 13s is typically a high dielectric constant dielectric body having a dielectric constant exceeding 10s, a high frequency electric field concentrates more on the ferrimagnetic material 13s below the upper face of the ferrimagnetic material 13s than on an air layer above the upper face of the ferrimagnetic material 13s. The conductive body cover 14s when being provided above the upper face can suppress an unnecessary electromagnetic wave incident on the ferrimagnetic material from the upper face.

Note that a material constituting the conductive body cover 14s is a material having conductivity, such as a metal, a material having conductivity other than a metal, and a material of a combination of a metal with a material having conductivity other than a metal.

In FIG. 25, a case in which the conductive body cover upper part 140s includes a substantially circular conductive body cover upper center part 140xs, and conductive body cover upper connecting parts 141ys, 142ys, and 143ys is illustrated. The conductive body cover upper connecting parts 141ys, 142ys, and 143y connect the conductive body cover upper center part 140xs with the conductive body cover side parts 141as, 142as, and 143as. In the case illustrated in FIG. 25, a center part on an upper part of the ferrimagnetic material 30s substantially matches with a center part of the conductive body cover upper center part 140xs.

A size of the conductive body cover upper center part 140xs is arbitrary. The conductive body cover upper center part 140xs may entirely cover the upper part of the ferrimagnetic material 30. In the case, the conductive body cover upper center part 140xs is connected with the conductive body cover side parts 141as, 142as, and 143as directly without conductive body cover upper connecting parts therebetween, and the conductive body cover upper connecting parts 141ys, 142ys, and 143ys are omitted.

Further, a shape of the conductive body cover upper center part 140xs may not be substantially circular. As long as characteristic impedance of each of the transmission lines 16s, 17s, and 18s on the substrate 11s can be matched with that of the ferrimagnetic material 13s, there is no limitation on a shape of the conductive body cover 14s. This is because radiation loss can be reduced since an electric field intensity on a lower face of the conductive body cover is larger than that on an upper face of the conductive body cover.

A shape of each of the conductive body cover upper connecting parts 141ys, 142ys, and 143ys is arbitrary.

The conductive body cover foot parts 141bs, 142bs, and 143bs electrically connect the conductive body cover 14s with the respective transmission lines 16s, 17s, and 18s formed on the substrate 11s. Accordingly, the conductive body cover 14s transfers a high frequency signal input via any arbitrary one connecting part of the transmission lines 16s, 17s, and 18s, and outputs the high frequency signal to another connecting part of the transmission lines 16s, 17s, and 18s. A shape of each of the conductive body cover foot parts 141bs, 142bs, and 143bs is arbitrary.

Note that, in FIG. 25, the upper face of the substrate 11s, the upper face of the ferrimagnetic material 13s, and the conductive body cover 14s are in a substantially parallel positional relationship. However, as long as a magnetic field generated between the conductive body cover 14s and the substrate 11s is orthogonal to an external direct current magnetic field applied by the magnet 15s, the positional relationship is not limited as such.

At least the conductive body cover side parts 141as, 142as, and 143as of the conductive body cover 14s are formed in such a way as to make contact with the dielectric material 30s formed on a side face of the ferrimagnetic material 13s.

The conductive body cover side parts 141as, 142as, and 143as, the conductive body cover foot parts 141bs, 142bs, and 143bs, and the conductive body cover upper part 140s may be constituted of the same material, or may be constituted of different materials. In addition, the conductive body cover side parts 141as, 142as, and 143as, the conductive body cover foot parts 141bs, 142bs, and 143bs, and the conductive body cover upper part 140s may be constituted in a single body.

On the upper face of the ferrimagnetic material 13s, the conductive body cover side part 141as and the conductive body cover side part 142as form a central angle of substantially 120°. Likewise, the conductive body cover side part 142as and the conductive body cover side part 143as form a central angle of substantially 120°, and the conductive body cover side part 143as and the conductive body cover side part 141as form a central angle of substantially 120°.

In FIGS. 25 and 26, the conductive body cover side parts 141as, 142as, and 143as are in contact with a surface of the dielectric material 30s formed on the ferrimagnetic material 13s, opposing the conductive body cover side parts 141as, 142as, and 143as. This contact can define a distance between each of the conductive body cover side parts 141as, 142as, and 143as and a surface of the ferrimagnetic material 13s opposing each of the conductive body cover side parts 141as, 142as, and 143as to be substantially constant, with a film thickness of the dielectric material 30s. Herein, it is premised that the film thickness of the dielectric material 30s is substantially constant at a portion opposing each of the conductive body cover side parts 141as, 142as, and 143as.

The magnet 15s is placed on the lower face of the substrate 11. In FIG. 25, the magnet 15s is placed at a position opposing the ferrimagnetic material 13s across the substrate 11, and applies a magnetic field to the ferrimagnetic material 13 in a direction perpendicular to the substrate 11s. Specifically, a direct current magnetic field directed from up to down, or from down to up in FIG. 25 or 26 is generated inside the ferrimagnetic material 13s by the magnet 15s. In FIG. 27, a direct current magnetic field in a direction penetrating from a front side to a rear side, or from a rear side to a front side of the plane of the figure is generated by the magnet 15s. A direction of the direct current magnetic field is a direction perpendicular to a high frequency magnetic field in the ferrimagnetic material 13s which is generated when a high frequency signal passes through the conductive body cover upper part 140s. Note that, in FIG. 26, an area of a main face of the magnet 15s is larger than an area of the upper face of the ferrimagnetic material 13s, but may not necessarily be as such.

Note that the magnet 15s may be provided at a position other than the lower face of the substrate 11s, as long as the magnet 15s is capable of generating a direct current magnetic field in a direction perpendicular to a high frequency magnetic field in the ferrimagnetic material 13s which is generated when a high frequency signal passes through the conductive body cover upper part 140s. For example, the magnet 15s may be provided on the same face of the substrate 11s as the ferrimagnetic material 13s. The number of the magnet 15s is also not limited to one. For example, a plurality of magnets may be arranged in series above and below the ferrimagnetic material 13s. Further, the magnet 15s may be any magnet, as long as the magnet 15s is capable of applying a magnetic field to the ferrimagnetic material 13s.

The transmission lines 16s, 17s, and 18s are wiring lines each of which transmits a high frequency signal. The transmission lines 16s, 17s, and 18s respectively have feed points 19s, 20s, and 21s (illustrated in FIG. 27) each of which is an input end for a high frequency signal from outside of the non-reciprocal circuit element 10s.

In FIGS. 25, 26, and 27, an example in which the dielectric material 30s is formed on a side face and an upper face of the ferrimagnetic material 13s is illustrated. The dielectric material 30s only needs to be formed on a portion of the side face of the ferrimagnetic material 13s, opposing the conductive body cover side parts 141as, 142as, and 143as. The dielectric material 30s may be formed on the entire side face of the ferrimagnetic material 13s, or may be formed only on a portion of the side face of the ferrimagnetic material 13s, opposing the conductive body cover side parts 141as, 142as, and 143as. In addition, whether the dielectric material 30s is formed on an upper face or a lower face of the ferrimagnetic material 13s is arbitrary.

Figure 30:
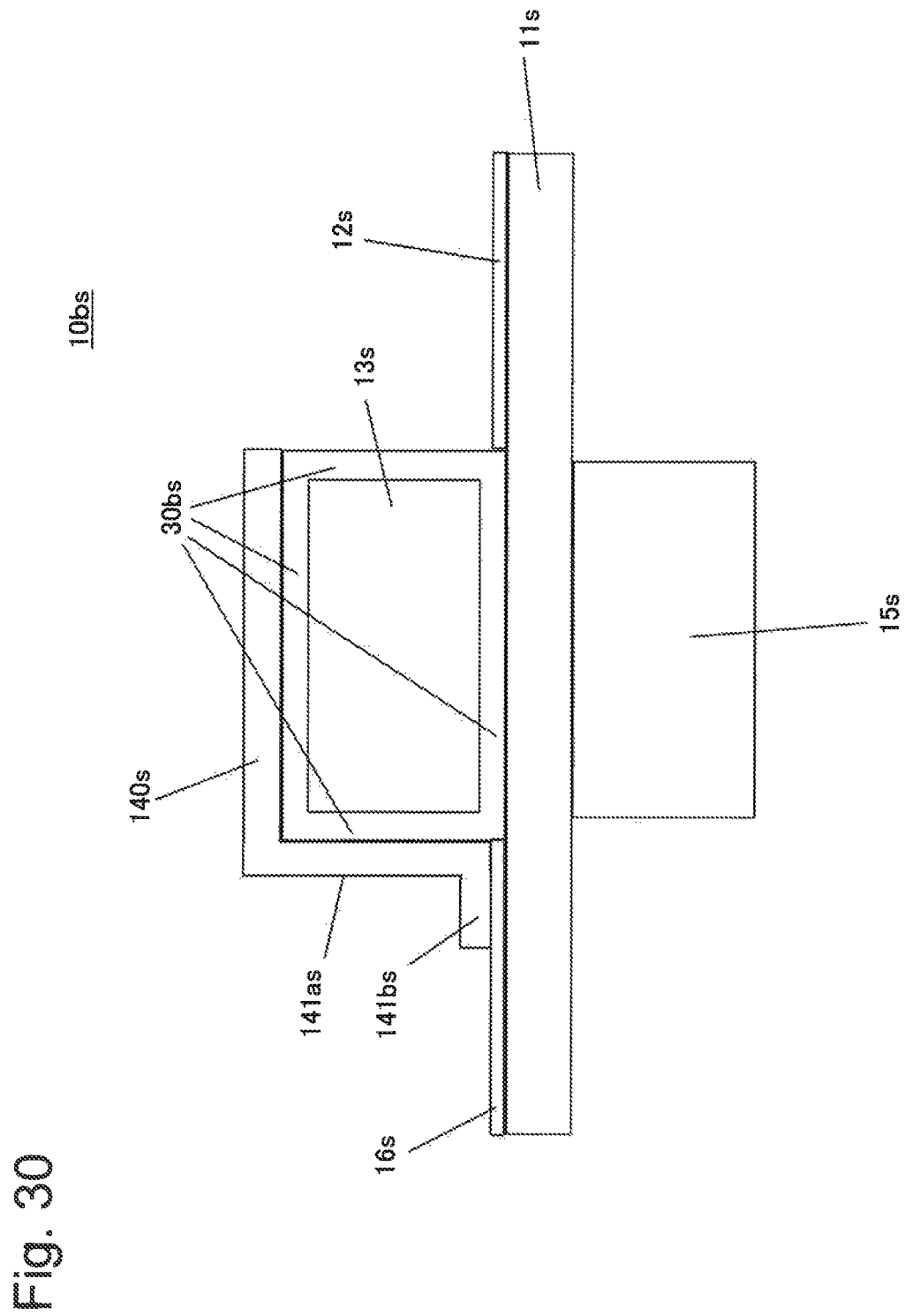
FIG. 30 is a sectional conceptual view illustrating a first variation of the non-reciprocal circuit element according to the second example embodiment.

FIG. 30 is a conceptual view illustrating a cross section of a first variation of the non-reciprocal circuit element according to the second example embodiment. A non-reciprocal circuit element 10bs includes a ferrimagnetic material 13s that has a dielectric material 30bs formed on a side face, an upper face, and a lower face of the ferrimagnetic material 13s.

Figure 31:
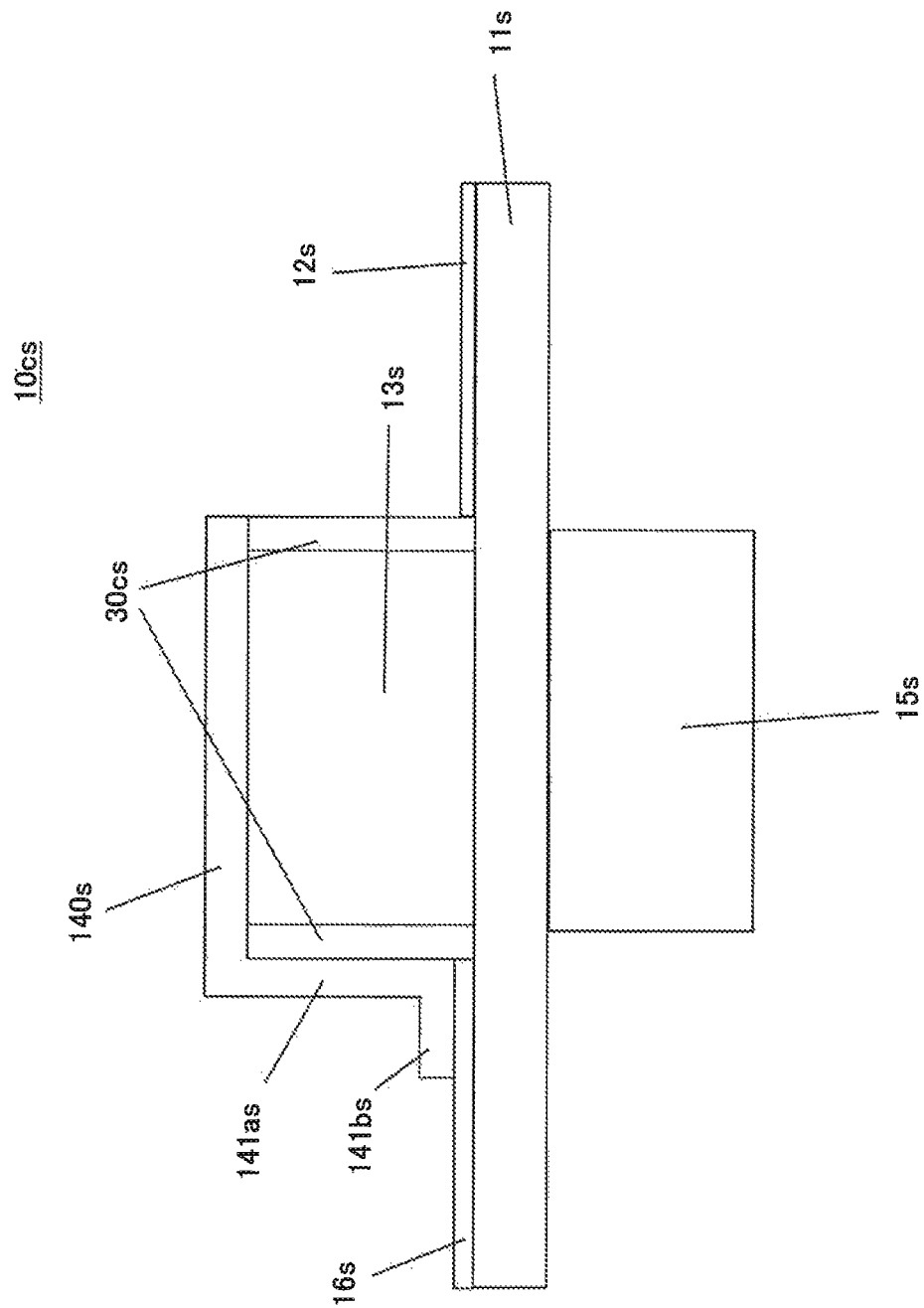
FIG. 31 is a sectional conceptual view illustrating a second variation of the non-reciprocal circuit element according to the second example embodiment.

FIG. 31 is a conceptual view illustrating a cross section of a second variation of the non-reciprocal circuit element according to the second example embodiment. A non-reciprocal circuit element 10cs includes a ferrimagnetic material 13s that has a dielectric material 30cs formed only on a side face of the ferrimagnetic material 13s.

Figure 32:
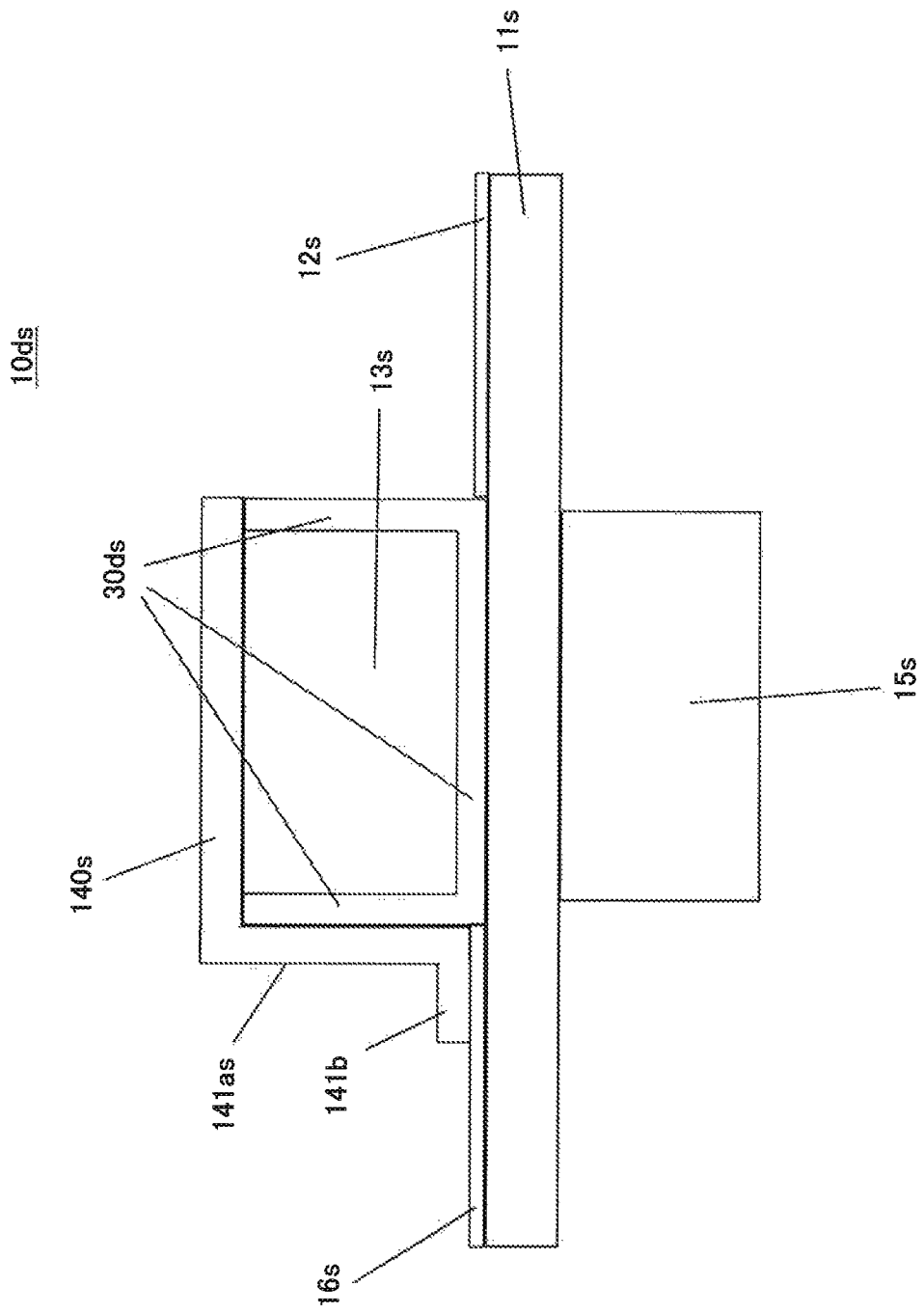
FIG. 32 is a sectional conceptual view illustrating a third variation of the non-reciprocal circuit element according to the second example embodiment.

FIG. 32 is a conceptual view illustrating a cross section of a third variation of the non-reciprocal circuit element according to the second example embodiment. A non-reciprocal circuit element 10ds includes a ferrimagnetic material 13s that has a dielectric material 30ds formed on a side face and a lower face of the ferrimagnetic material 13s.

In addition, there are also various types of variations for arrangement of a conductive body cover, a ferrimagnetic material, and a magnet in the non-reciprocal circuit element according to the second example embodiment.

Figure 33:
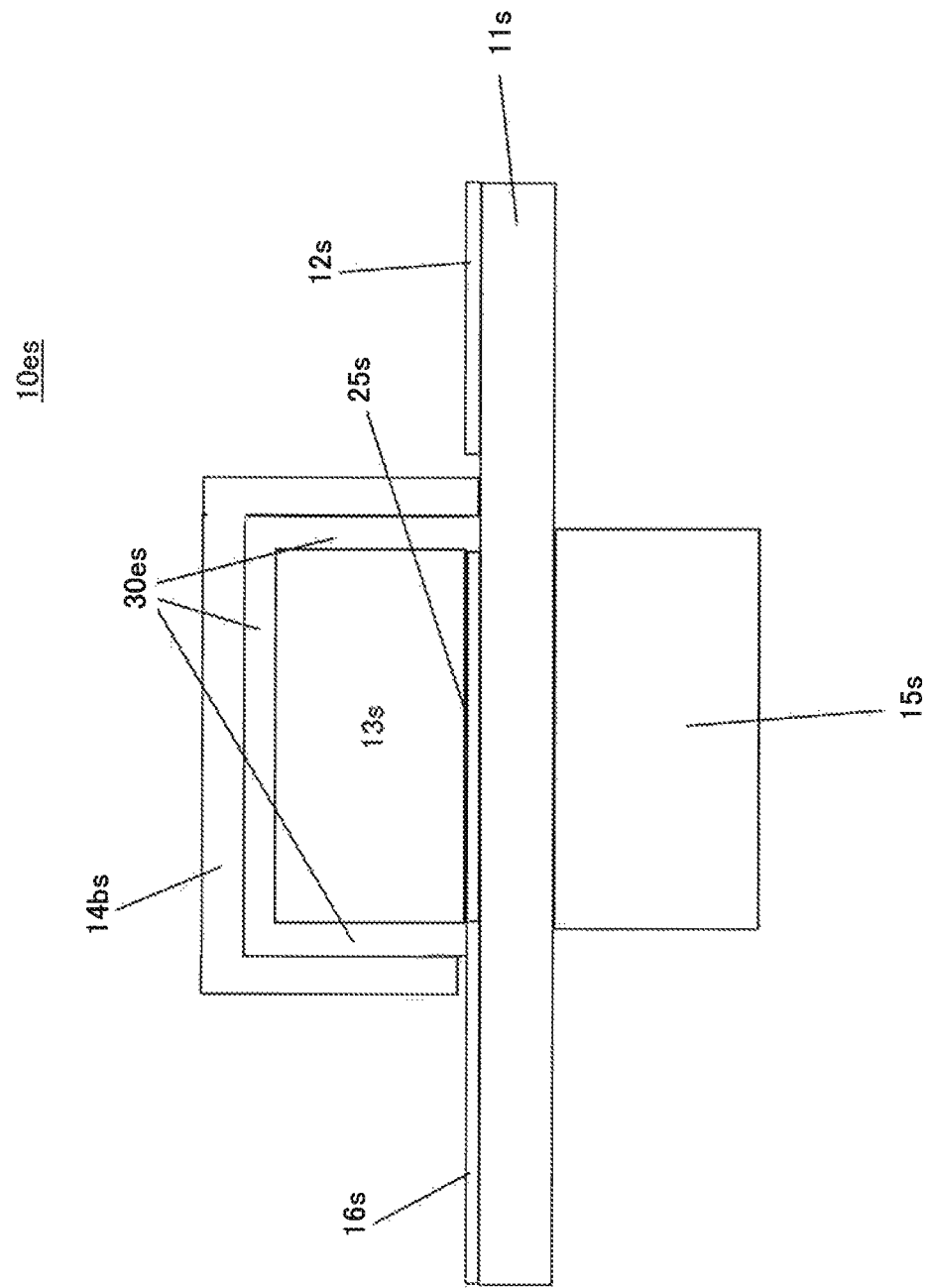
FIG. 33 is a sectional conceptual view illustrating a fourth variation of the non-reciprocal circuit element according to the second example embodiment.

FIG. 33 is a conceptual view illustrating a cross section of a fourth variation of the non-reciprocal circuit element according to the second example embodiment.

A non-reciprocal circuit element 10es includes a substrate 11s, a pattern 12s, a ferrimagnetic material 13s, a conductive body cover 14bs, a magnet 15s, a transmission line 16s, a lower conductor 25s, and a dielectric material 30es.

The pattern 12s, the lower conductor 25s, and the transmission line 16s are formed on the substrate 11s.

The lower conductor 25s is formed on the substrate 11s at a center part in FIG. 33 where no pattern is formed. The lower conductor 25s is in electrical contact with the transmission line 16s, but is not in electrical contact with the pattern 12s. The lower conductor 25s typically has a substantially circular shape. The lower conductor 25 may be integrated with the transmission line 16s.

The ferrimagnetic material 13s is formed on the lower conductor 25s. The dielectric material 30es is formed on a side face and an upper face of the ferrimagnetic material 13s.

The ferrimagnetic material 13s is covered by the conductive body cover 14bs with the dielectric material 30es therebetween. The conductive body cover 14bs is not in electrical contact with the transmission line 16s, and with the transmission lines 17s and 18s, which are not illustrated in FIG. 33. In FIG. 33, a case in which the conductive body cover 14bs is in contact with a portion of the substrate 11s where the pattern 12s is not formed, but is not in contact with the pattern 12s is illustrated. However, the conductive body cover 14bs may be in contact with the pattern 12s. The conductive body cover 14bs may cover the entire or most of the side face and the upper face of the ferrimagnetic material 13s and the dielectric material 30es formed thereon.

Detailed description of each configuration in FIG. 33 and the description of FIG. 33 is the same as the description about the configuration illustrated with the same reference numeral in FIGS. 25 to 27, except for the above description about FIG. 33.

Figure 34:
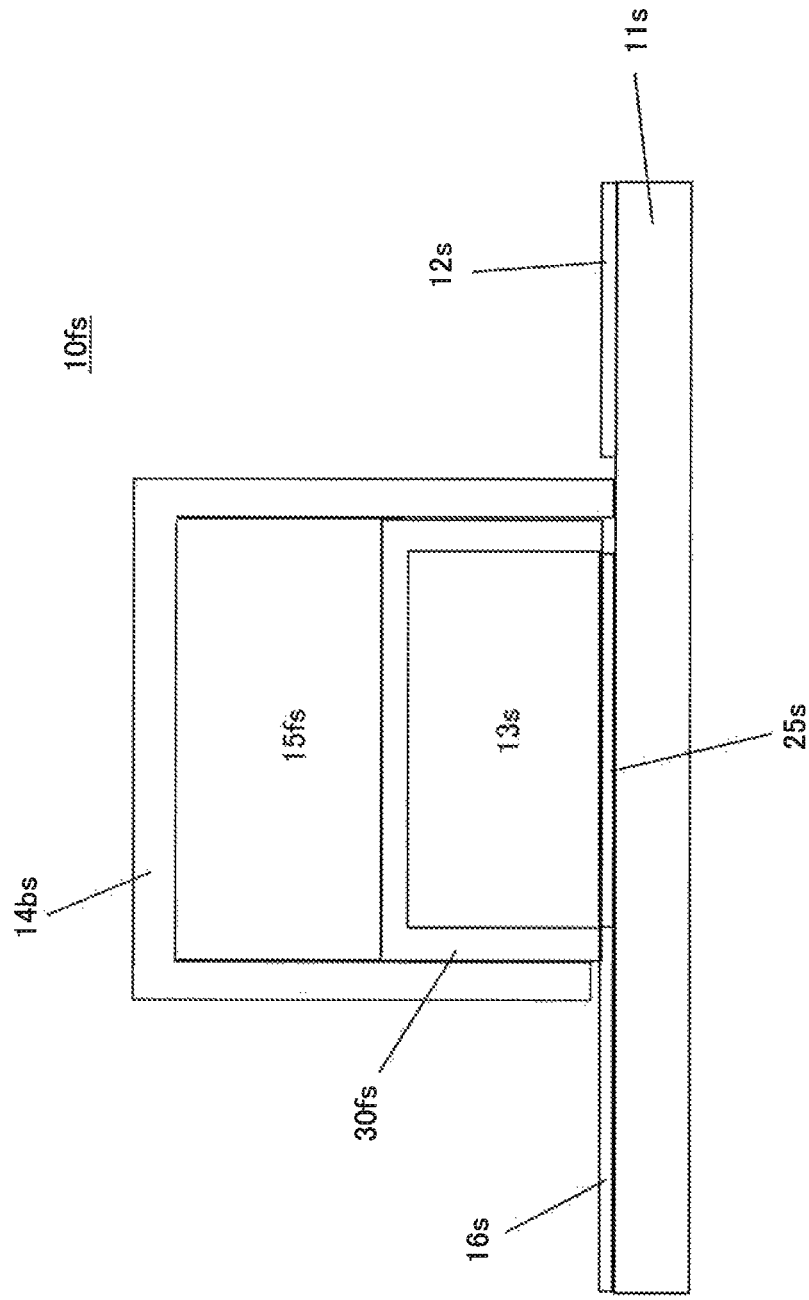
FIG. 34 is a sectional conceptual view illustrating a fifth variation of the non-reciprocal circuit element according to the second example embodiment.

FIG. 34 is a conceptual view illustrating a cross section of a fifth variation of the non-reciprocal circuit element according to the second example embodiment.

A non-reciprocal circuit element 10fs includes a substrate 11s, a pattern 12s, a ferrimagnetic material 13s, a conductive body cover 14bs, a magnet 15fs, a transmission line 16s, a lower conductor 25s, and a dielectric material 30fs.

A difference from the configuration illustrated in FIG. 33 resides in that the magnet 15fs is formed not on a lower face of the substrate 11s, but above the ferrimagnetic material 13s. Description about other configurations will be omitted since being the same as that of the configurations illustrated with the same reference numerals in FIG. 33.

[Operation]

An operation of the non-reciprocal circuit element 10s illustrated in FIGS. 25 to 27 will be described below. A high frequency signal is input for the non-reciprocal circuit element 10s, from the feed point 19s via the transmission line 16s, the conductive body cover foot part 141bs, and the conductive body cover side part 141as to the conductive body cover upper part 140s. The high frequency signal input to the conductive body cover upper part 140s generates a high frequency electromagnetic field between the conductive body cover upper part 140s and the substrate 11s (inside the ferrimagnetic material 13s). Specifically, an electric field is generated in a direction perpendicular to a face of the substrate 11s (a height direction of the ferrimagnetic material 13s in FIG. 25), and a magnetic field is generated in a direction parallel with a face of the substrate 11s.

Inside the ferrimagnetic material 13s, a direct current magnetic field is applied by the magnet 15s in a height direction of the ferrimagnetic material 13s (a normal direction of an upper face of the ferrimagnetic material). A direction of the direct current magnetic field is a direction perpendicular to the high frequency magnetic field generated inside the ferrimagnetic material 13s by the high frequency signal. Since the direct current magnetic field and the high frequency magnetic field generate a gyromagnetic effect inside the ferrimagnetic material 13s, a path of the high frequency signal is rotated on a plane of the substrate 11s inside the ferrimagnetic material 13s. When the direct current magnetic field is applied from down to up in FIG. 27, the high frequency signal is output via the conductive body cover side part 142as and the conductive body cover foot part 142bs to the transmission line 17s. When the direct current magnetic field is applied from up to down in FIG. 26, the high frequency signal is output via the conductive body cover side part 143as and the conductive body cover foot part 143bs to the transmission line 18s. In this way, a high frequency signal is output only to a transmission line in a determined direction.

When a high frequency signal is input from the feed point 20s via the transmission line 17s, the conductive body cover foot part 142bs, and the conductive body cover side part 142as to the conductive body cover upper part 140s, the high frequency signal is output only to a transmission line in a determined direction in accordance with the same principle. In addition, also when a high frequency signal is input from the feed point 21 via the transmission line 18s, the conductive body cover foot part 143bs, and the conductive body cover side part 143as to the conductive body cover upper part 140s, the high frequency signal is output only to a transmission line in a determined direction in accordance with the same principle.

On the other hand, in the non-reciprocal circuit element 10es illustrated in FIG. 33 and the non-reciprocal circuit element 10fs illustrated in FIG. 34, a high frequency signal input from the transmission line 16s and the like does not flow through the conductive body cover 14bs. The reason why a high frequency signal does not flow through the conductive body cover 14bs is that the conductive body cover 14bs is not in electrical contact with the transmission line 16s and the like. On the other hand, the transmission line 16s, and the transmission lines 17s and 18s, which are not illustrated in FIG. 34, are electrically connected with one another through the lower conductor 25s. Then, the same operation as that in the above description about FIGS. 25 to 27 is performed, due to a gyro effect that is the same as in the above description about FIGS. 25 to 27 when a high frequency signal passes through the lower conductor 25.

[Manufacturing Method]

Next, an example of a method of manufacturing the non-reciprocal circuit element 10s illustrated in FIGS. 25 to 27 will be described.

First, an example of a method of forming the dielectric material 30s on a surface of the ferrimagnetic material 13s will be described.

FIGS. 35 to 38 are conceptual views each illustrating a method of forming the dielectric material 30s on a surface of the ferrimagnetic material 13s.

Figure 35:
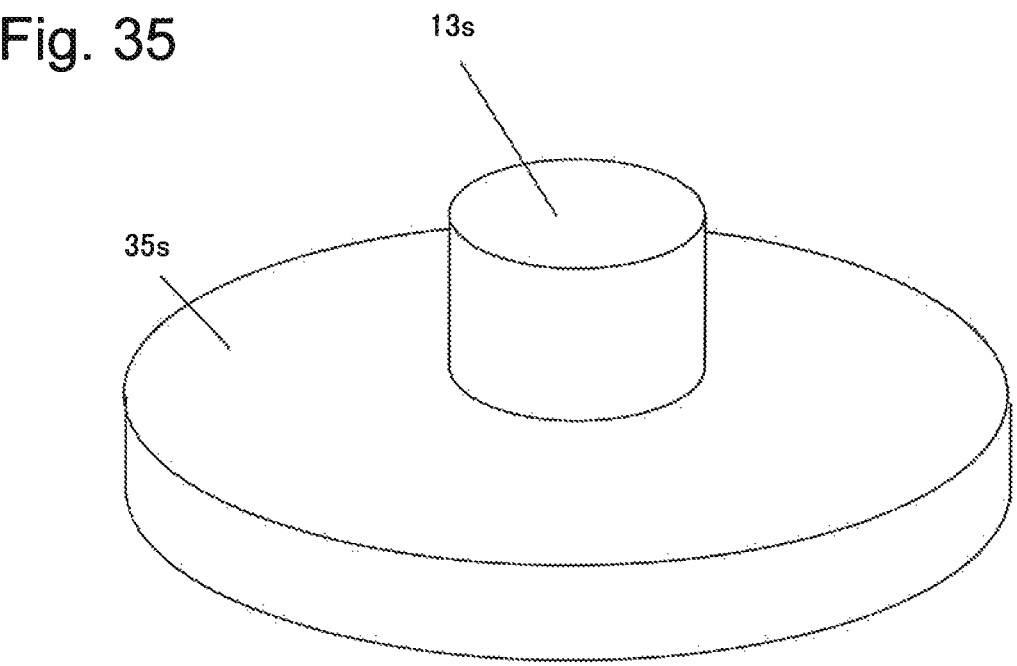
FIG. 35 is a conceptual view (no. 1) illustrating a method of forming a dielectric material on a surface of a ferrimagnetic material.

First, as illustrated in FIG. 35, the ferrimagnetic material 13s processed into a predetermined shape is first placed on a turntable 35s.

In FIG. 35, a case in which the ferrimagnetic material 13s having a columnar shape is placed is illustrated.

Figure 36:
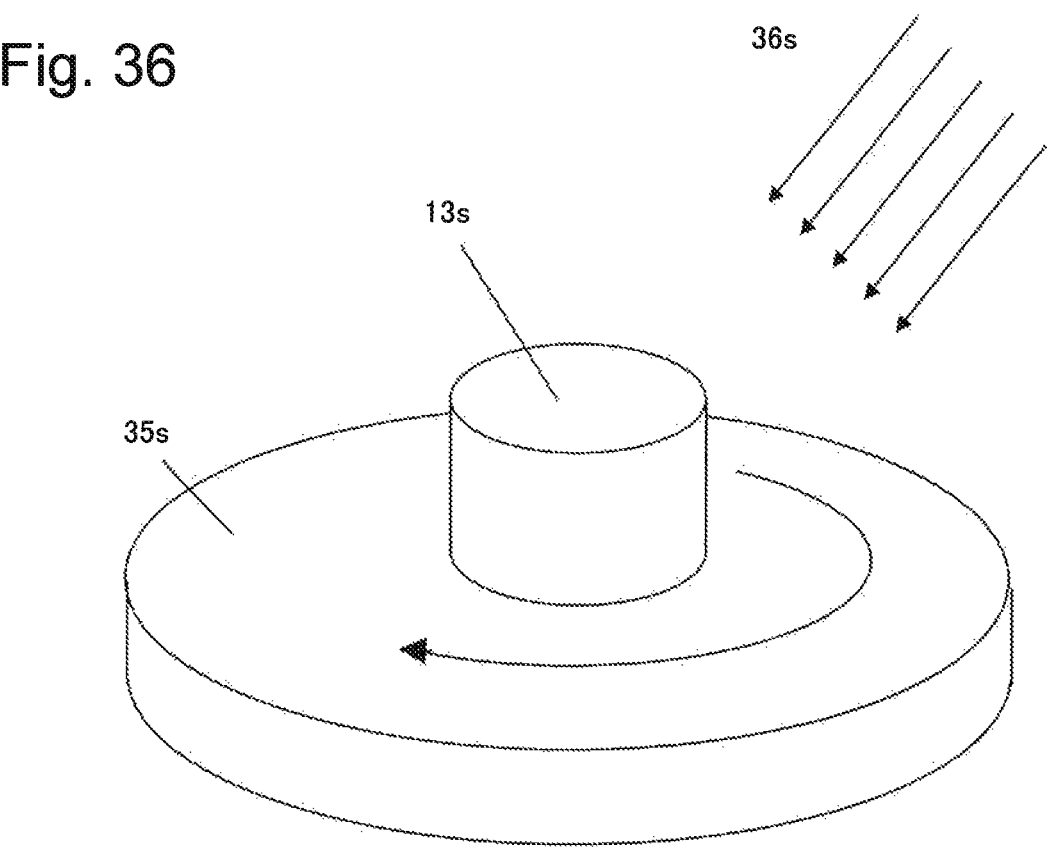
FIG. 36 is a conceptual view (no. 2) illustrating a method of forming a dielectric material on a surface of a ferrimagnetic material.

Next, as illustrated in FIG. 36, spray 36s toward the ferrimagnetic material 13s is performed while rotating the turntable 35s, with a predetermined angle relative to the ferrimagnetic material 13s, by using liquid dissolving or mixing the dielectric material 30s.

Figure 37:
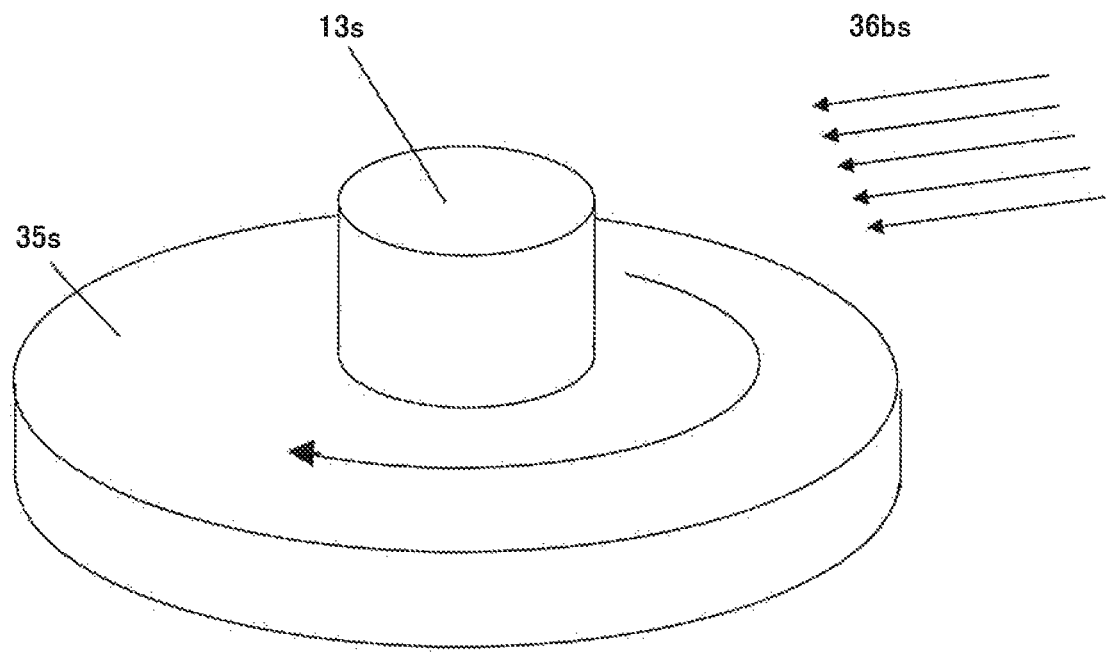
FIG. 37 is a conceptual view (no. 3) illustrating a method of forming a dielectric material on a surface of a ferrimagnetic material.

If more spray is desired to be performed on a side face than on an upper face of the ferrimagnetic material 13s, spray 36bs with a smaller angle formed by a direction of the spray and an upper face of the turntable 35s may be performed, as illustrated in FIG. 37.

Figure 38:
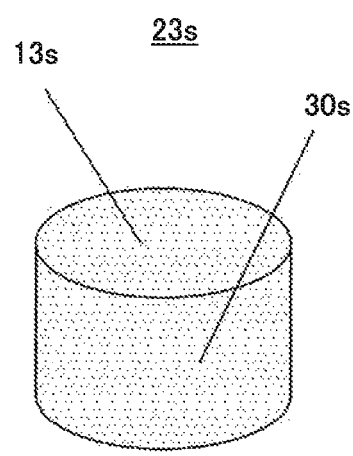
FIG. 38 is a conceptual view (no. 4) illustrating a method of forming a dielectric material on a surface of a ferrimagnetic material.

Then, the liquid used for dissolving or mixing the dielectric material 30s is subjected to evaporation or the like. Accordingly, as illustrated in FIG. 38, a coated ferrimagnetic material 23s having the dielectric material 30s formed on a surface of the ferrimagnetic material 13s is manufactured.

In the above, description has been given about a case in which spray is performed while rotating the ferrimagnetic material 13s. However, spray may be performed while moving a device for performing the spray. In addition, spray may be performed while rotating the ferrimagnetic material 13s and moving a device for performing the spray simultaneously.

As the dielectric material 30s, a material that is liquid at a time of spray and is cured afterwards may be used. Such a material is, for example, a resin that is cured by light, and a resin that is cured by a chemical reaction involved in mixing of two kinds of liquid.

The dielectric material 30s may be coated on a surface of the ferrimagnetic material 13 by using, instead of spray, sputtering or vapor deposition in a vacuum vessel, a chemical vapor deposition method, and the like. A dielectric material in this case is, for example, a silicon oxide, a silicon nitride, a metal oxide, a metal nitride, or a mixture thereof.

Next, a method of manufacturing the non-reciprocal circuit element 10s with use of the coated ferrimagnetic material 23s manufactured by the above-described process will be described.

FIGS. 39 to 46 are top views each illustrating an image of a method of manufacturing the non-reciprocal circuit element 10s.

Figure 39:
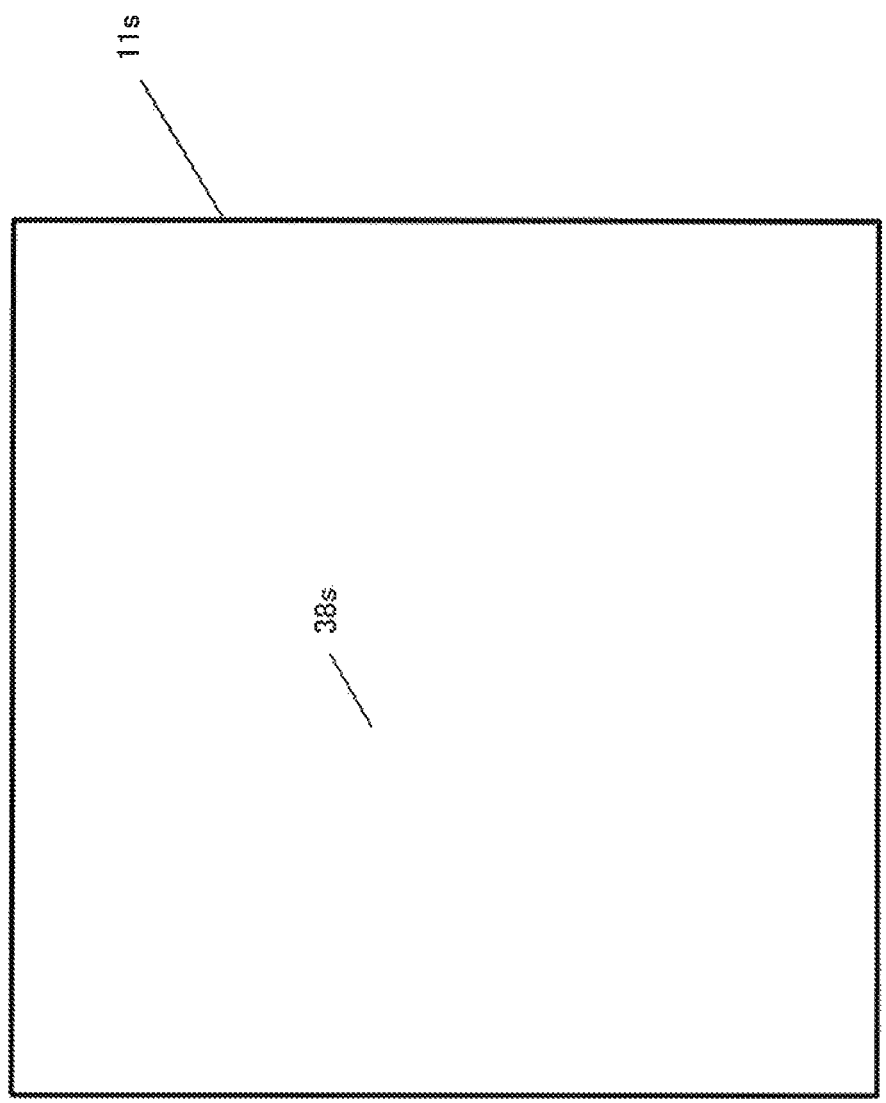
FIG. 39 is a top view (no. 1) illustrating an image of a method of manufacturing a non-reciprocal circuit element.

First, as illustrated in FIG. 39, the substrate 11s is placed. In FIG. 39, an upper face 38s of the substrate 11s is illustrated.

Figure 40:
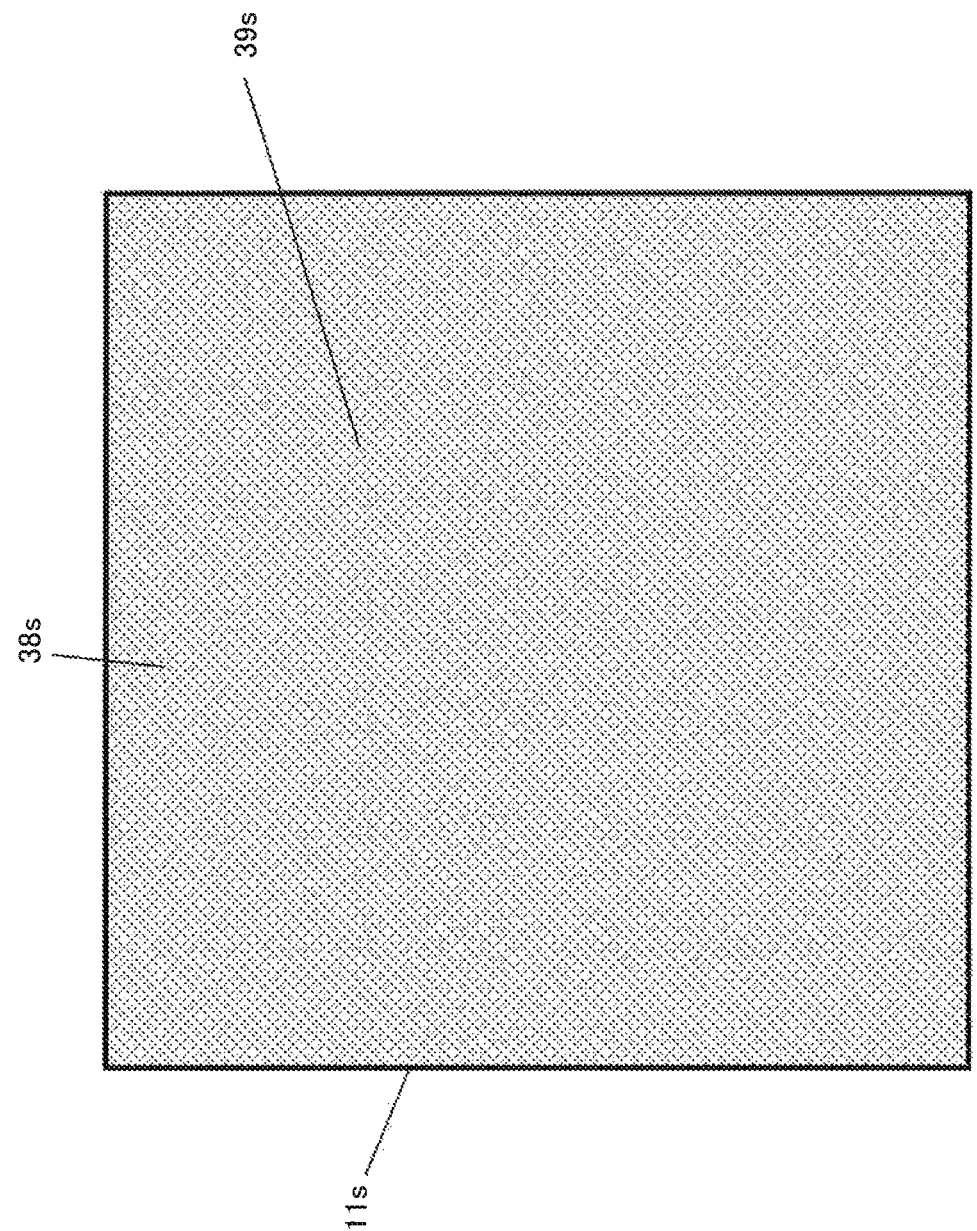
FIG. 40 is a top view (no. 2) illustrating an image of a method of manufacturing a non-reciprocal circuit element.

Next, as illustrated in FIG. 40, a conductive material 39s is formed on the upper face 38s of the substrate 11s. The conductive material 39s is typically a metal, and may be formed by, for example, plating, coating, and bonding of a thin plate.

Figure 41:
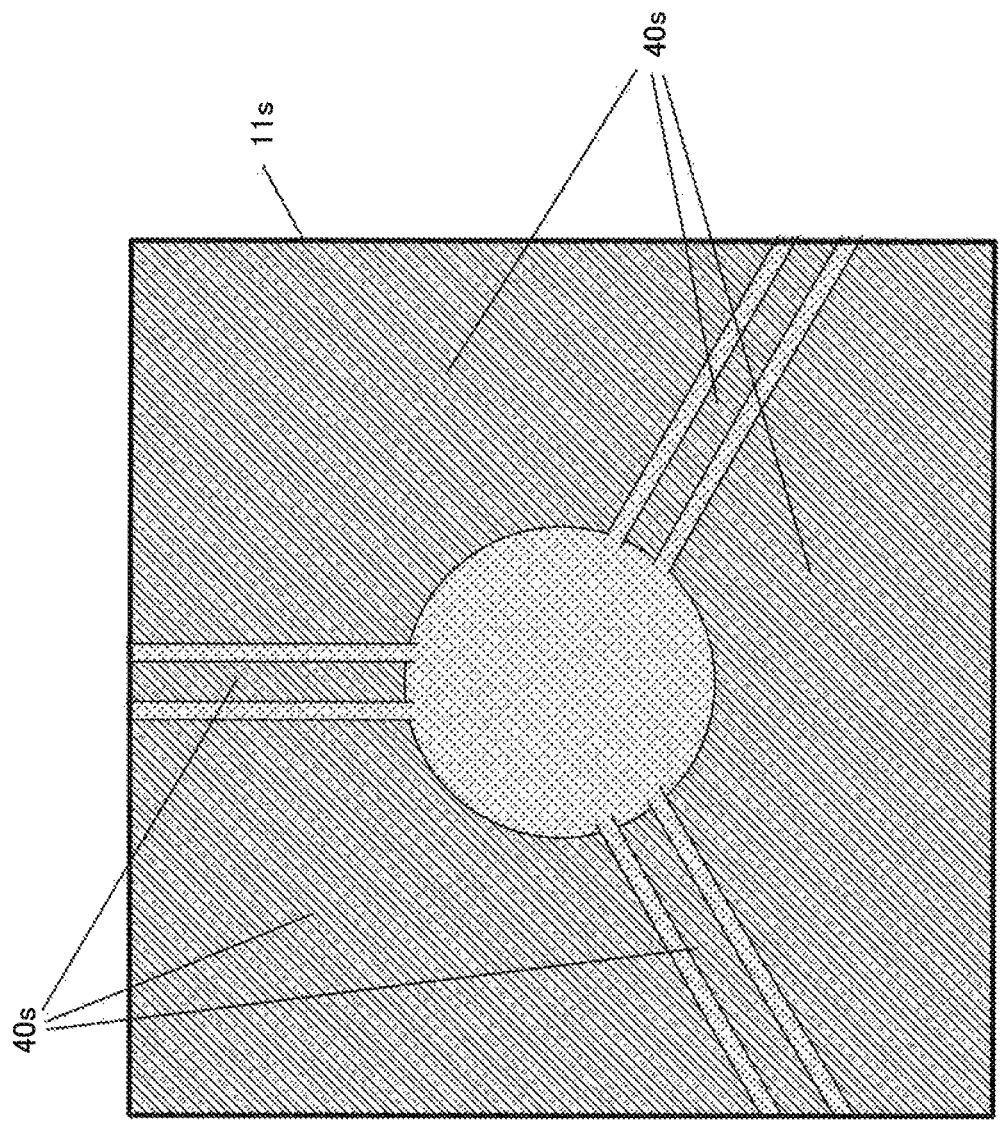
FIG. 41 is a top view (no. 3) illustrating an image of a method of manufacturing a non-reciprocal circuit element.

Then, as illustrated in FIG. 41, a patterned mask material 40s is formed on an upper part of the conductive material 39s. The mask material 40s is typically a resin. The mask material 40s may be formed by, for example, coating, spraying, printing, and the like on the pattern shape.

Figure 42:
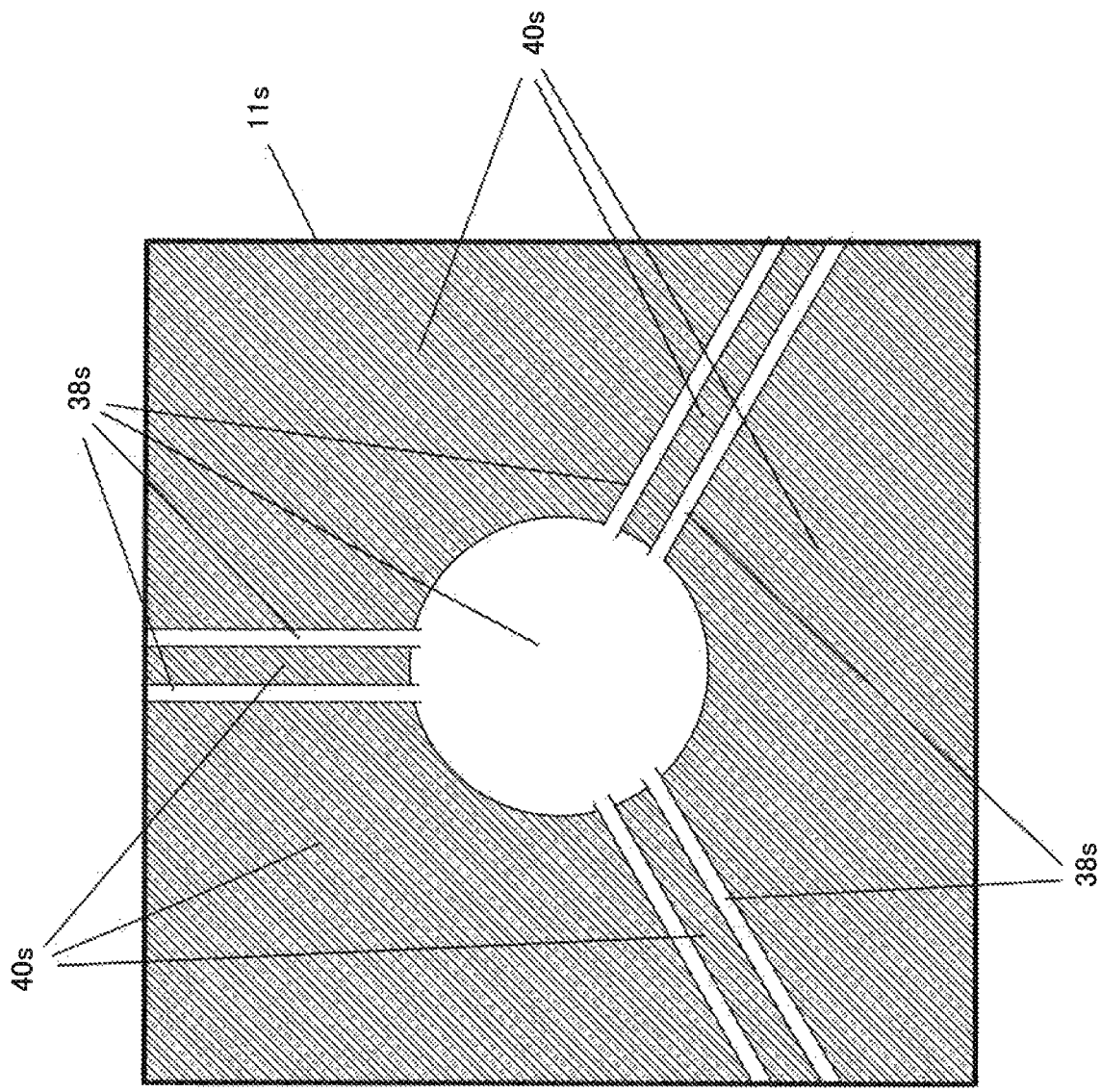
FIG. 42 is a top view (no. 4) illustrating an image of a method of manufacturing a non-reciprocal circuit element.

Next, as illustrated in FIG. 42, a process of removing the conductive material 39s at a portion where a pattern of the mask material 40s is not formed is performed. A representative process thereof is a process of immersing in a solution that dissolves the conductive material 39s. The solution is typically an acid and an alkali when the conductive material 39s is a metal.

Figure 43:
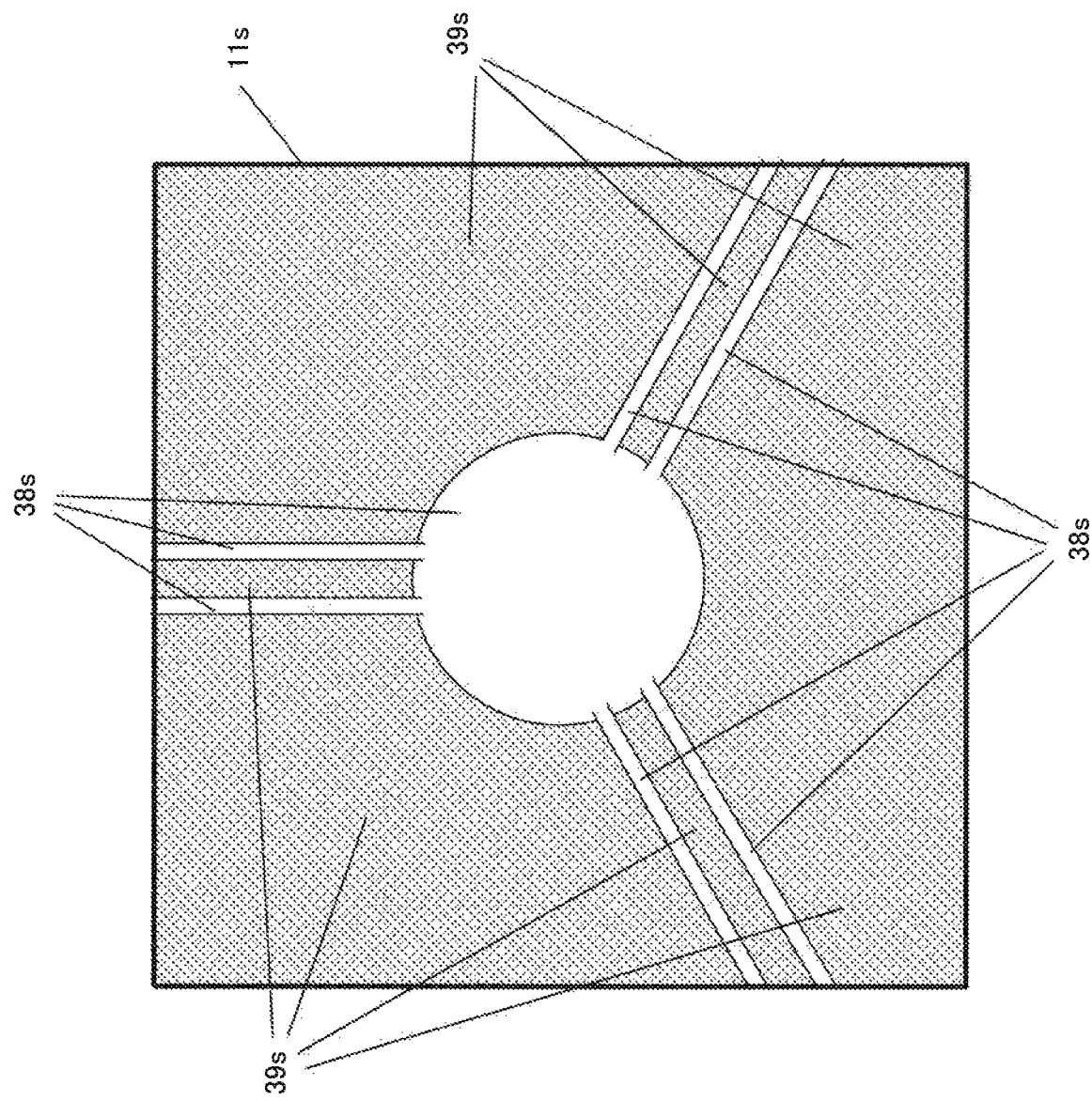
FIG. 43 is a top view (no. 5) illustrating an image of a method of manufacturing a non-reciprocal circuit element.

Then, a process of removing the mask material 40s is performed. The process is typically a process of immersing in a solution that easily dissolves the mask material 40s and hardly dissolves the conductive material 39s. In this way, when the mask material 40s is removed, a pattern of the conductive material 39s as illustrated in FIG. 43 is formed on the upper face 38s of the substrate 11s.

Figure 44:
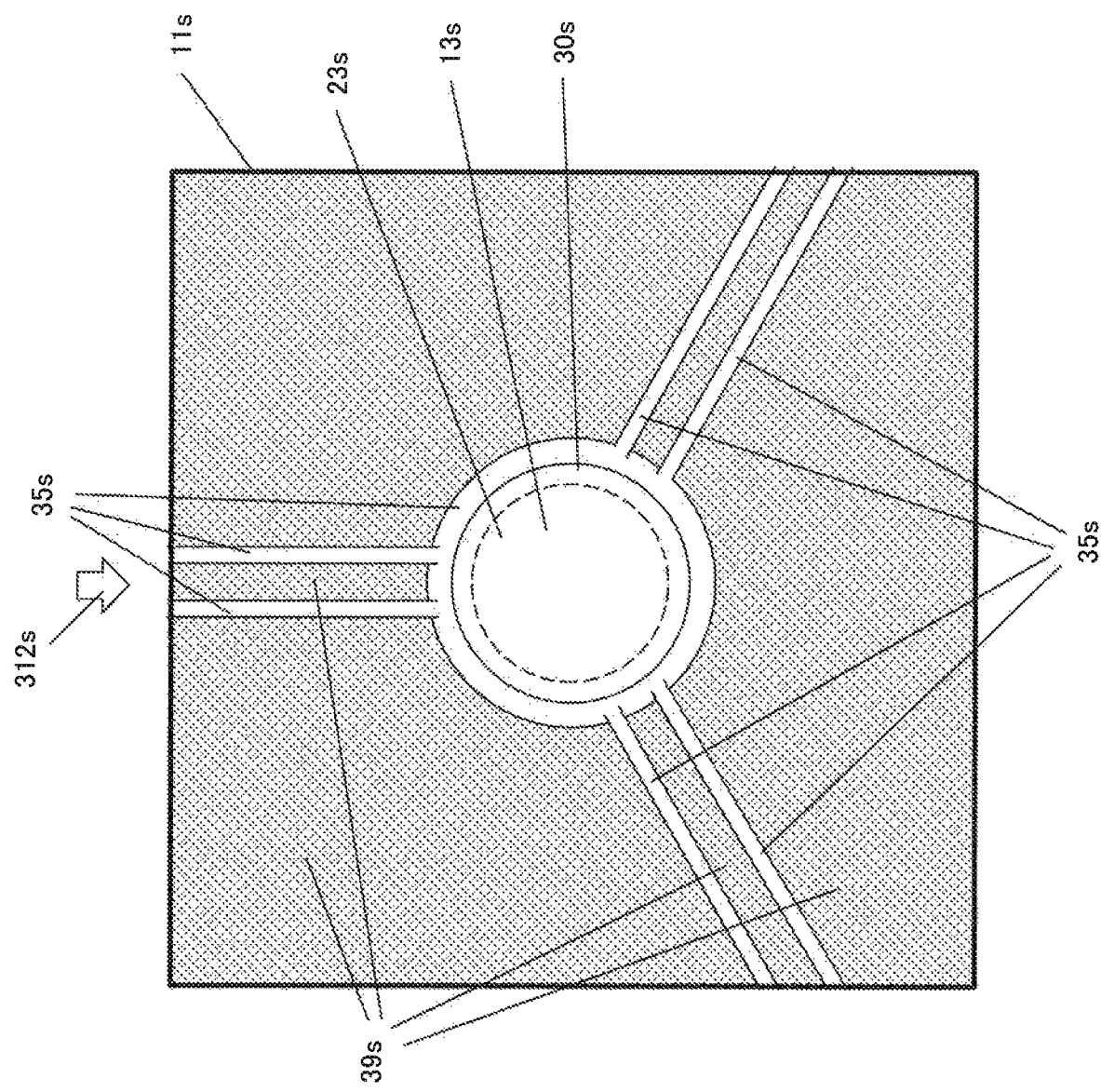
FIG. 44 is a top view (no. 6) illustrating an image of a method of manufacturing a non-reciprocal circuit element.

Next, as illustrated in FIG. 44, the ferrimagnetic material 23s manufactured in advance is placed on a substantially circular portion in a vicinity of a center of FIG. 44 where the pattern of the conductive material 39s is not formed. In FIG. 44, a portion illustrated with a circle of a dotted line is the ferrimagnetic material 13s, and a portion between the circle illustrated with the dotted line and a circle being larger by one than the circle which is illustrated with a solid line is the dielectric material 30s in FIG. 44. The ferrimagnetic material 23s is fixed to the above-described substantially circular portion by means of an adhesive and the like.

Figure 45:
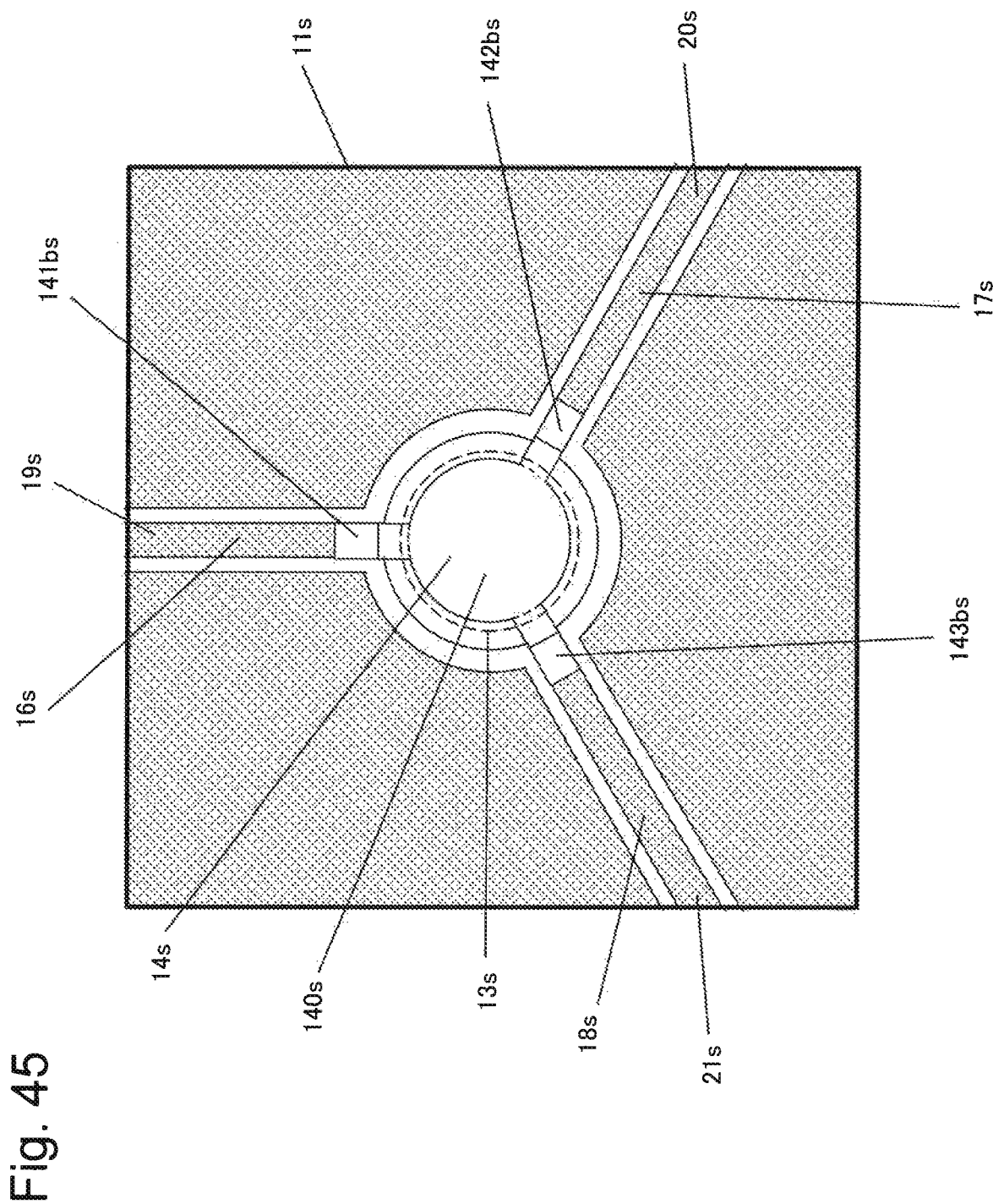
FIG. 45 is a top view (no. 7) illustrating an image of a method of manufacturing a non-reciprocal circuit element.

Then, as illustrated in FIG. 45, the conductive body cover 14s is formed in such a way as to cover the ferrimagnetic material 23s. A method of forming the conductive body cover 14s will be described later.

Figure 46:
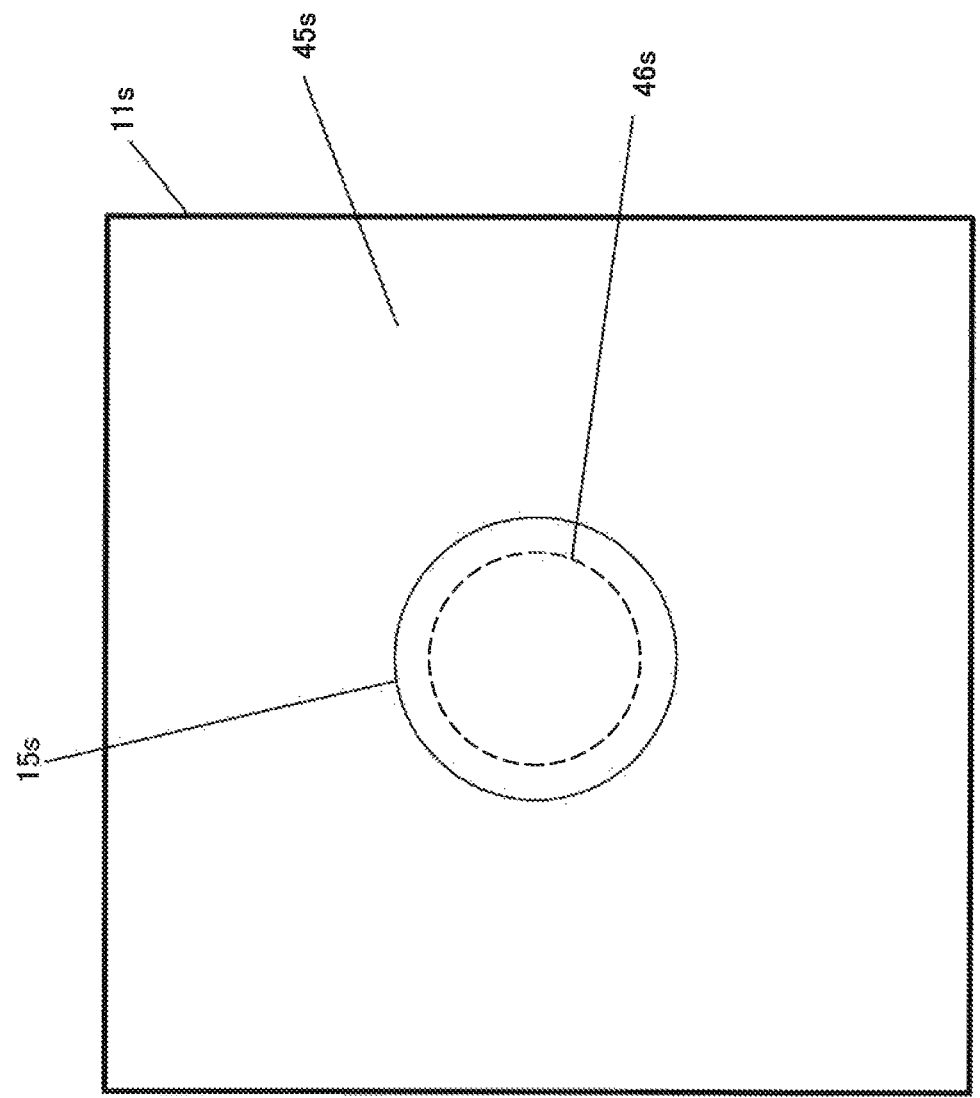
FIG. 46 is a top view (no. 8) illustrating an image of a method of manufacturing a non-reciprocal circuit element.

Next, as illustrated in FIG. 46, the magnet 15s is placed on a portion of a lower face 45s of the substrate 11s, opposing the ferrimagnetic material 23s already placed on the upper face of the substrate 11s. The magnet 15s is fixed to the lower face 45s by means of, for example, an adhesive.

In this way, the non-reciprocal circuit element 10s illustrated in FIGS. 25 to 27 is manufactured.

Next, a method of forming the conductive body cover 14s in such a way as to cover the ferrimagnetic material 23s in a process illustrated in FIG. 45 will be described.

FIGS. 47 to 59 are conceptual views each illustrating an example of a method of forming a conductive body cover for the ferrimagnetic material 23s.

Figure 47:
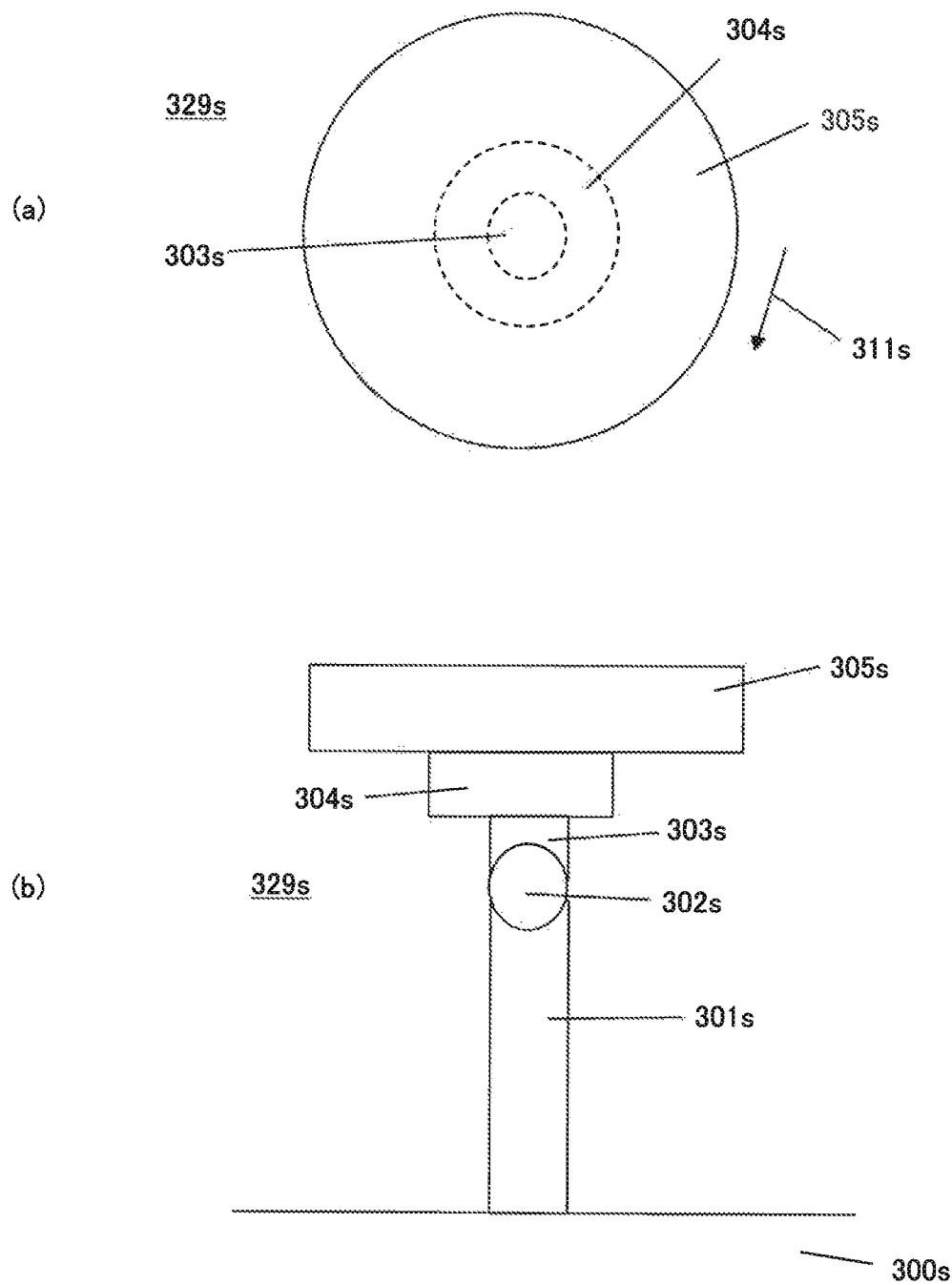
FIG. 47 is a view (no. 1) illustrating an image of a method of manufacturing a conductive body cover.

First, a table 329s having a configuration as illustrated in FIG. 47 is prepared.

The table 329s includes a supporting part 301s, a bending part 302s, a supporting part 303s, a rotating part 304s, and a supporting part 305s. FIG. 47(a) is a top view, and FIG. 47(b) is a side view.

The supporting part 305s is, as will be described later, a member for supporting the substrate 11s on which the ferrimagnetic material 23s is formed, and is connected with the rotating part 304s.

The rotating part 304s can rotate the supporting part 305s in a direction of an arrow 311s illustrated in FIG. 47(a).

The rotating part 304s is connected with a base 300s through the supporting part 303s, the bending part 302s, and the supporting part 301s.

Figure 48:
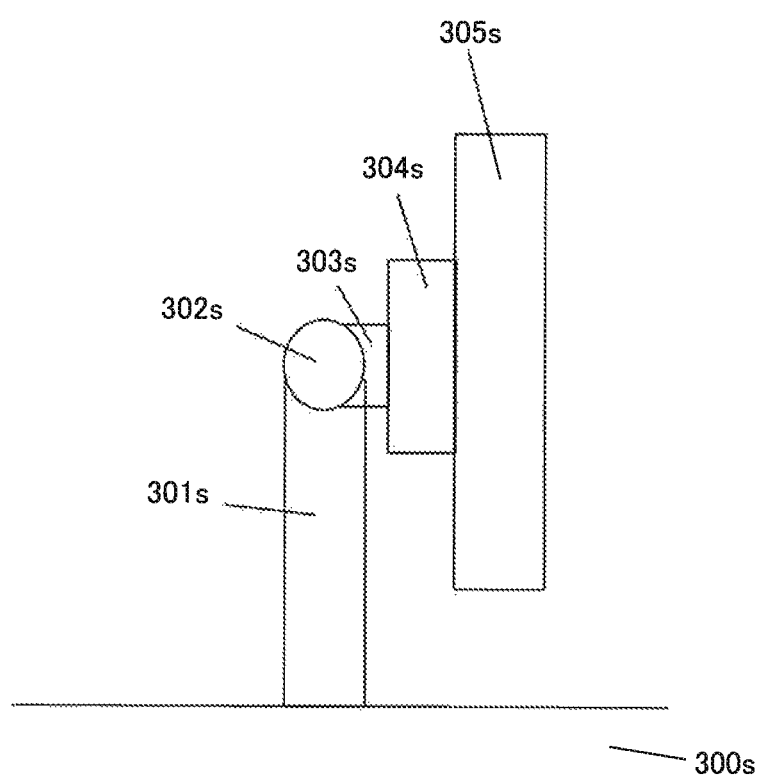
FIG. 48 is a view (no. 2) illustrating an image of a method of manufacturing a conductive body cover.

The bending part 302s can bend between the supporting part 301s and the supporting part 303s in a way as in, for example, FIG. 48.

Figure 49:
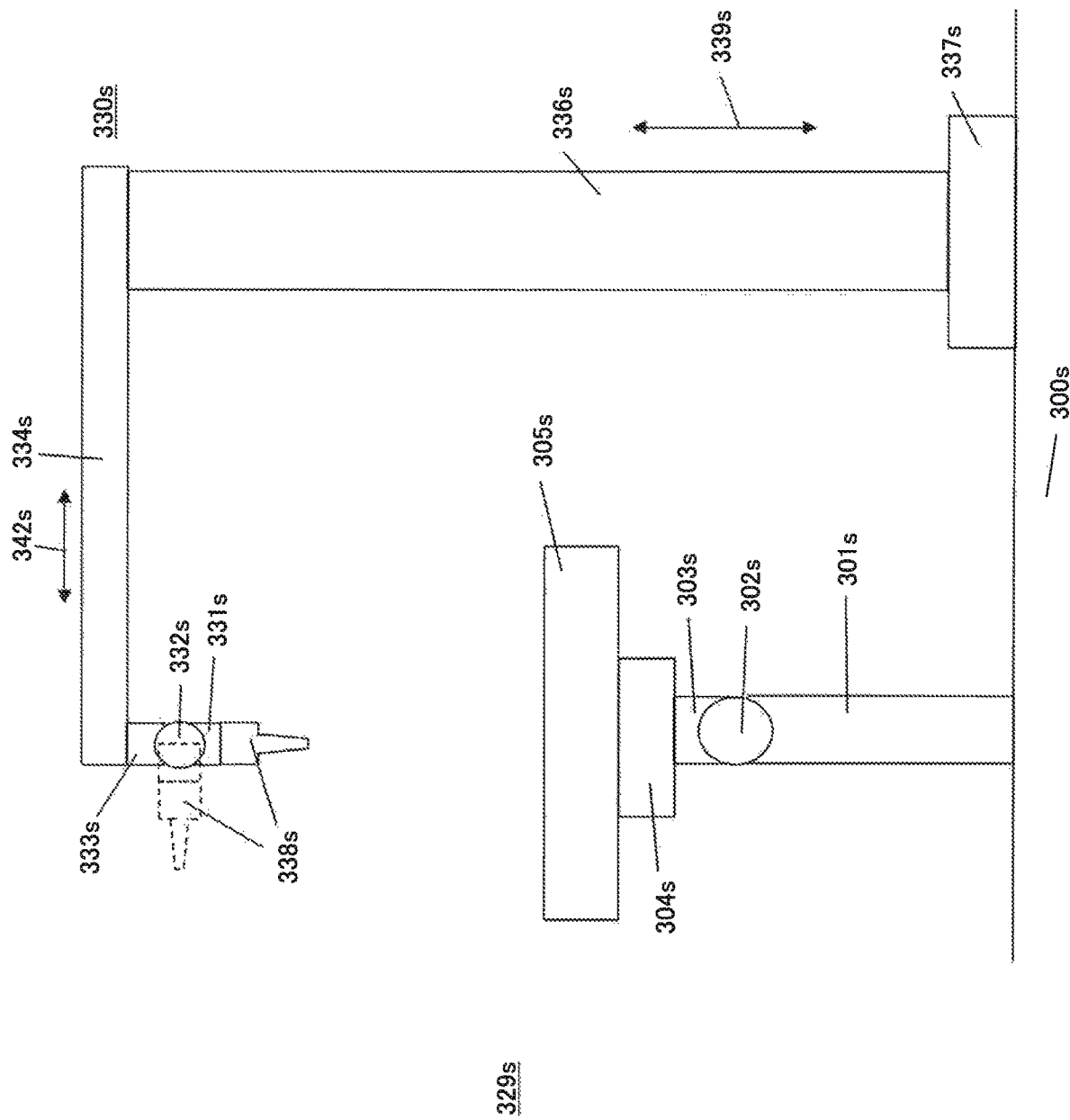
FIG. 49 is a view (no. 3) illustrating an image of a method of manufacturing a conductive body cover.

Next, as illustrated in FIG. 49, an ejecting device 330s is placed in a vicinity of the table 329s.

The ejecting device 330s includes an ejecting part 338s, a supporting part 331s, a bending part 332s, a supporting part 333s, a feeding part 334s, a feeding part 336s, and a moving part 337s.

The ejecting part 338s is a portion for ejecting and spraying, to a portion on which a conductive body cover is scheduled to be formed, a material (hereinafter, referred to as an "ejection object") to be a base of a conductive material that is a material for forming the conductive body cover, and is connected with the supporting part 331s. The supporting part 331s is connected with the supporting part 333s through the bending part 332s. The bending part 332s is a portion for bending between the supporting part 331s and the supporting part 333s. The bending part 332s can direct, by the bending thereof, the supporting part 331s and the ejecting part 338s to, besides a direction illustrated with a solid line in FIG. 49, a direction illustrated with a dotted line, or an intermediate direction between the direction illustrated with the solid line and the direction illustrated with the dotted line.

The supporting part 333s is connected with the feeding part 334s. The feeding part 334s is capable of feeding the supporting part 333s in a direction of an arrow 342s, and thereby can move the ejecting part 338s in the direction of the arrow 342s.

The feeding part 336s is capable of feeding the feeding part 334s in a direction of an arrow 339s, and thereby can change a height of the ejecting part 338s.

The feeding part 336s is placed on the base 300s with the moving part 337s therebetween.

The moving part 337s can move the feeding part 336s and a portion connected therewith in a direction perpendicular to the plane of the figure when facing FIG. 49 (a direction perpendicular to both the arrow 342s and the arrow 339s). Consequently, the moving part 337s can move the ejecting part 338s in the direction.

As the ejecting part 338s, for example, a jet dispenser and a needle dispenser, which are widely available in general, may be used.

An ejection object to be ejected by the ejecting part 338s is, for example, a liquid substance mixing a conductive resin and a metal particle with liquid.

Figure 50:
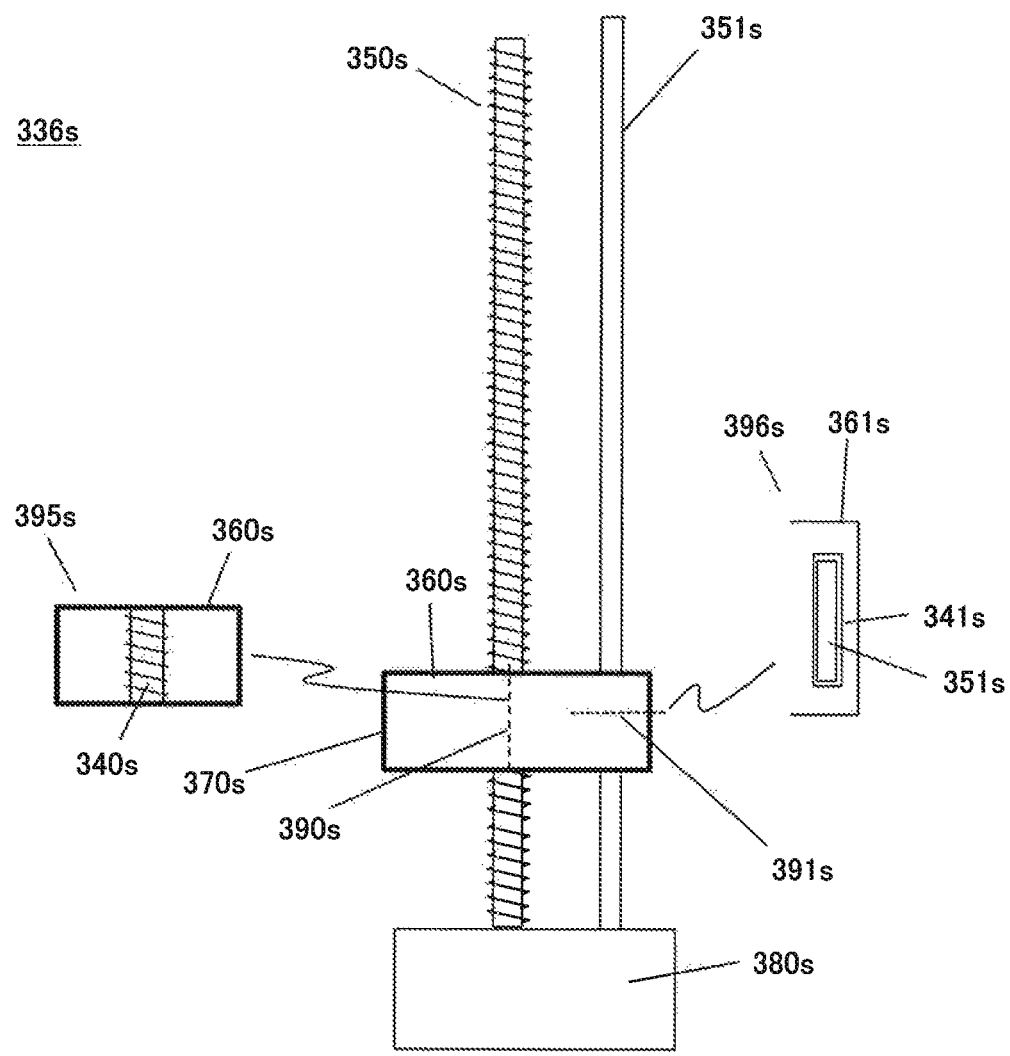
FIG. 50 is a conceptual view illustrating a configuration example of a feeding part.

FIG. 50 is a conceptual view illustrating a configuration example of the feeding part 336s.

The feeding part 336s includes a drive part 380s, a shaft 350s, a shaft 351s, and a supporting part 360s.

The shaft 350s is connected with the drive part 380s. The drive part 380s can rotate the shaft 350s connected therewith in the circumferential direction. The drive part 380s is typically a rotary motor, and is driven by electric power supplied from a not-illustrated power supply.

A thread ridge is formed on a side face of the shaft 350s.

A bearing part 340s through which the shaft 350s is inserted is formed in the supporting part 360s. As illustrated in a sectional view 395s in a case of assuming that cutting is performed along a cutting line 390s, a thread groove that receives the thread ridge on the side face of the shaft 350s is formed on the bearing part 340s.

The shaft 351s is connected with an upper face of the drive part 380s, but is not driven by the drive part 380s.

As illustrated in a sectional view 396s assuming a case in which cutting is performed along a cutting line 391s, a bearing part 341s through which the shaft 351s is inserted is formed in the supporting part 360s, and the shaft 351s can move along the bearing part 341s.

With this structure, the shaft 351s prevents the supporting part 360s from rotating in a rotation direction of the shaft 350s along with rotation of the shaft 350s.

As described above, the supporting part 360s can be moved in a vertical direction by rotating the shaft 350s in a circumferential direction by means of the drive part 380s. Thus, when another member is connected with a connecting portion 370s, the feeding part 334s can feed the member in a vertical direction.

Regarding the feeding part 334s, the same structure as that of the feeding part 336s illustrated in FIG. 50 can be also used.

Figure 51:
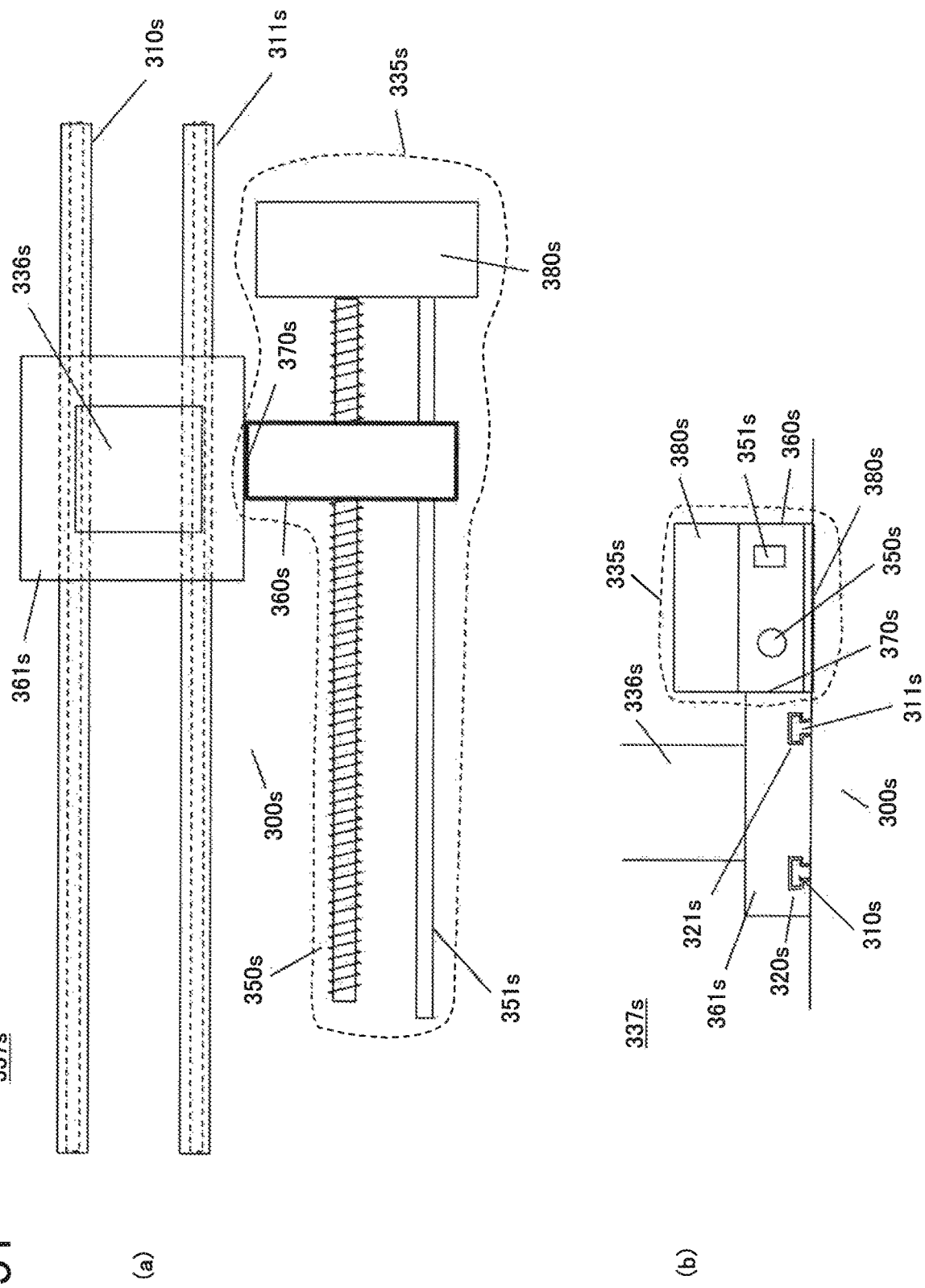
FIG. 51 is a conceptual view illustrating a configuration example of a moving part.

FIG. 51 is a conceptual view illustrating a configuration example of the moving part 337s. In FIG. 51, the feeding part 336s is illustrated as well.

The moving part 337s includes a rail 310s, a rail 311s, a supporting part 361s, and a feeding part 335s.

A configuration of the feeding part 335s is the same as the configuration of the feeding part 336s illustrated in FIG. 50, and description therefor is also as described above.

The drive part 380s of the feeding part 335s is fixed on the base 300s.

The rails 310s and 311s are placed on the base 300s. Each of the rails 310s and 311s has a shape with an upper part thereof larger than a lower part thereof.

The supporting part 361s is placed on the base 300s in such a way that a lower face thereof makes contact with an upper face of the base 300s, but is not fixed to the base 300s. In addition, rail receivers 320s and 321s that receive the rails 310s and 311s are formed on a lower part of the supporting part 361s. A width of the upper part of each of the rails 310s and 311s in FIG. 51(b) is larger than a width of a lower part of each of the rail receivers 320s and 320s. Thus, the rails 310s and 311s do not easily come off the supporting part 361s.

Accordingly, the supporting part 361s can move on the base 300s along the rails 310s and 311s while preventing the rails 310s and 311s from coming off the rail receivers 320s and 321s.

Further, the connecting portion 370s of the supporting part 360s is fixed to a side face of the supporting part 361s.

With the above structure, the supporting part 361s can be moved along rails by driving the drive part 380s with a not-illustrated power supply and the like. Accordingly, the feeding part 336s connected with an upper part of the supporting part 361s can be moved along the rails.

Figure 52:
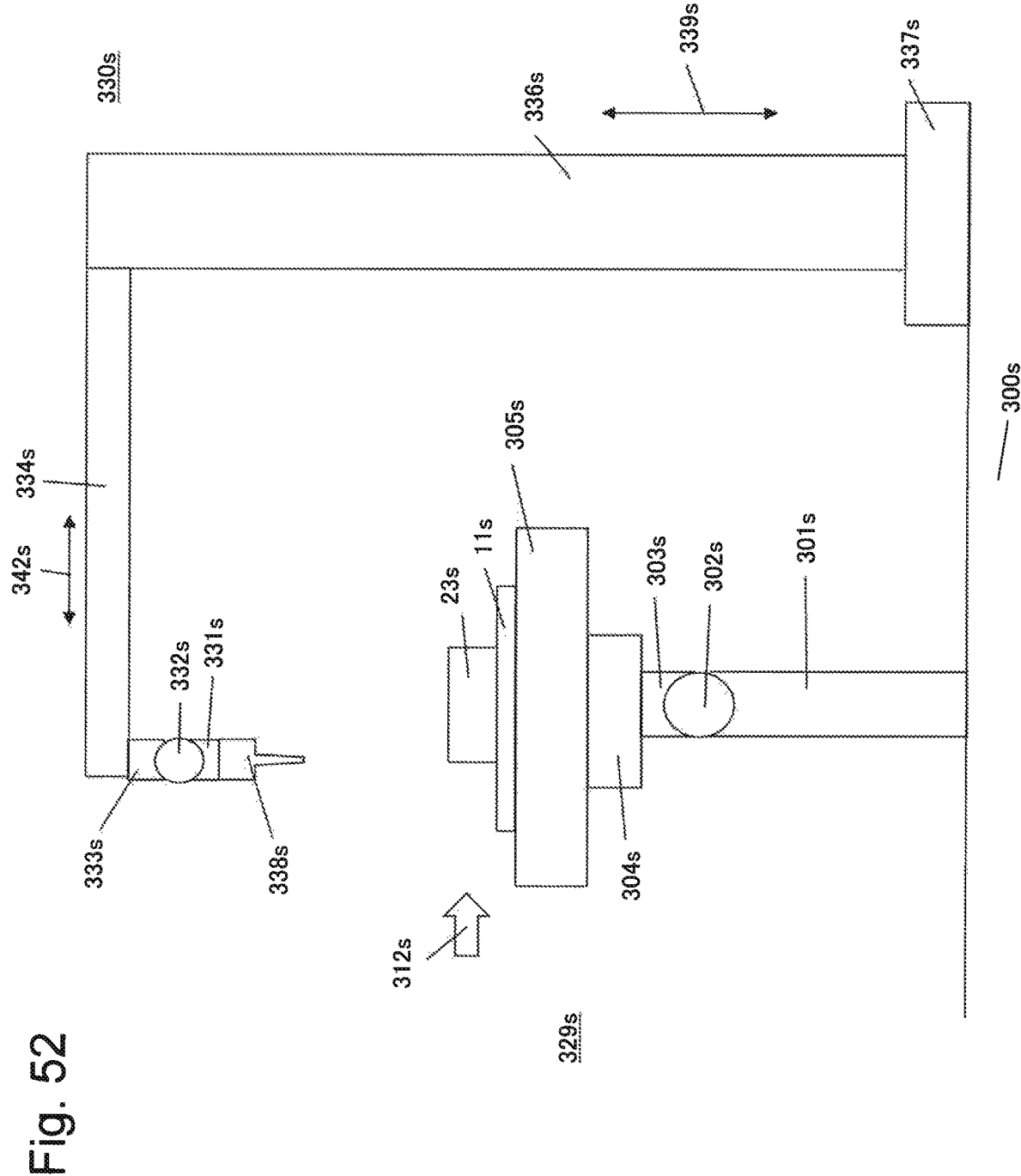
FIG. 52 is a view (no. 4) illustrating an image of a method of manufacturing a conductive body cover.

Next, as illustrated in FIG. 52, a worker or the like (indicating a worker or a thing that a worker uses) places the substrate 11s on which the ferrimagnetic material 23s is placed, which is created in the process illustrated in FIG. 44, on the supporting part 305s. Herein, it is assumed that an arrow 312s illustrated in FIG. 52 and an arrow 312s illustrated in FIG. 44 represent the same direction.

Figure 53:
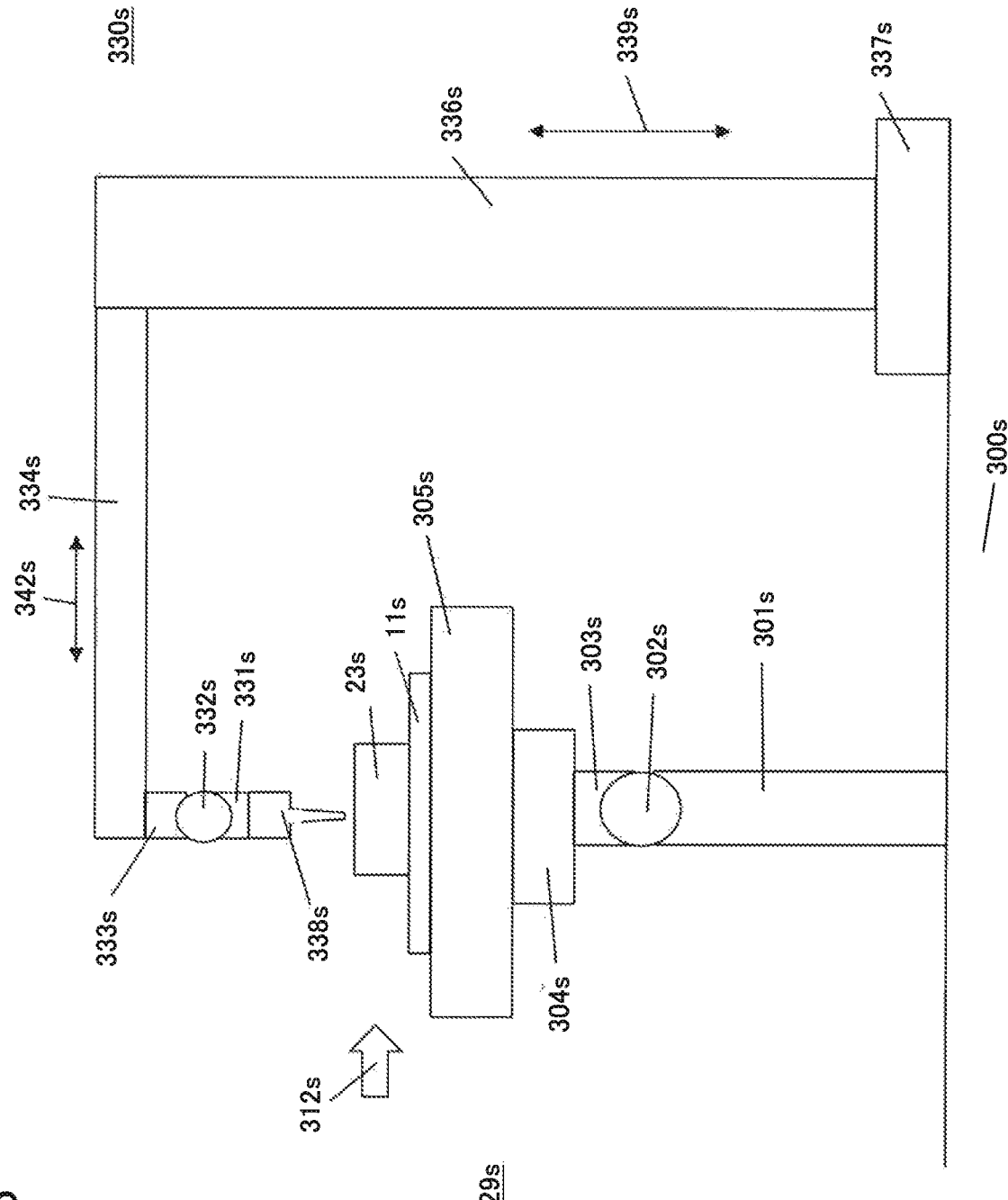
FIG. 53 is a view (no. 5) illustrating an image of a method of manufacturing a conductive body cover.

Then, as illustrated in FIG. 53, the ejecting device 330s places, by feed performed by the feeding parts 334s and 336s and movement of the moving part 337s, the ejecting part 338s at a predetermined position for spraying an ejection object to the ferrimagnetic material 23s by ejection. In the state, the ejecting device 330s starts spraying of the ejection object with the ejecting part 338s, and performs feed of the ejecting part 338s by the feeding part 334s and movement of the ejecting part 338s by the moving part 337s while performing the spraying. Accordingly, the ejecting device 330s deposits the ejection object in a shape into which a conductive body cover upper part (the conductive body cover upper part 140s in FIG. 25) above the ferrimagnetic material 23s is scheduled to be formed.

Figure 54:
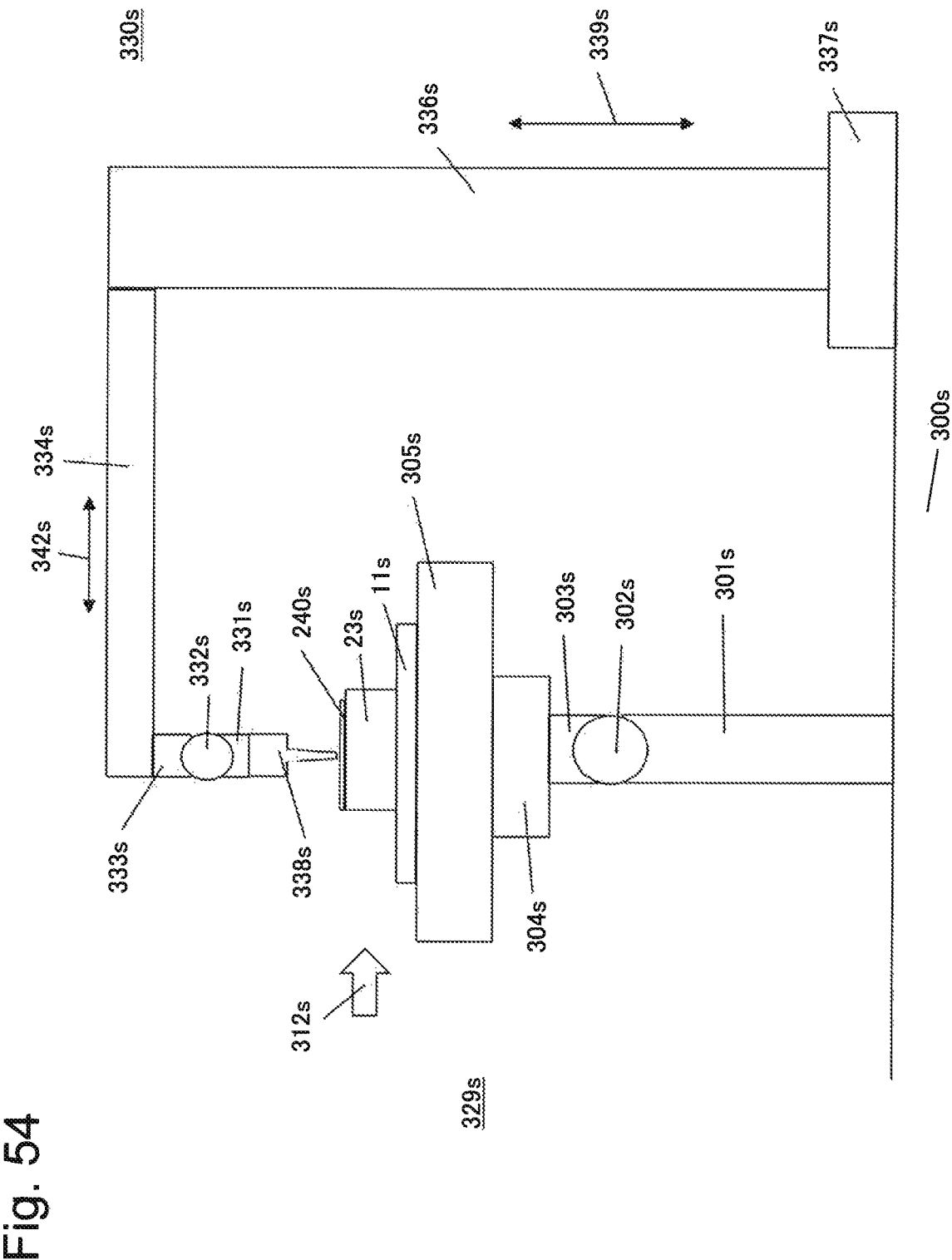
FIG. 54 is a view (no. 6) illustrating an image of a method of manufacturing a conductive body cover.

FIG. 54 illustrates a state in which a deposit 240s of the ejection object in a shape corresponding to the conductive body cover upper part 140s is formed on the ferrimagnetic material 23s by the process illustrated in FIG. 53.

Figure 55:
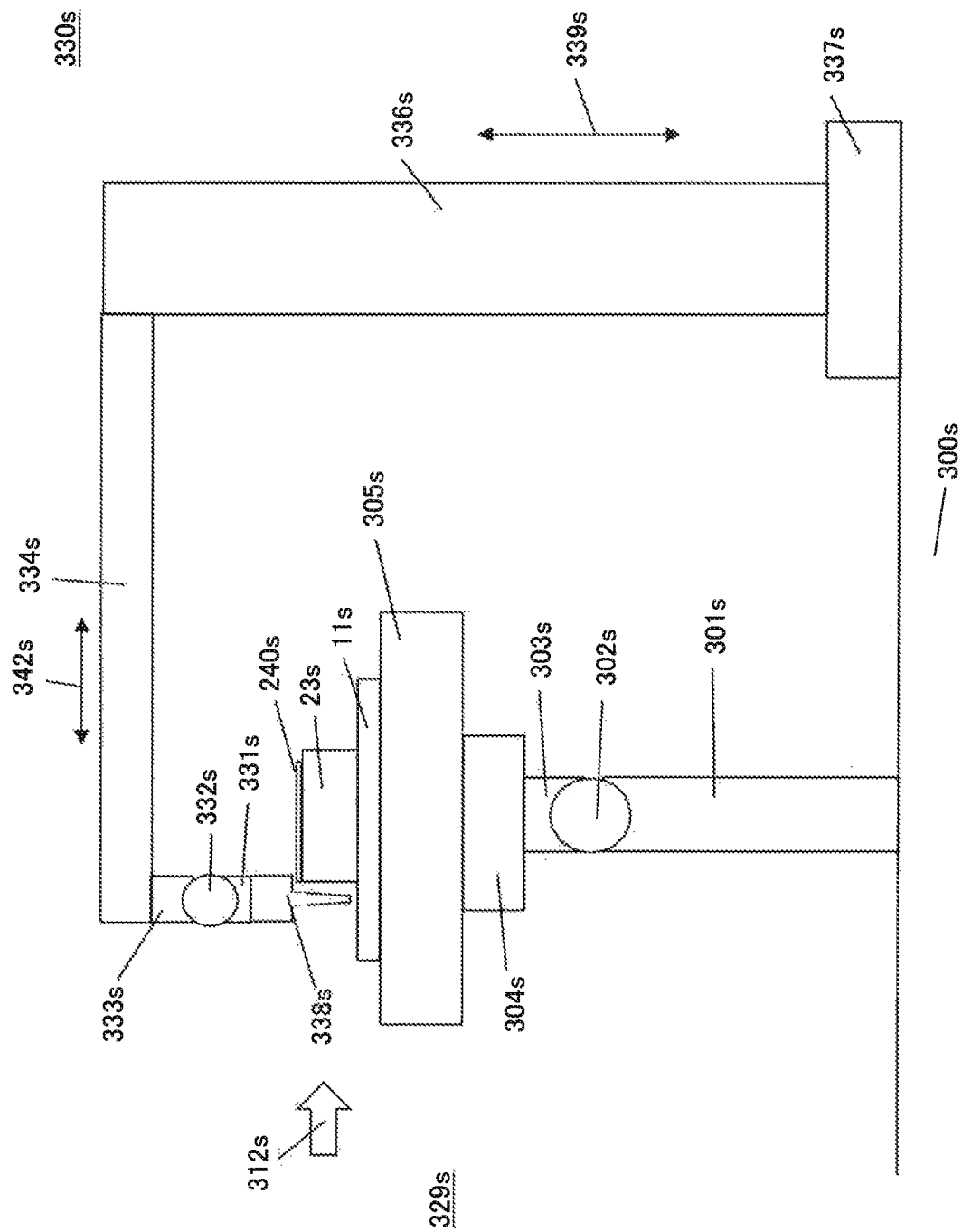
FIG. 55 is a view (no. 7) illustrating an image of a method of manufacturing a conductive body cover.

Then, as illustrated in FIG. 55, the ejecting part 338s is arranged, by feed performed by the feeding parts 334s and 336s, at a predetermined position for ejecting the ejection object for forming a conductive body cover foot part (for example, the conductive body cover foot part 141bs in FIG. 25) on the substrate. Then, while performing ejection of the ejection object with the ejecting part 338s, the ejecting part 338s is moved by feed performed by the feeding part 334s and movement of the moving part 337s, and the ejection object is deposited in a shape on the substrate 11s scheduled as a shape of the conductive body cover foot part.

Figure 56:
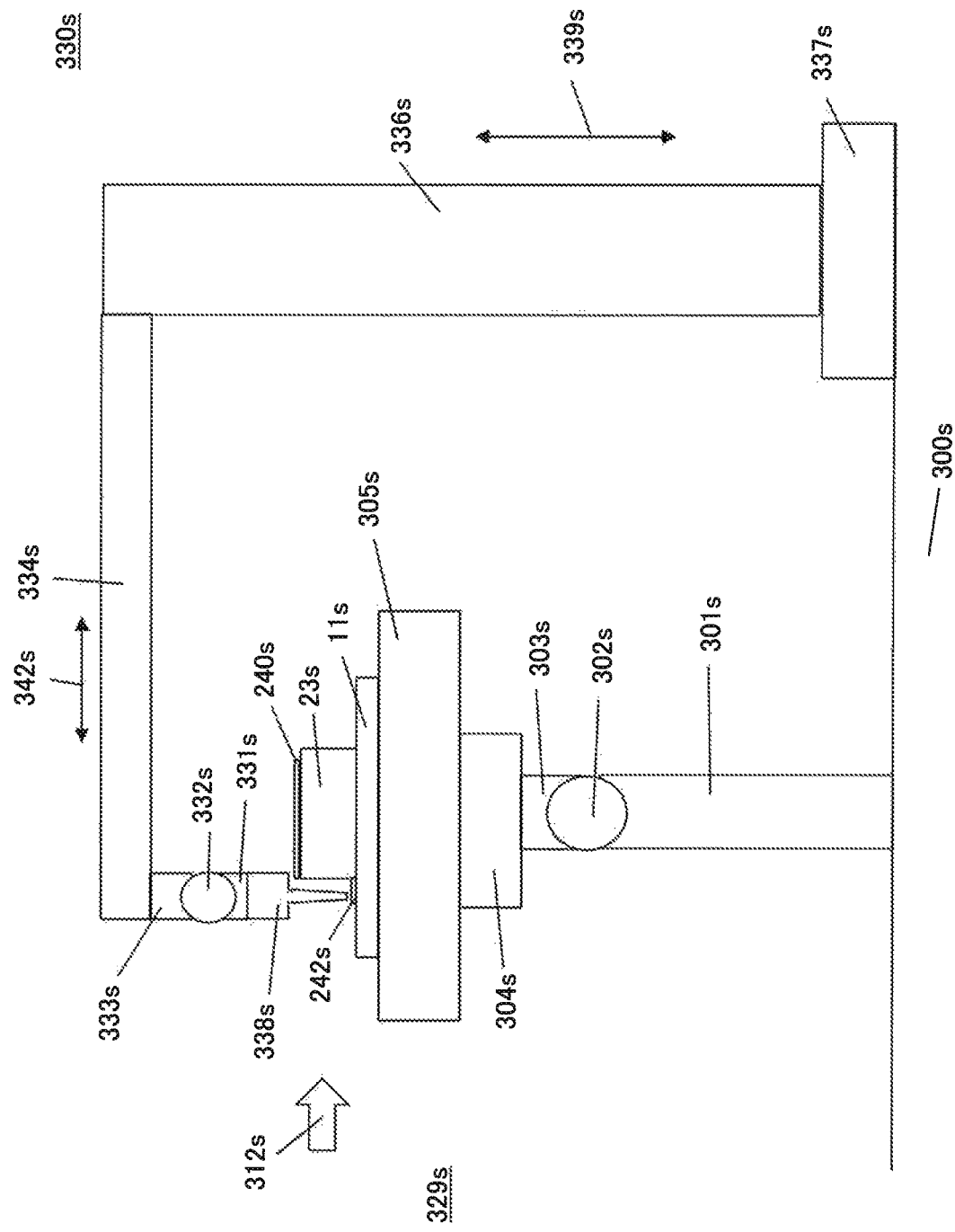
FIG. 56 is a view (no. 8) illustrating an image of a method of manufacturing a conductive body cover.

FIG. 56 illustrates a state in which a deposit 242s of the ejection object in a shape corresponding to the conductive body cover foot part 141bs is formed on the substrate 11s.

Next, the ejecting device 330s rotates the rotating part 304s by 120 degrees, and thereafter moves the ejecting part 338s by feed performed by the feeding part 334s and movement performed by the moving part 337s while performing spraying of the ejection object with the ejecting part 338s. Then, the ejecting device 330s deposits the ejection object in a shape on the substrate 11s scheduled as a shape of a second conductive body cover foot part (for example, the conductive body cover foot part 142bs in FIG. 25).

Thereafter, the table 329s rotates the rotating part 304s by 120 degrees in the same direction. Thereafter, the ejecting device 330s moves the ejecting part 338s by feed performed by the feeding part 334s and movement performed by the moving part 337s while performing ejection of the ejection object with the ejecting part 338s. Accordingly, the ejecting device 330s deposits the ejection object in a shape on the substrate 11s scheduled as a shape of a third conductive body cover foot part (for example, the conductive body cover foot part 142bs in FIG. 25).

Thereafter, the table 329s rotates the rotating part 304s by 120 degrees in the same direction.

Figure 57:
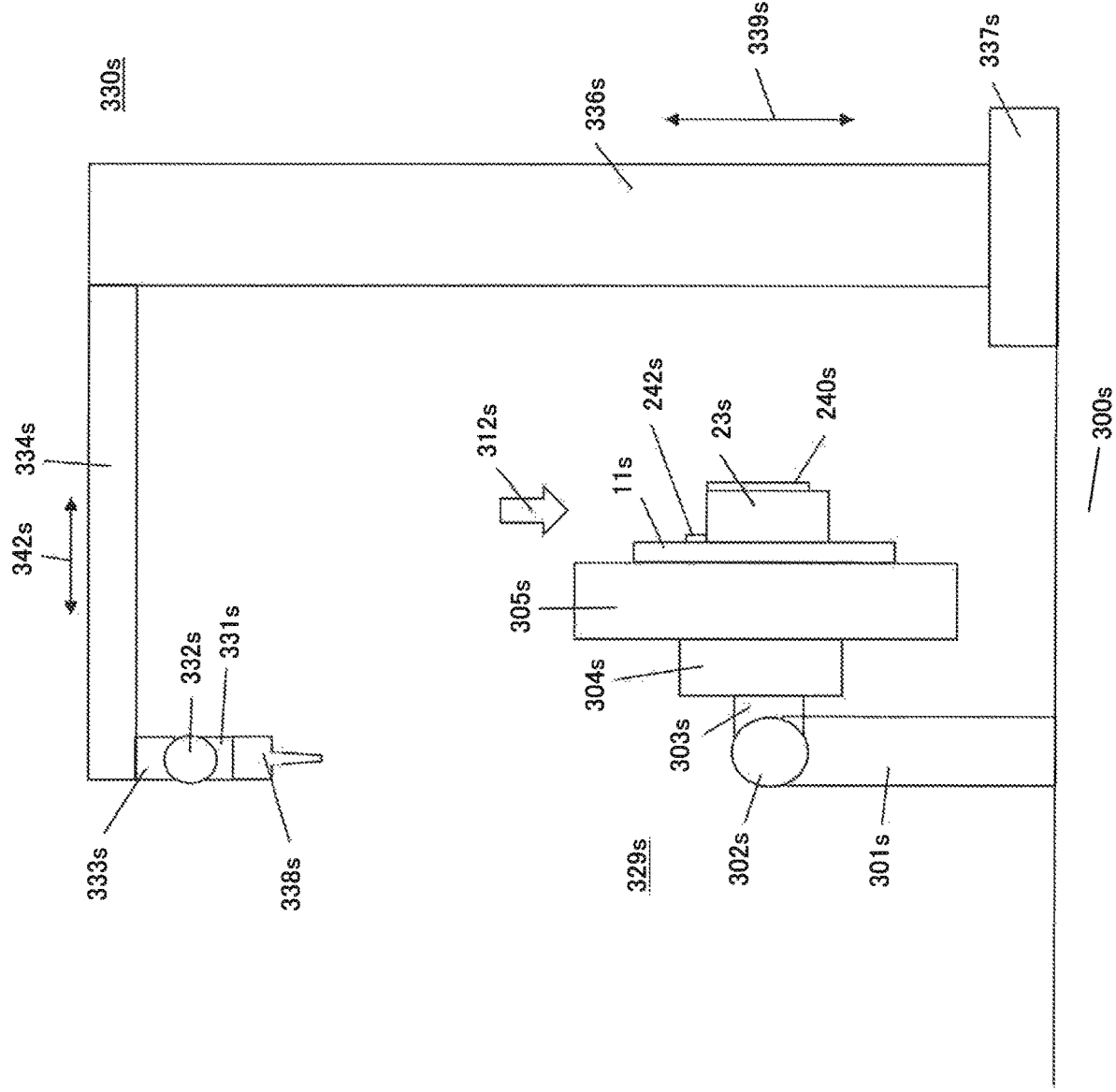
FIG. 57 is a view (no. 9) illustrating an image of a method of manufacturing a conductive body cover.

Next, as illustrated in FIG. 57, the ejecting device 330s first performs upward feed of the feeding part 334s by the feeding part 336s. Then, the ejecting device 330s bends, with the bending part 302s, the supporting part 303s, the rotating part 304s, the supporting part 305s, the substrate 11s, and the ferrimagnetic material 23s in a way as illustrated in FIG. 57.

Figure 58:
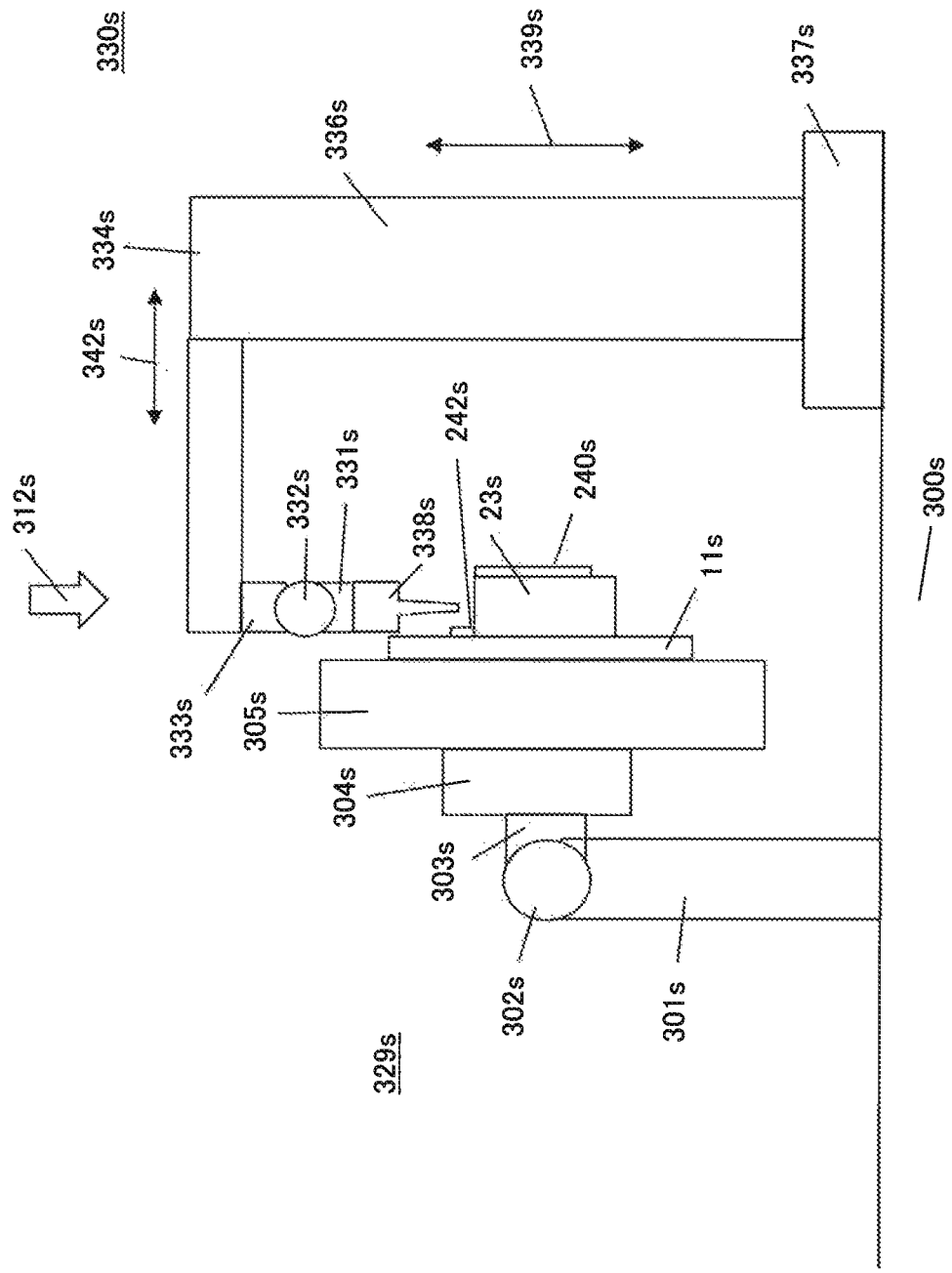
FIG. 58 is a view (no. 10) illustrating an image of a method of manufacturing a conductive body cover.

Then, as illustrated in FIG. 58, the ejecting device 330s places, by the feeding parts 334s and 336s, the ejecting part 338s at a predetermined position to which the ejection object is to be sprayed in order to form a conductive body cover side part (for example, the conductive body cover side part 141as illustrated in FIG. 25). Then, the ejecting device 330s deposits the ejection object in a shape into which the conductive body cover side part is to be formed on a side face of the ferrimagnetic material 23s, and forms a deposit 241s.

Figure 59:
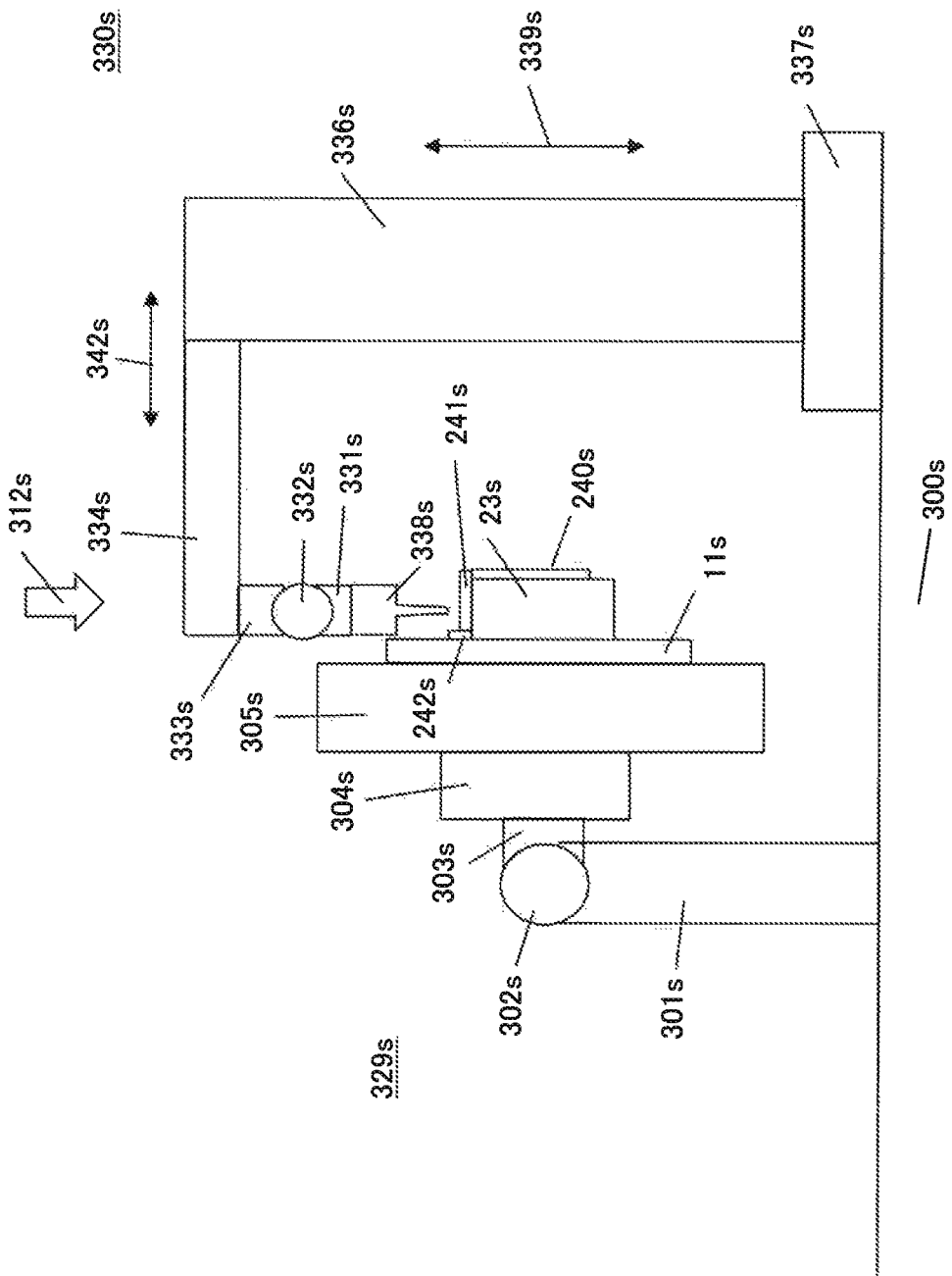
FIG. 59 is a view (no. 11) illustrating an image of a method of manufacturing a conductive body cover.

FIG. 59 illustrates a state in which the deposit 241s is formed.

Thereafter, the table 329s rotates the rotating part 304s by 120 degrees. Then, the ejecting device 330s deposits the ejection object in a shape into which a second conductive body cover side part (for example, the conductive body cover side part 142as in FIG. 25) is to be formed on the side face of the ferrimagnetic material 23s, and forms a deposit.

Thereafter, the table 329s rotates the rotating part 304s by 120 degrees. Then, the ejecting device 330s deposits the ejection object in a shape into which a third conductive body cover side part (for example, the conductive body cover side part 143as in FIG. 25) is to be formed on the side face of the ferrimagnetic material 23s, and forms a deposit.

Finally, the worker or the like detaches, from the supporting part 305s, the substrate 11s on which the placed ferrimagnetic material 23s has the deposits 240s, 241s, and 242s, and the like formed thereon. Then, as needed, the worker or the like heats, by using a furnace and the like, the substrate 11s on which the ferrimagnetic material 23s has the deposits 240s, 241s, and 242s, and the like formed thereon. The heating is a process to be performed when an organic solvent contained in the deposits 240s, 241s, and 242s, and the like of the ejection object is desired to be dispersed, when metal powders contained in the ejection object are desired to be sintered to improve conductivity, and the like.

In this way, the deposits 240s, 241s, and 242s, and the like of the ejection object (objects after heating corresponding thereto when the heating described above is performed) are formed as a conductive body cover.

Figure 60:
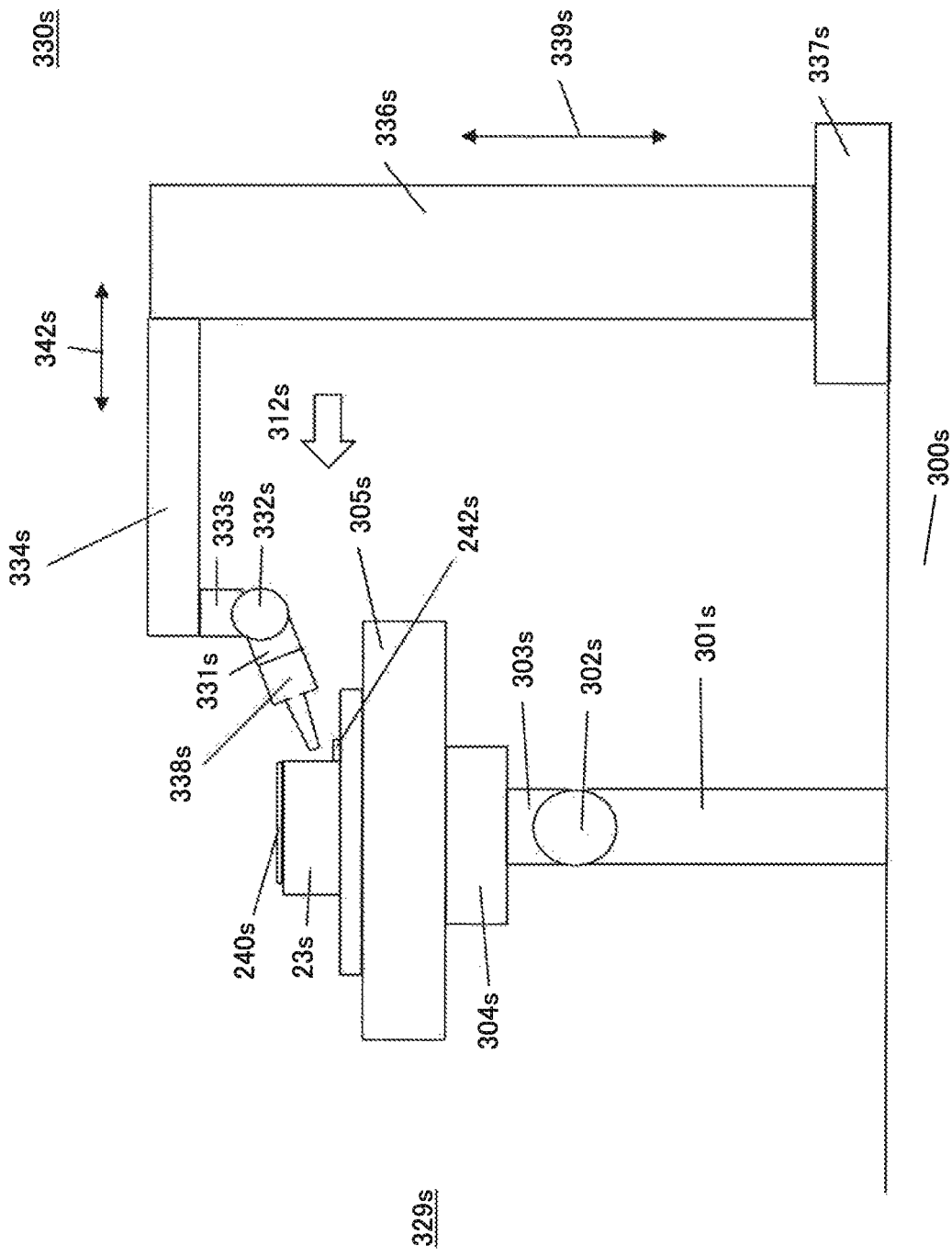
FIG. 60 is a view (no. 12) illustrating an image of a method of manufacturing a conductive body cover.

Formation of the deposit 241s corresponding to a conductive body cover side part may be also performed by using a method illustrated in FIG. 60, instead of the method described in FIG. 58. In the method, the table 329s does not bend between the supporting part 301s and the supporting part 303s with the bending part 302s, but rotates the ferrimagnetic material 23s by 180 degrees with the rotating part 304s. Next, the ejecting device 330s sets, with the bending part 332s, the ejecting part 338s at a predetermined angle relative to the ferrimagnetic material 23s. The ejecting device 330s further places, by feed performed by the feeding parts 334s and 336s, the ejecting part 338s at a predetermined position for performing spraying for forming a conductive body cover side part on the ferrimagnetic material 23s. Then, while moving the ejecting part 338s by feeding with the feeding part 336s and movement with the moving part 337s, the ejection object is sprayed to a portion on which a conductive body cover side part is scheduled to be formed.

By using the examples of a manufacturing method described with reference to FIGS. 47 to 60, a conductive body cover upper part and a conductive body cover side part are respectively formed on an upper part and a side part of the ferrimagnetic material 23s having the dielectric material 30s formed on a side part and an upper part of the ferrimagnetic material 13s. The conductive body cover upper part and the conductive body cover side part are formed directly on the dielectric material 30s, and are firmly adhered to the dielectric material 30s.

In the examples of a manufacturing method described with reference to FIGS. 47 to 60, examples have been illustrated in which all of a conductive body cover upper part, a conductive body cover foot part, and a conductive body cover side part of a conductive body cover are formed by a process including ejection of an ejection object. However, not all of the above parts need to be formed by a process including ejection of an ejection object. For example, only a conductive body cover side part and a conductive body cover foot part may be formed by a process including ejection of an ejection object. In this case, a conductive plate and the like having a predetermined shape may be used as a conductive body cover upper part. In the case, the conductive plate is placed on an upper part of a ferrimagnetic material, and thereafter, a conductive body cover side part and a conductive body cover foot part may be formed by a process including spraying of an ejection object.

In addition, when a conductive body cover side part can be electrically connected directly with a transmission line (for example, the transmission lines 16s, 17s, and 18s in FIG. 25), formation of a conductive body cover foot part may be omitted.

Further, at least a part of a conductive body cover may be manufactured by a process of forming a to-be-removed object pattern, thereafter forming a conductive film, and further thereafter removing the to-be-removed object. Herein, the to-be-removed object is an object scheduled to be removed in a subsequent process. As the to-be-removed object, for example, an object that is easily dissolved in liquid, and an object that is easily evaporated or burned by being applied with heat may be used. As the object that is easily dissolved in liquid, for example, an organic material that is easily dissolved in an organic solvent, and an inorganic material that is easily dissolved in water may be used. When an object that is easily dissolved in liquid is used, a to-be-removed object is removed in a subsequent process by being immersed in liquid that easily dissolves the to-be-removed object. As the object that is easily evaporated or burned by being applied with heat, for example, an organic material that is easily evaporated or burned by being applied with heat may be used. When an object that is easily evaporated or burned by being applied with heat is used as a to-be-removed object, the to-be-removed object is removed in a subsequent process by being applied with heat.

FIGS. 61 to 64 are conceptual views each illustrating a method of manufacturing a conductive body cover that includes a process of forming a to-be-removed object pattern. FIGS. 61 to 64 are perspective views.

Figure 61:
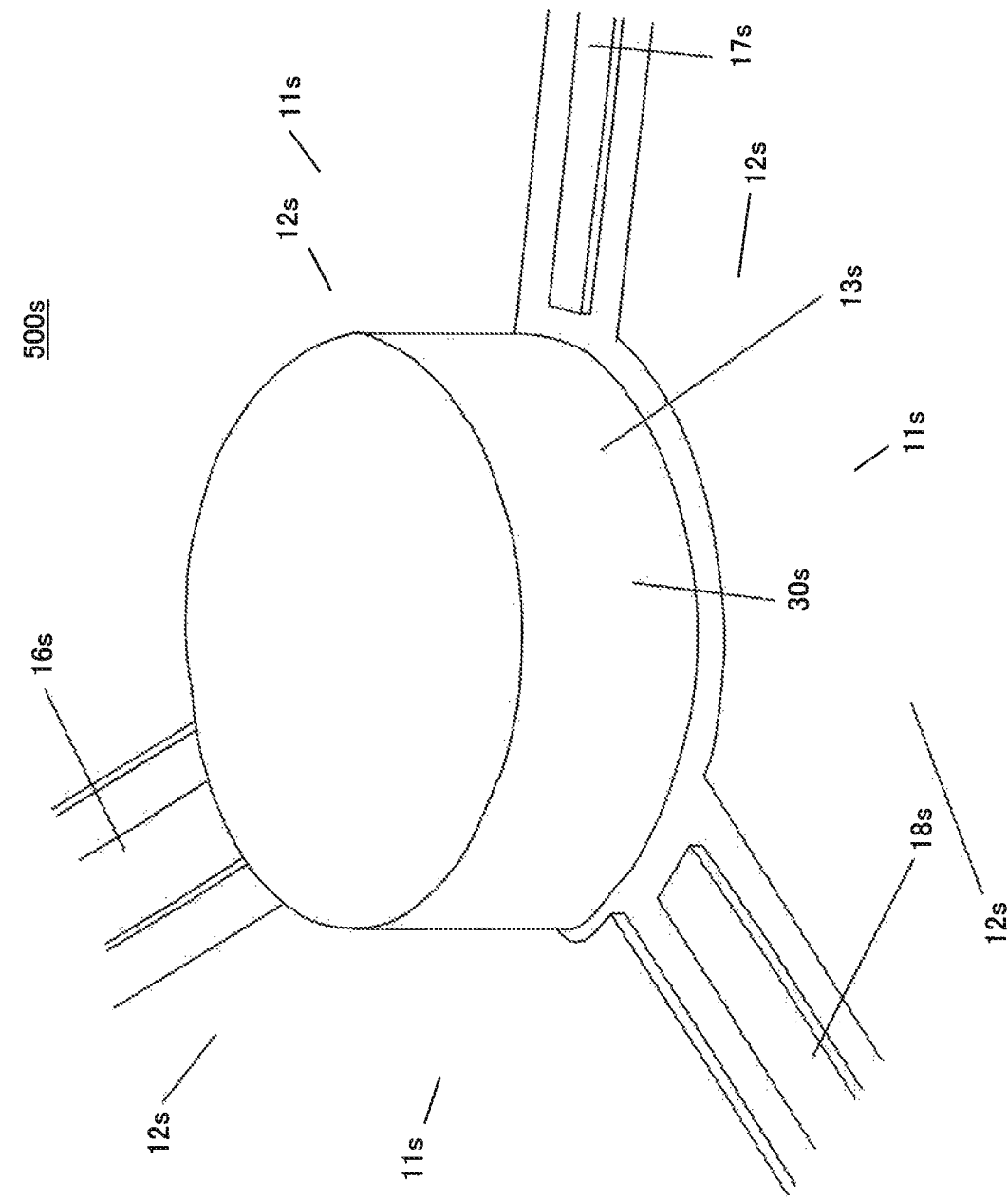
FIG. 61 is a conceptual view (no. 1) illustrating a method of manufacturing a conductive body cover that includes a process of forming a to-be-removed object pattern.

First, as illustrated in FIG. 61, a structure 500s before formation of a conductive body cover is prepared. The structure 500s is a structure equivalent to the non-reciprocal circuit element 10s illustrated in FIG. 25 from which the conductive body cover 14s is removed. As for a content of each configuration assigned with a reference numeral in FIGS. 61 to 64, refer to the description about the configuration assigned with the same reference numeral in FIG. 1.

Figure 62:
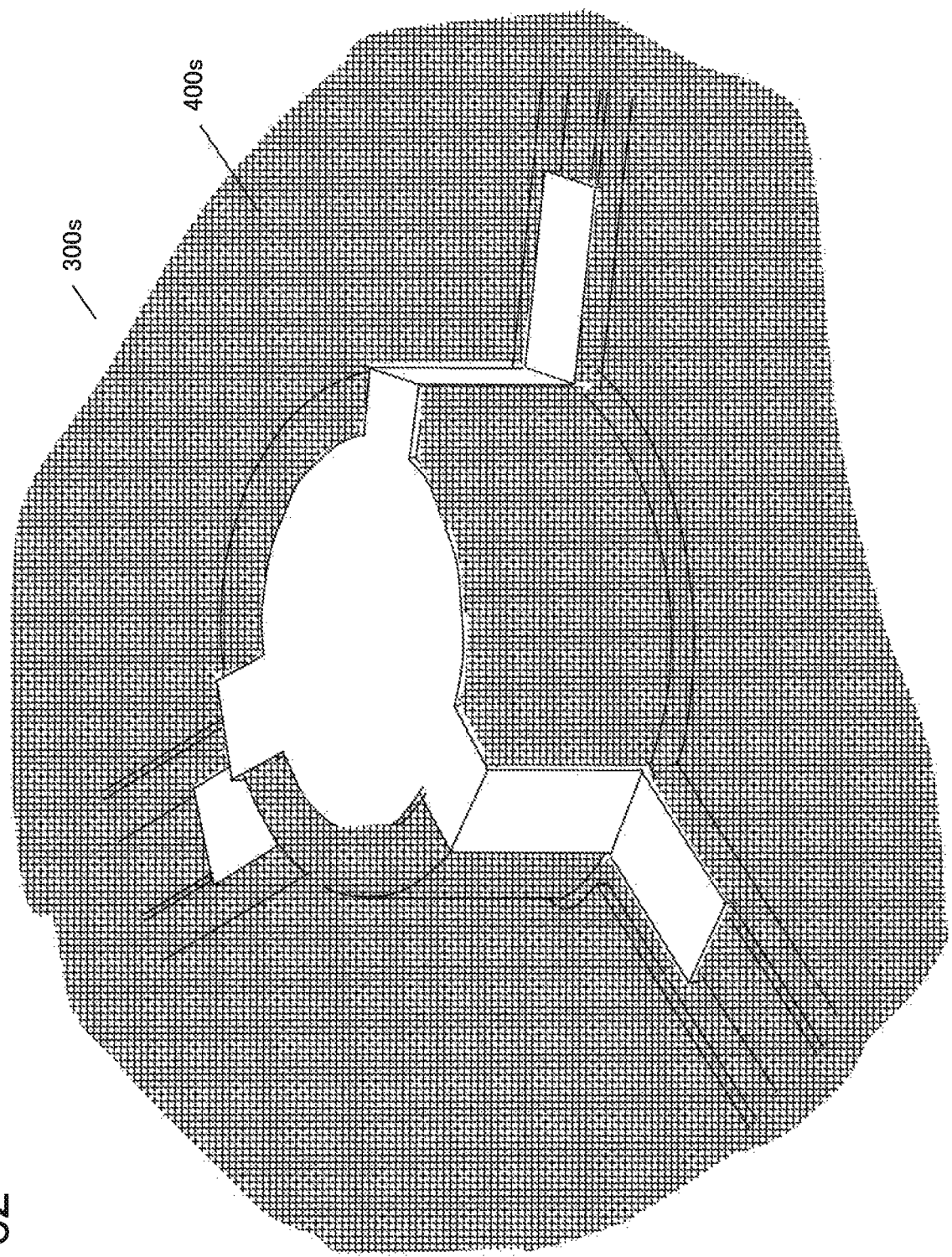
FIG. 62 is a conceptual view (no. 2) illustrating a method of manufacturing a conductive body cover that includes a process of forming a to-be-removed object pattern.

Next, as illustrated in FIG. 62, a to-be-removed object 400s is formed on a portion of a surface of the structure 500s, other than a portion on which a conductive body cover is scheduled to be formed. A shaded portion in FIG. 62 illustrates how the to-be-removed object 400s is formed. The to-be-removed object 400s is not formed on a portion on which a conductive body cover is scheduled to be formed.

Formation of the to-be-removed object 400s may be performed by spraying or coating of liquid to be a base of the to-be-removed object 400s. In the case, formation of the to-be-removed object 400s may be performed by covering, with a cover, a portion on which a conductive body cover is scheduled to be formed, then spraying or coating on an entirety, and thereafter removing the cover. After spraying or coating of liquid to be a base of the to-be-removed object 400s, the liquid is solidified to form the to-be-removed object 400s. For solidification in the case, drying through evaporation of a solvent, degradation through a chemical reaction, and the like may be used.

Figure 63:
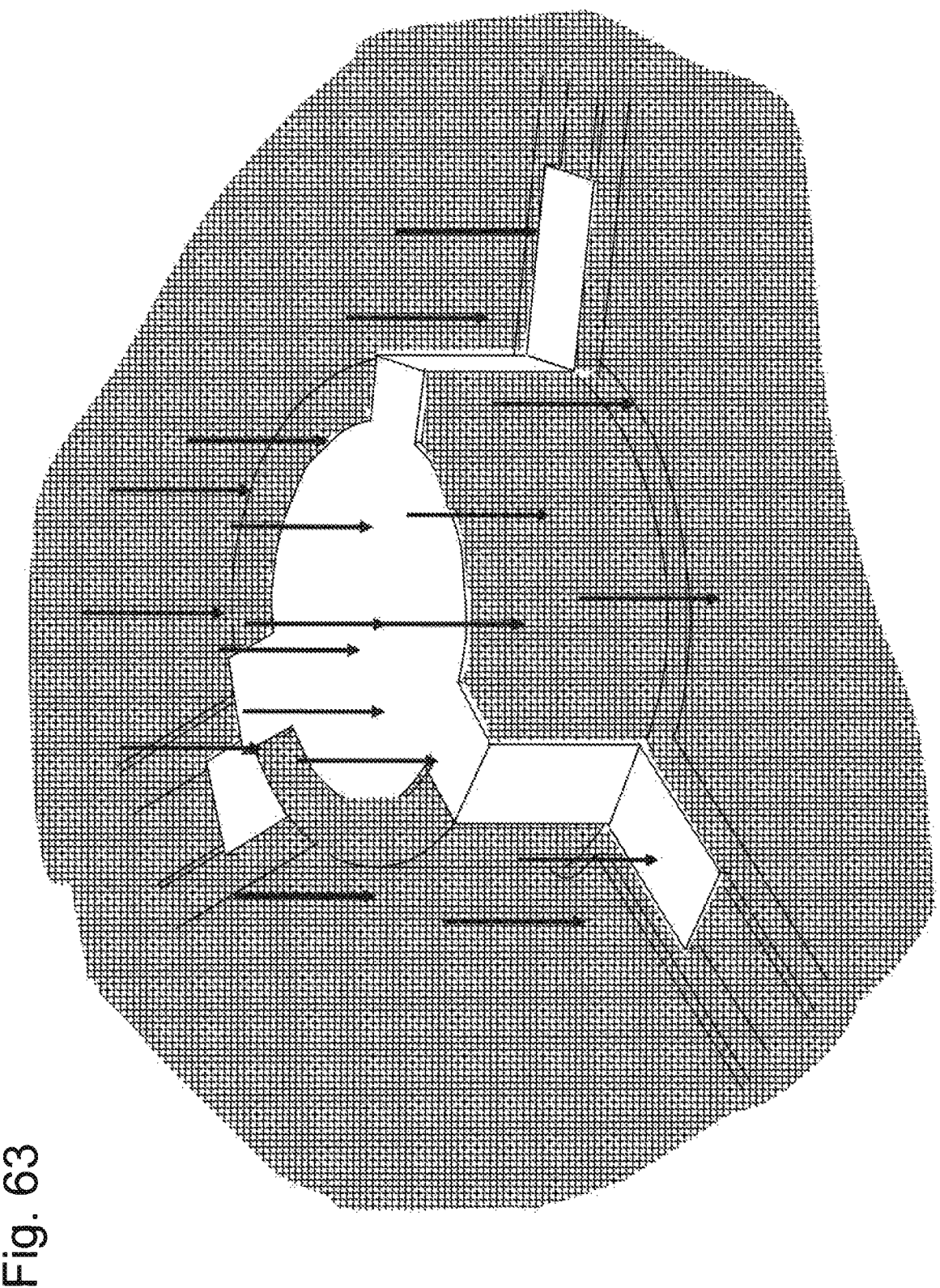
FIG. 63 is a conceptual view (no. 3) illustrating a method of manufacturing a conductive body cover that includes a process of forming a to-be-removed object pattern.

Next, as illustrated in FIG. 63, formation of a conductive body is performed on an entire structure illustrated in FIG. 62. Arrows in FIG. 63 are an image of how the conductive body is formed. Formation of the conductive body may be performed by, for example, vapor deposition, sputtering, plating, and the like.

Alternatively, formation of the conductive body may be performed by spraying a mixture obtained by mixing conductive particles with liquid, and thereafter the mixture may be solidified. The solidified mixture in the case is a substance that is hardly dissolved by a solvent for use in a next process to be described below.

Figure 64:
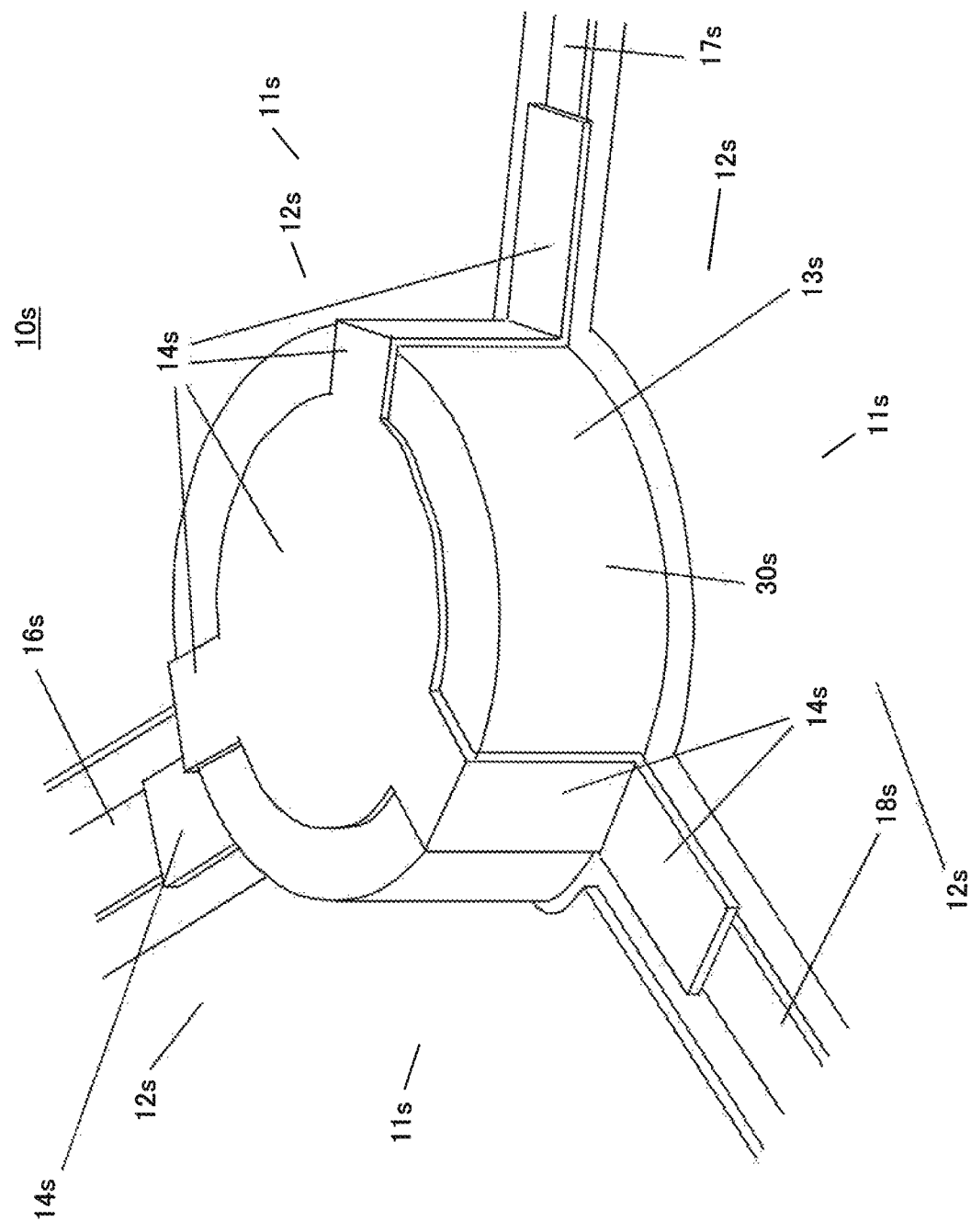
FIG. 64 is a conceptual view (no. 4) illustrating a method of manufacturing a conductive body cover that includes a process of forming a to-be-removed object pattern.

Thereafter, a structure manufactured in the process illustrated in FIG. 63 is immersed in, for example, a solvent for dissolving the to-be-removed object 400s, and the to-be-removed object 400s is dissolved and removed. Accordingly, the conductive body formed by the process illustrated in FIG. 62 at a portion from which the to-be-removed object 400s has been removed is peeled off, and can be easily removed by application of pressure with solid, liquid, or gas. FIG. 64 illustrates the non-reciprocal circuit element 10s, which is a structure after removing the conductive body at a portion from which the to-be-removed object 400s has been removed.

Further, at least a part of a conductive body cover may be formed by a process that includes a process of forming a material equivalent to an ejection object by using a three-dimensional printer, instead of the above-described process.

In the above description, a case in which a non-reciprocal circuit element is a three-port circulator has been described as an example. The configuration according to the second example embodiment in which a dielectric material is placed on a ferrimagnetic material can be also applied to another non-reciprocal circuit element as long as the non-reciprocal circuit element has a similar configuration. The configuration is applicable to, for example, a circulator having two, four, or more ports in number, and an isolator.

Figure 65:
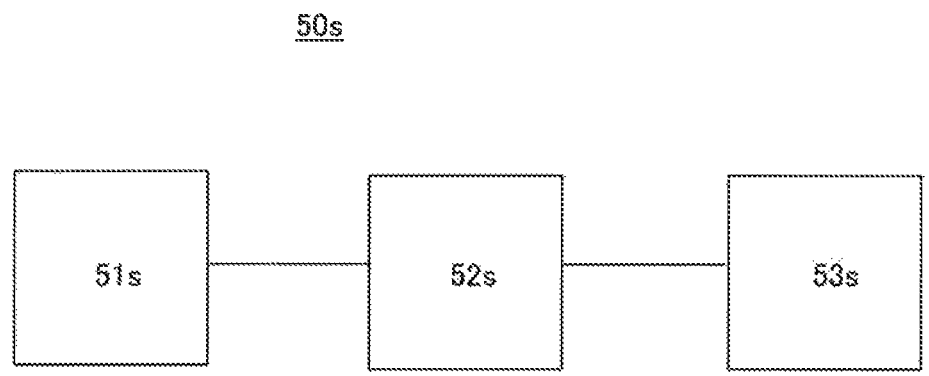
FIG. 65 is a conceptual view illustrating a communication device according to the second example embodiment.

FIG. 65 is a conceptual view illustrating a communication device according to the second example embodiment.

A communication device 50s according to the second example embodiment includes a sending circuit 51s, a transferring circuit 52s, and a receiving circuit 53s.

The sending circuit 51s sends a high frequency signal to the transferring circuit 52s.

The transferring circuit 52s includes any of the non-reciprocal circuit elements described in the second example embodiment, and sends the high frequency signal sent from the sending circuit 51s to the receiving circuit 53s via the non-reciprocal circuit element.

The receiving circuit 53s receives the high frequency signal sent from the transferring circuit 52s.

Advantageous Effect

The non-reciprocal circuit element according to the second example embodiment forms a dielectric material made of a dielectric body on at least a side part of a ferrimagnetic material. Then, a structure is made such that a conductive body cover side part that is a portion of a conductive body cover, opposing the side part is brought into contact with the coated dielectric body.

With the above structure, the non-reciprocal circuit element according to the second example embodiment is able to suppress variation in a reflection characteristic and isolation, by suppressing variation in a distance between a ferrimagnetic material and a conductive body cover side part.

Figure 66:
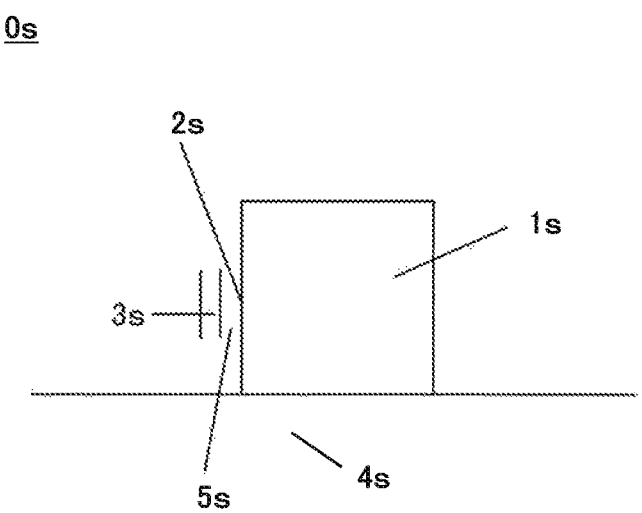
FIG. 66 is a conceptual view illustrating a configuration of a minimum non-reciprocal circuit element according to the present invention.

Note that FIG. 66 is a conceptual view illustrating a configuration of a minimum non-reciprocal circuit element 0s according to the present invention.

The non-reciprocal circuit element 0s includes a ferrimagnetic body is that is provided on a base body 4s and to which a magnetic field is applied, and a dielectric body 5s that is formed on at least a part 2s of a ferrimagnetic body side part that is a side part of the ferrimagnetic body 1s. The non-reciprocal circuit element 0s further includes a conductive body cover (only a conductive body cover side part 3 is illustrated) that covers the ferrimagnetic body 1s, and makes contact or substantial contact with the dielectric body 5s at a conductive body cover side part 3s that is a portion of the conductive body cover, opposing at least the part 2s of the ferrimagnetic body side part. In FIG. 66, only a case in which the conductive body cover side part 3s makes contact with the dielectric body 5s is illustrated. The non-reciprocal circuit element 0s further includes a not-illustrated conductive body part that is provided on the base body 4s, and a plurality of not-illustrated connecting parts that electrically connect each of a plurality of not-illustrated signal transmission lines on the base body 4s with the conductive body part.

The non-reciprocal circuit element 0s forms the dielectric body 5s on at least the part 2s of the ferrimagnetic body side part of a ferrimagnetic material. Then, the conductive body cover side part 3s that is a portion of the conductive body cover, opposing the side part is made in such a way as to make substantial contact or contact with the dielectric body 5s. By the conductive body cover side part 3s making substantial contact or contact with the dielectric body 5s, a positional relationship between a conductive body cover upper part and a ferrimagnetic material upper part becomes a correct positional relationship as designed, with a satisfactory reflection characteristic and isolation of a non-reciprocal circuit element.

Consequently, with the above configuration, the non-reciprocal circuit element 0s exhibits an advantageous effect described in a paragraph of [Advantageous Effects of Invention].

The whole or part of the example embodiments disclosed above can be described as, but not limited to, the following supplementary notes.

(Supplementary Note 1)

A non-reciprocal circuit element including:

a conductive body cover that is provided on a substrate and covers a ferrimagnetic body provided on the substrate;

the ferrimagnetic body, on at least a portion of which opposing a side part of the conductive body cover, a dielectric body that makes substantial contact with the conductive body cover side part is formed;

a conductive body part that is provided on the substrate;

a plurality of connecting parts that electrically connect each of a plurality of signal transmission lines on the substrate with the conductive body part; and a magnet that applies a magnetic field to the ferrimagnetic body.

(Supplementary Note 2)

The non-reciprocal circuit element according to Supplementary note 1, wherein the dielectric body is a dielectric body film.

(Supplementary Note 3)

The non-reciprocal circuit element according to Supplementary note 1 or 2, wherein the conductive body cover includes a plurality of conductive body cover side parts, and each of the plurality of conductive body cover side parts is in substantial contact with the dielectric body opposing each of the plurality of conductive body cover side parts.

(Supplementary Note 4)

The non-reciprocal circuit element according to any one of Supplementary notes 1 to 3, wherein the dielectric body is formed on the opposing portion in a substantially uniform manner.

(Supplementary Note 5)

The non-reciprocal circuit element according to any one of Supplementary notes 1 to 4, wherein a face of the conductive body cover, opposing the dielectric body, is in substantial contact with a face of the dielectric body opposing the opposing face.

(Supplementary Note 6)

The non-reciprocal circuit element according to Supplementary note 4, wherein a face of the conductive body cover, opposing the dielectric body, is in substantial contact with a face of the dielectric body, opposing the opposing face formed with a film thickness of the substantially uniform manner.

(Supplementary Note 7)

The non-reciprocal circuit element according to any one of Supplementary notes 1 to 6, wherein the conductive body part also serves as the conductive body cover.

(Supplementary Note 8)

The non-reciprocal circuit element according to any one of Supplementary notes 1 to 7, wherein the conductive body cover is formed as a single body.

(Supplementary Note 9)

The non-reciprocal circuit element according to any one of Supplementary notes 1 to 8, wherein the ferrimagnetic body is provided on a first face of the substrate, and the magnet is provided on a second face side of the substrate, opposing the first face.

(Supplementary Note 10)

A communication device including:

a sending circuit that sends a high frequency signal;

a transferring circuit that includes the non-reciprocal circuit element according to any one of claims 1 to 7, and transfers a high frequency signal from the sending circuit; and a receiving circuit that receives the high frequency signal from the transferring circuit.

(Supplementary Note 11)

A method of manufacturing a non-reciprocal circuit element, including the steps of:

forming a conductive body cover for covering an upper face of a ferrimagnetic body;

forming a dielectric-body-attached ferrimagnetic body, by forming a dielectric body on at least a face of the ferrimagnetic body, opposing a side part of the conductive body cover;

providing, on a substrate, the dielectric-body-attached ferrimagnetic body, and the conductive body cover that covers an upper face of the dielectric-body-attached ferrimagnetic body, and is electrically connected with each of a plurality of signal transmission lines on the substrate; and providing a magnet at a position for applying a magnetic field to the ferrimagnetic body.

(Supplementary Note 12)

The method of manufacturing a non-reciprocal circuit element, according to Supplementary note 11, wherein the formation of the dielectric body is performed with spray of a raw material for the dielectric body while rotating the ferrimagnetic body.

(Supplementary Note A1)

A non-reciprocal circuit element including:

a ferrimagnetic body that is provided on a base body and to which a magnetic field is applied;

a dielectric body that is formed on at least a part of a ferrimagnetic body side part that is a side part of the ferrimagnetic body;

a conductive body cover that covers the ferrimagnetic body, and makes contact with the dielectric body at a conductive body cover side part that is a portion of the conductive body cover, opposing the ferrimagnetic body side part;

a conductive body part that is provided on the base body; and a plurality of connecting parts that electrically connect each of a plurality of signal transmission lines on the base body with the conductive body part.

(Supplementary Note A1.1)

The non-reciprocal circuit element according to Supplementary note A1, wherein the dielectric body and the conductive body cover side part are firmly adhered to each other.

(Supplementary Note A1.2)

The non-reciprocal circuit element according to Supplementary note A1 or A1.1, wherein the conductive body cover side part is formed directly on the dielectric body.

(Supplementary Note A1.3)

The non-reciprocal circuit element according to at least one of Supplementary notes A1 to A1.2, wherein the dielectric body is formed by a process of performing spray of a raw material for the dielectric body while rotating the ferrimagnetic body.

(Supplementary Note A1.4)

The non-reciprocal circuit element according to at least one of Supplementary notes A1 to A1.3, wherein the conductive body cover side part is formed by a process including a process of spraying a raw material for the conductive body cover side part to a portion on which the conductive body cover side part is scheduled to be formed.

(Supplementary Note A1.5)

The non-reciprocal circuit element according to at least one of Supplementary notes A1 to A1.4, wherein the conductive body cover side part is formed by a process including any one of vapor deposition, sputtering, and plating of a raw material for the conductive body cover side part on the dielectric body.

(Supplementary Note A1.6)

The non-reciprocal circuit element according to at least one of Supplementary notes A1 to A1.5, wherein the conductive body cover side part is formed by a process including a process of removing a raw material for the conductive body cover side part or an object formed from the raw material, by forming a to-be-removed object that is scheduled to be removed by a subsequent process at a portion on the ferrimagnetic material, on which the conductive body cover is not scheduled to be formed, forming the raw material thereon, and thereafter removing the to-be-removed object.

(Supplementary Note A2)

The non-reciprocal circuit element according to at least one of Supplementary notes A1 to A1.6, wherein the dielectric body is a dielectric body film.

(Supplementary Note A3)

The non-reciprocal circuit element according to at least one of Supplementary notes A1 to A2, wherein the conductive body cover includes a plurality of conductive body cover side parts, and each of the plurality of conductive body cover side parts is in contact with the dielectric body opposing each of the plurality of conductive body cover side parts.

(Supplementary Note A4)

The non-reciprocal circuit element according to any one of Supplementary notes A1 to A3, wherein the dielectric body is formed in a substantially uniform manner.

(Supplementary Note A5)

The non-reciprocal circuit element according to any one of Supplementary notes A1 to A4, wherein the conductive body part also serves as the conductive body cover.

(Supplementary Note A6)

The non-reciprocal circuit element according to any one of Supplementary notes A1 to A5, wherein the conductive body cover is formed as a single body.

(Supplementary Note A7)

The non-reciprocal circuit element according to any one of Supplementary notes A1 to A6, wherein the non-reciprocal circuit element includes a magnet for applying the magnetic field.

(Supplementary Note A8)

The non-reciprocal circuit element according to any one of Supplementary notes A1 to A7, wherein the ferrimagnetic body is provided on a first face of the base body, and the magnet is provided on a second face side of the base body, opposing the first face.

(Supplementary Note B1)

A communication device including:

a sending circuit that sends a high frequency signal;

a transferring circuit that includes the non-reciprocal circuit element according to any one of Supplementary notes A1 to A8, and transfers a high frequency signal from the sending circuit; and a receiving circuit that receives the high frequency signal from the transferring circuit.

(Supplementary Note C1)

A method of manufacturing a non-reciprocal circuit element, including the steps of:

providing a ferrimagnetic body on a base body;

forming a dielectric body on at least a part of a ferrimagnetic body side part that is a side part of the ferrimagnetic body; and forming a conductive body cover side part that is a portion of a conductive body cover covering the ferrimagnetic body, opposing the ferrimagnetic body side part in such a way as to make contact with the dielectric body.

(Supplementary Note C1.1)

The method of manufacturing a non-reciprocal circuit element, according to Supplementary note C1, wherein the step of forming in such a way as to make contact is a step of forming the conductive body cover side part in such a way as to be firmly adhered to the dielectric body.

(Supplementary Note C1.2)

The method of manufacturing a non-reciprocal circuit element, according to Supplementary note C1 or C1.1, wherein the step of forming in such a way as to make contact is a step of forming the conductive body cover side part directly on the dielectric body.

(Supplementary Note C2)

The method of manufacturing a non-reciprocal circuit element, according to any one of Supplementary notes C1 to C1.2, wherein the step of forming the dielectric body includes a step of performing spray of a raw material for the dielectric body while rotating the ferrimagnetic body.

(Supplementary Note C3)

The method of manufacturing a non-reciprocal circuit element, according to any of Supplementary notes C1 to C2, wherein the step of forming in such a way as to make contact includes a step of spraying a raw material for the conductive body cover side part to the dielectric body.

(Supplementary Note C4)

The method of manufacturing a non-reciprocal circuit element, according to any one of Supplementary notes C1 to C3, wherein the step of forming in such a way as to make contact includes a step of forming by using any one of vapor deposition, sputtering, and plating of a raw material for the conductive body cover side part on the dielectric body.

(Supplementary Note C5)

The method of manufacturing a non-reciprocal circuit element, according to any one of Supplementary notes C1 to C4, wherein the step of forming in such a way as to make contact includes a process of removing a raw material for the conductive body cover side part or an object formed from the raw material, by forming a to-be-removed object that is scheduled to be removed by a subsequent process at a portion on the ferrimagnetic material, on which the conductive body cover side part is not scheduled to be formed, forming the raw material thereon, and thereafter removing the to-be-removed object.

(Supplementary Note X1)

A non-reciprocal circuit element including:

a ferrimagnetic body that is provided on a base body and to which a magnetic field is applied;

a dielectric body that is formed on at least a part of a ferrimagnetic body side part that is a side part of the ferrimagnetic body;

a conductive body cover that covers the ferrimagnetic body, and makes contact or substantial contact with the dielectric body at a conductive body cover side part that is a portion of the conductive body cover, opposing the ferrimagnetic body side part;

a conductive body part that is provided on the base body; and a plurality of connecting parts that electrically connect each of a plurality of signal transmission lines on the base body with the conductive body part.

(Supplementary Note X2)

The non-reciprocal circuit element according to Supplementary note X1 or X2, wherein the dielectric body is a dielectric body film.

(Supplementary Note X3)

The non-reciprocal circuit element according to Supplementary note X1 or X2, wherein the conductive body cover includes a plurality of conductive body cover side parts, and each of the plurality of conductive body cover side parts is in contact or substantial contact with the dielectric body opposing each of the plurality of conductive body cover side parts.

(Supplementary Note X4)

The non-reciprocal circuit element according to any one of Supplementary notes X1 to X3, wherein the dielectric body is formed on the opposing portion in a substantially uniform manner.

(Supplementary Note X5)

The non-reciprocal circuit element according to any one of Supplementary notes X1 to X4, wherein the conductive body part also serves as the conductive body cover.

(Supplementary Note X6)

The non-reciprocal circuit element according to any one of Supplementary notes X1 to 5, wherein the conductive body cover is formed as a single body.

(Supplementary Note X7)

The non-reciprocal circuit element according to any one of Supplementary notes X1 to 6, wherein the ferrimagnetic body is provided on a first face of the substrate, and the magnet is provided on a second face side of the substrate, opposing the first face.

(Supplementary Note X8)

A communication device including:

a sending circuit that sends a high frequency signal;

a transferring circuit that includes the non-reciprocal circuit element according to any one of Supplementary notes X1 to 7, and transfers a high frequency signal from the sending circuit; and a receiving circuit that receives the high frequency signal from the transferring circuit.

(Supplementary Note X9)

The non-reciprocal circuit element according to Supplementary note X1, wherein the dielectric body and the conductive body cover side part are firmly adhered to each other.

(Supplementary Note X10)

A method of manufacturing a non-reciprocal circuit element, including:

forming a conductive body cover for covering an upper face of a ferrimagnetic body;

forming a dielectric-body-attached ferrimagnetic body, by forming a dielectric body on at least a face of the ferrimagnetic body, opposing a side part of the conductive body cover;

providing, on a substrate, the dielectric-body-attached ferrimagnetic body, and the conductive body cover that covers an upper face of the dielectric-body-attached ferrimagnetic body, and is electrically connected with each of a plurality of signal transmission lines on the substrate; and providing a magnet at a position for applying a magnetic field to the ferrimagnetic body.

(Supplementary Note X11)

The method of manufacturing a non-reciprocal circuit element, according to Supplementary note X10, wherein formation of the dielectric body is performed with spray of a raw material for the dielectric body while rotating the ferrimagnetic body.

(Supplementary Note X12)

A method of manufacturing a non-reciprocal circuit element, including:

providing a ferrimagnetic body on a base body;

forming a dielectric body on at least a part of a ferrimagnetic body side part that is a side part of the ferrimagnetic body; and forming a conductive body cover side part that is a portion of a conductive body cover covering the ferrimagnetic body, opposing the ferrimagnetic body side part in such a way as to make contact with the dielectric body.

(Supplementary Note X13)

The method of manufacturing a non-reciprocal circuit element, according to Supplementary note X12, wherein the forming in such a way as to make contact is forming the conductive body cover side part directly on the dielectric body.

(Supplementary Note X14)

The method of manufacturing a non-reciprocal circuit element, according to Supplementary note X12 or X13, wherein the step of forming in such a way as to make contact includes a step of spraying a raw material for the conductive body cover side part to the dielectric body.

(Supplementary Note X15)

The method of manufacturing a non-reciprocal circuit element, according to any one of Supplementary notes X12 to X14, wherein the forming in such a way as to make contact is forming by using any one of vapor deposition, sputtering, and plating of a raw material for the conductive body cover side part on the dielectric body.

(Supplementary Note X16)

The method of manufacturing a non-reciprocal circuit element, according to any one of Supplementary notes X12 to X15, wherein the forming in such a way as to make contact is removing a raw material for the conductive body cover side part or an object formed from the raw material, by forming a to-be-removed object that is scheduled to be removed by a subsequent process at a portion on the ferrimagnetic material, on which the conductive body cover side part is not scheduled to be formed, forming the raw material thereon, and thereafter removing the to-be-removed object.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent applications No. 2015-061847, filed on Mar. 25, 2015 and No. 2015-178410, filed on Sep. 10, 2015, the disclosure of which is incorporated herein in its entirety by reference.

REFERENCE SIGNS LIST 10, 10b, 10c, 10d, 10e, 10f Non-reciprocal circuit element
11 Substrate
12 Pattern
13 Ferrimagnetic material
14, 14b Conductive body cover
140 Conductive body cover upper part
141a, 142a, 143a Conductive body cover side part
141b, 142b, 143b Conductive body cover foot part
141', 142', 143' Conductive body cover side foot part
15 Magnet
16, 17, 18 Transmission line
19, 20, 21 Feed point
23 Coated ferrimagnetic material
25 Lower conductor
30, 30b Dielectric material
35 Turntable
36, 36b Spray
37 Metal member
38 Upper face
39 Conductive material
40 Mask material
41 First bending part
42 Second bending part
45 Lower face
50 Communication device
51 Sending circuit
52 Transferring circuit
53 Receiving circuit
200 Cutting line for sectional view
0s, 10s, 10bs, 10cs, 10ds, 10es, 10fs Non-reciprocal circuit element
1s Ferrimagnetic body
13s, 23s Ferrimagnetic material
2s At least part of ferrimagnetic body side part
3s Conductive body cover side part
4s Base body
5s Dielectric body
11s Substrate
12s Pattern
14s, 14bs Conductive body cover
140s Conductive body cover upper part
140xs Conductive body cover upper center part
141ys, 142ys, 143ys Conductive body cover upper connecting part
141as, 142as, 143as Conductive body cover side part
141bs, 142bs, 143bs Conductive body cover foot part
15s Magnet
16s, 17s, 18s Transmission line
19s, 20s, 21s Feed point 25s Lower conductor
30s, 30bs Dielectric material
35s Turntable
36s, 36bs Spray
38s Upper face
39s Conductive material
40s Mask material
45s Lower face
50s Communication device
51s Sending circuit
52s Transferring circuit
53s Receiving circuit
200s Cutting line for sectional view
240s, 241s, 242s Deposit
300s Base
301s, 303s, 305s, 331s, 333s Supporting part
302s, 332s Bending part
304s Rotating part
310s, 311s Rail
312s Arrow
320s, 321s Rail receiver
329s Table
330s Ejecting device
334s, 335s, 336s Feeding part
337s Moving part
338s Ejecting part
339s, 342s Arrow
340s, 341s Bearing part
350s, 351s Shaft
360s, 361s Supporting part
370s Connecting portion
380s Drive part
390s, 391s Cutting line
395s, 396s Sectional view
400s To-be-removed object
500s Structure

What is claimed is:

1. A non-reciprocal circuit element including:
a ferrimagnetic body that is provided on a base body and to which a magnetic field is applied;
a dielectric body that is formed on at least a part of a ferrimagnetic body side part that is a side part of the ferrimagnetic body adjacent to a side of the ferrimagnetic body that is provided on the base body;
a conductive body cover that covers the ferrimagnetic body, and makes contact with the dielectric body at a conductive body cover side part that is a portion of the conductive body cover, opposing the ferrimagnetic body side part;
a conductive body part that is provided on the base body; and
a plurality of connecting parts that electrically connect each of a plurality of signal transmission lines on the base body with the conductive body part.

2. The non-reciprocal circuit element according to claim 1, wherein the dielectric body is a dielectric body film.

3. The non-reciprocal circuit element according to claim 1, wherein the conductive body cover includes a plurality of conductive body cover side parts, and each of the plurality of conductive body cover side parts is in contact or substantial contact with the dielectric body opposing each of the plurality of conductive body cover side parts.

4. The non-reciprocal circuit element according to claim 1, wherein the dielectric body is formed in a substantially uniform manner.

5. The non-reciprocal circuit element according to claim 1, wherein the conductive body part also serves as the conductive body cover.

6. The non-reciprocal circuit element according to claim 1, wherein the conductive body cover is formed as a single body.

7. The non-reciprocal circuit element according to claim 1, wherein
the ferrimagnetic body is provided on a first face of the base body, and
the magnet is provided on a second face side of the base body, opposing the first face.

8. The non-reciprocal circuit element according to claim 1, wherein the dielectric body and the conductive body cover side part are firmly adhered to each other.

9. A communication device including:
a sending circuit that sends a high frequency signal;
a transferring circuit that includes the non-reciprocal circuit element according to claim 1, and transfers a high frequency signal from the sending circuit; and
a receiving circuit that receives the high frequency signal from the transferring circuit.

10. The non-reciprocal circuit element according to claim 1, wherein the conductive body cover side part is formed directly on the dielectric body.

11. The non-reciprocal circuit element according to claim 1, wherein the dielectric body is formed by a process of performing spray of a raw material for the dielectric body while rotating the ferrimagnetic body.

12. The non-reciprocal circuit element according to claim 1, wherein the conductive body cover side part is formed by a process including a process of spraying a raw material for the conductive body cover side part to a portion on which the conductive body cover side part is scheduled to be formed.

13. The non-reciprocal circuit element according to claim 1, wherein the conductive body cover side part is formed by a process including any one of vapor deposition, sputtering, and plating of a raw material for the conductive body cover side part on the dielectric body.

* * * * *